(12) United States Patent
Sasaki et al.

(10) Patent No.: US 7,061,716 B2
(45) Date of Patent: Jun. 13, 2006

(54) THIN-FILM MAGNETIC HEAD AND METHOD OF MANUFACTURING SAME

(75) Inventors: Yoshitaka Sasaki, Milpitas, CA (US); Takehiro Kamigama, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 295 days.

(21) Appl. No.: 10/353,927

(22) Filed: Jan. 30, 2003

(65) Prior Publication Data

US 2004/0150911 A1     Aug. 5, 2004

(51) Int. Cl.
*G11B 5/147* (2006.01)

(52) U.S. Cl. ...................................... 360/126

(58) Field of Classification Search ................ 360/126, 360/123, 125, 110
See application file for complete search history.

(56) References Cited

U.S. PATENT DOCUMENTS

| | | | | |
|---|---|---|---|---|
| 4,375,657 A | * | 3/1983 | Brock et al. | 360/125 |
| 4,787,003 A | * | 11/1988 | Nakamura et al. | 360/123 |
| 5,168,409 A | * | 12/1992 | Koyama et al. | 360/317 |
| 5,995,342 A | * | 11/1999 | Cohen et al. | 360/126 |
| 6,043,959 A | | 3/2000 | Crue et al. | |
| 6,628,604 B1 | * | 9/2003 | Van Kesteren et al. | 369/300 |
| 6,950,279 B1 | * | 9/2005 | Sasaki et al. | 360/123 |
| 2002/0110082 A1 | * | 8/2002 | Van Kesteren et al. | 369/300 |

* cited by examiner

*Primary Examiner*—Allen Cao
(74) *Attorney, Agent, or Firm*—Oliff & Berridge, PLC

(57) ABSTRACT

A thin-film magnetic head includes a bottom pole layer, a top pole layer, a recording gap layer, and a thin-film coil. The bottom pole layer has first to fifth layers. The third layer and the fifth layer constitute a coupling portion for establishing magnetic coupling between the bottom pole layer and the top pole layer. The thin-film coil has first to fifth layer portions each of which is made of a flat conductive layer of a single turn. The first to fifth layer portions are laminated, and connected in series to each other. The coupling portion has an end face facing toward the air bearing surface. The end face includes a curved surface convex toward the medium facing surface.

14 Claims, 45 Drawing Sheets

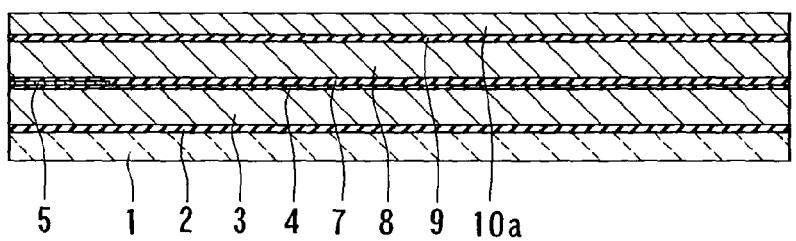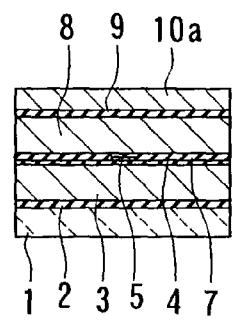
FIG. 1A  FIG. 1B
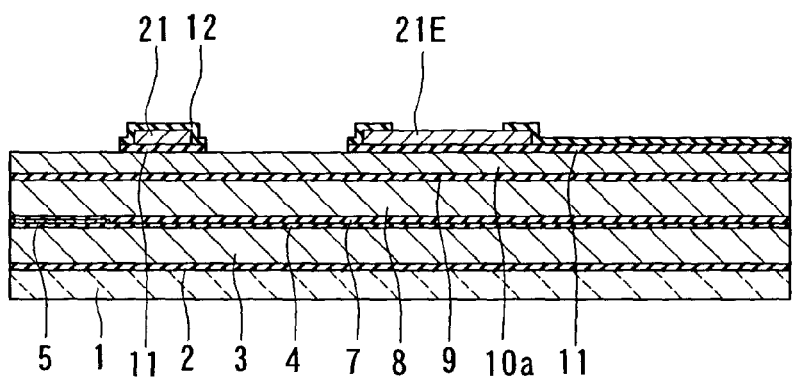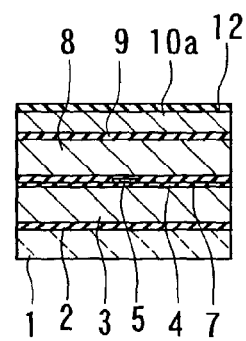
FIG. 2A  FIG. 2B

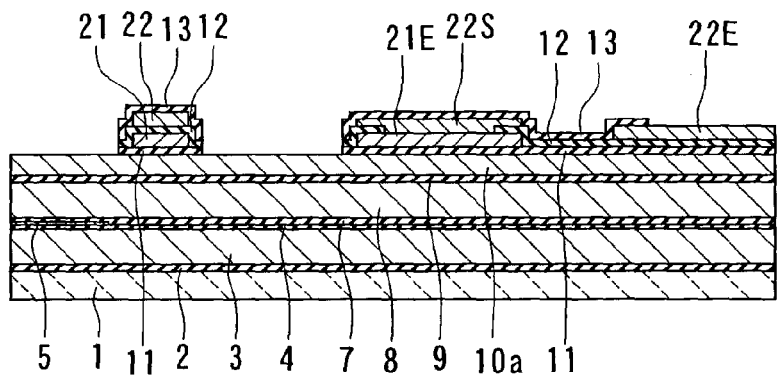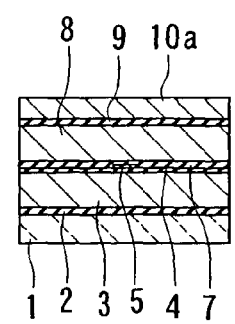
FIG. 3A  FIG. 3B
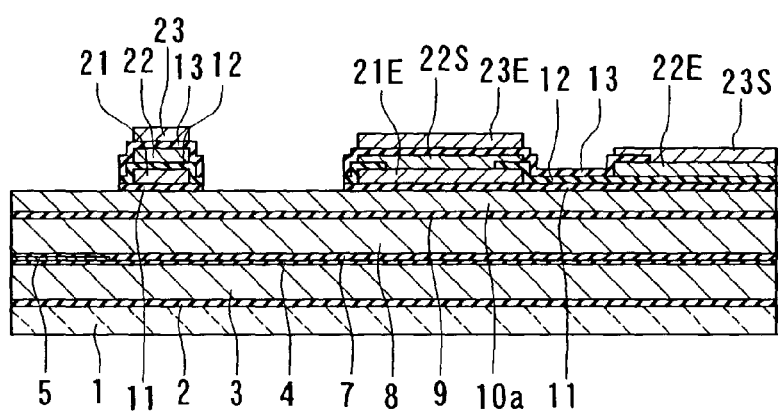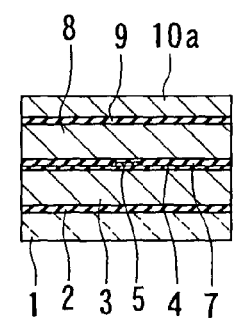
FIG. 4A  FIG. 4B

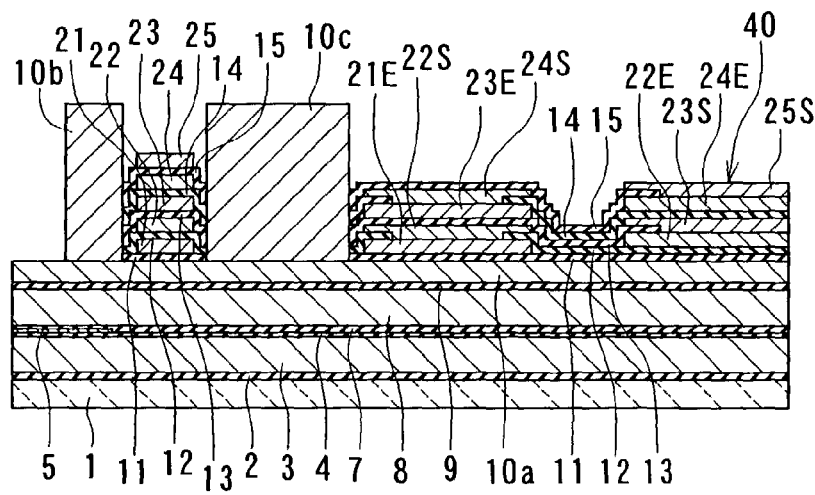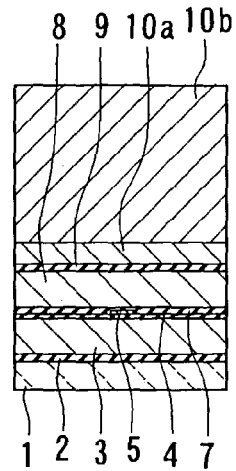
FIG. 5A    FIG. 5B
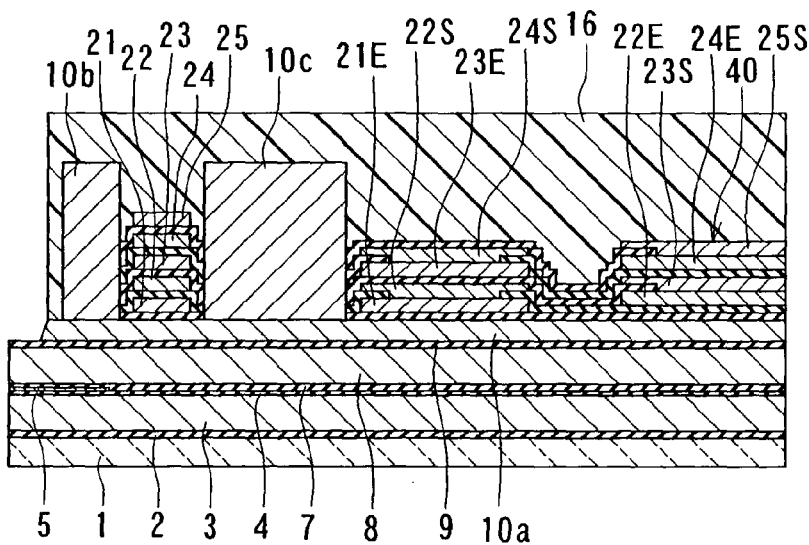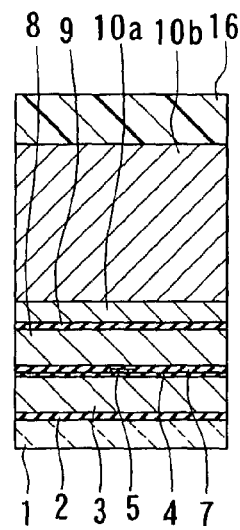
FIG. 6A    FIG. 6B

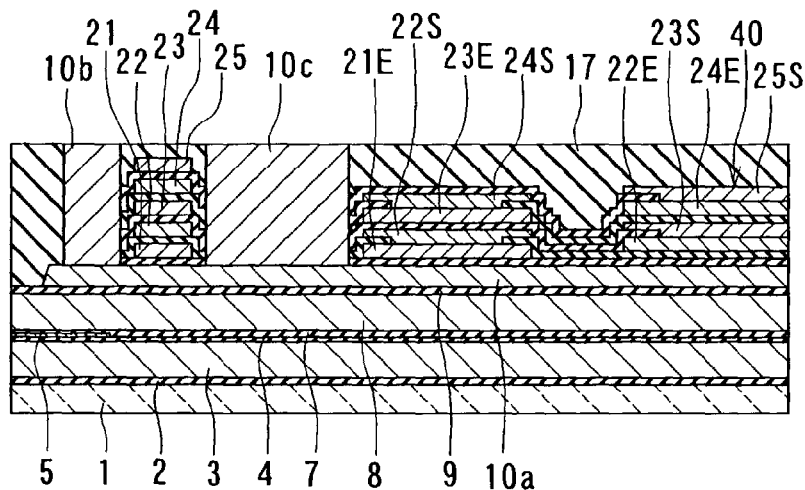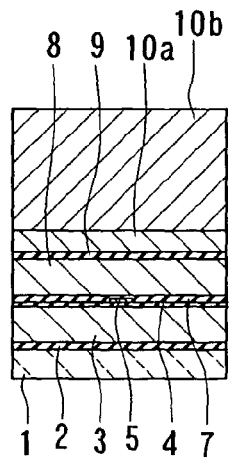
FIG. 7A  FIG. 7B
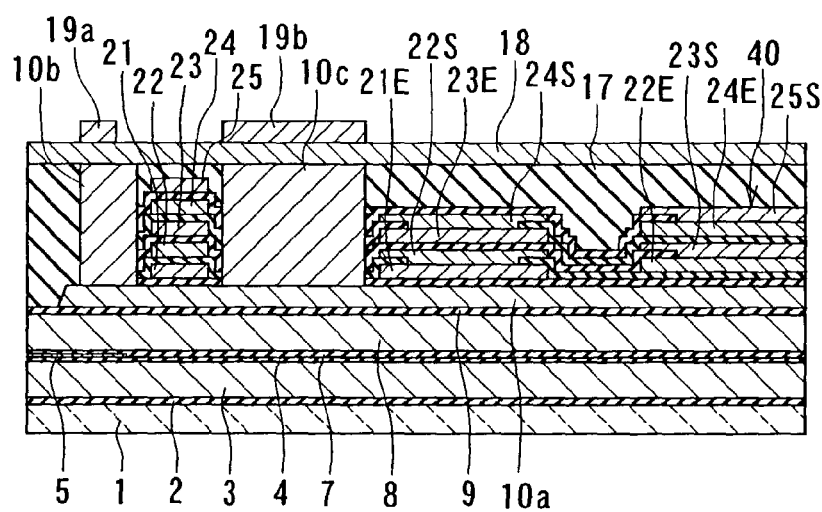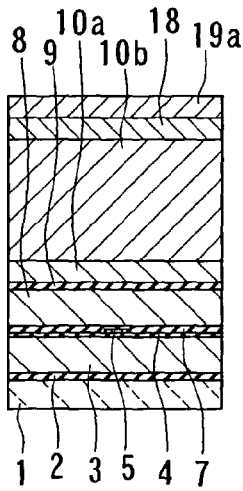
FIG. 8A  FIG. 8B

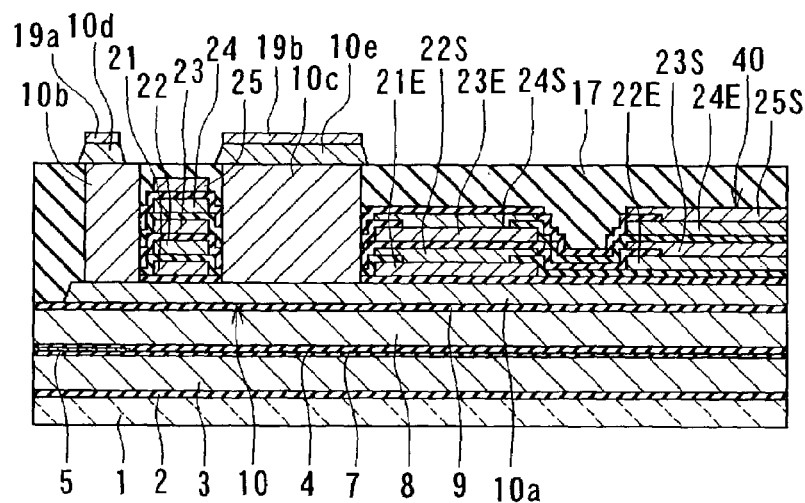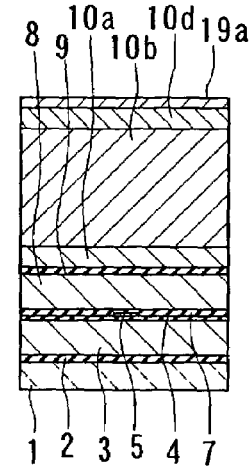
FIG. 9A  FIG. 9B
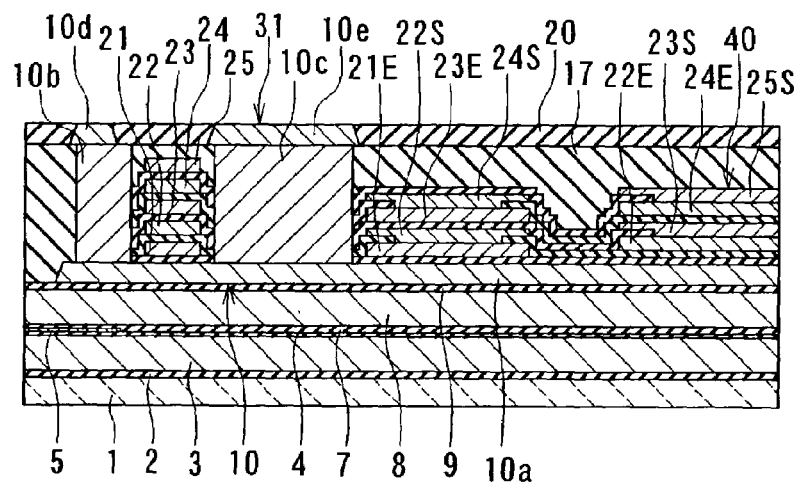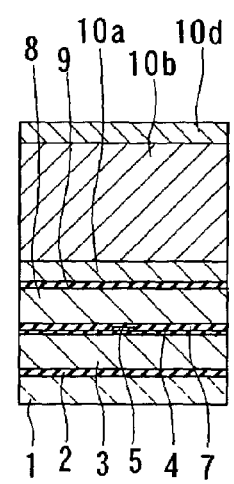
FIG. 10A  FIG. 10B

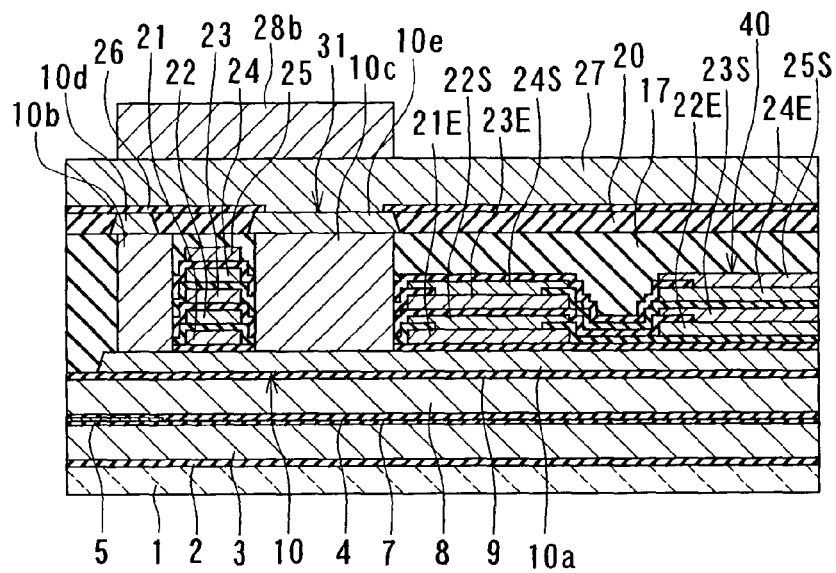
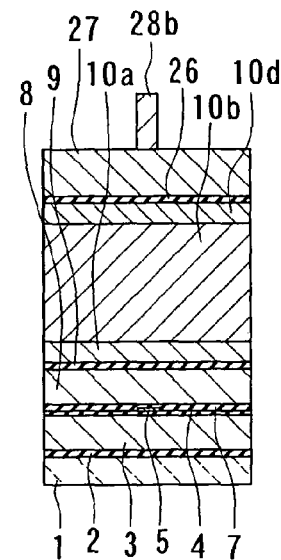
FIG. 11A
FIG. 11B
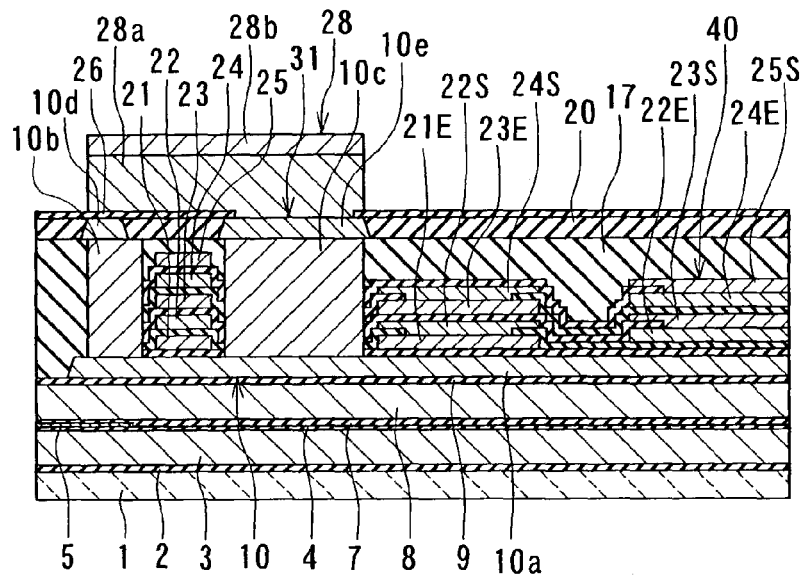
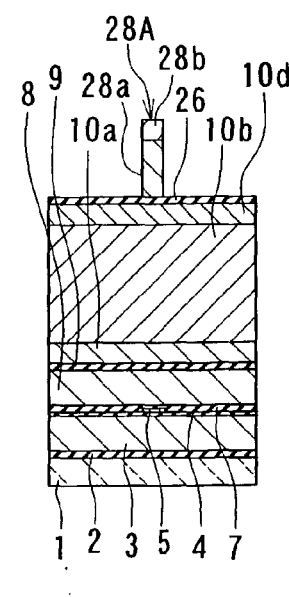
FIG. 12A
FIG. 12B

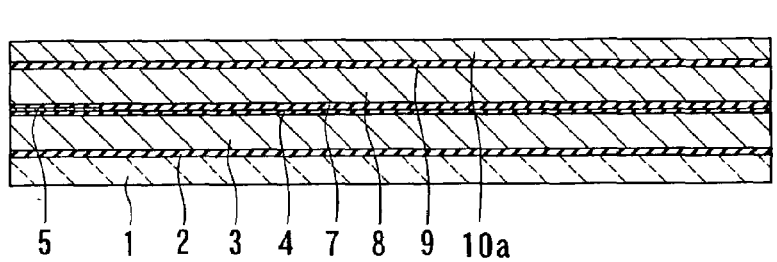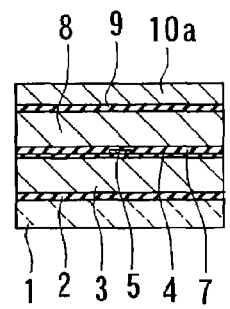
FIG. 30A  FIG. 30B
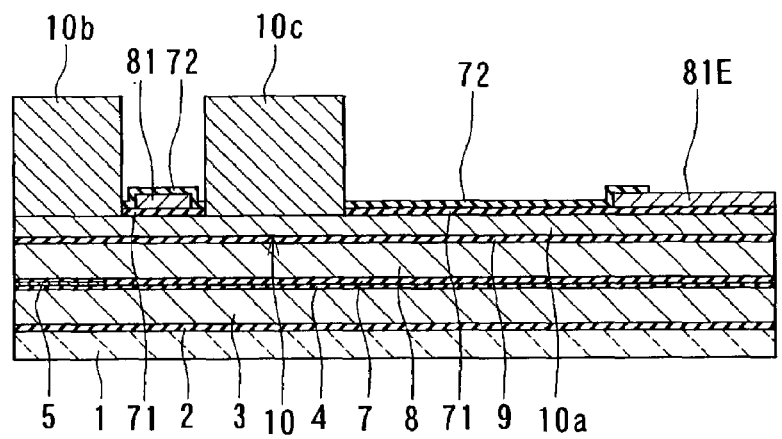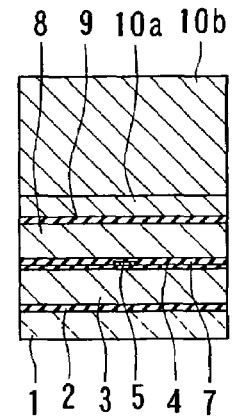
FIG. 31A  FIG. 31B

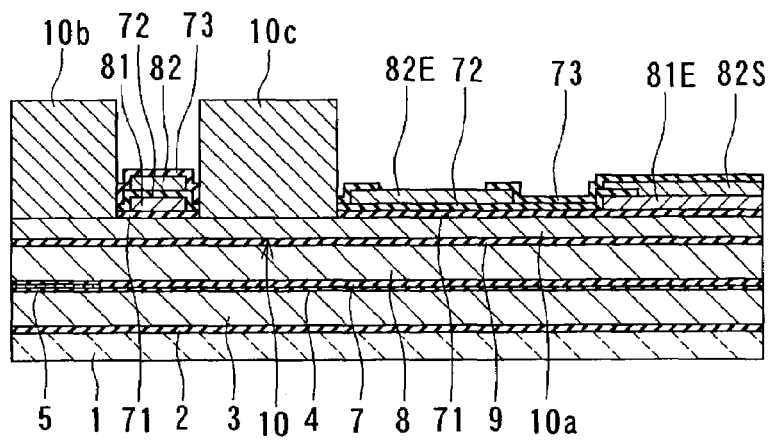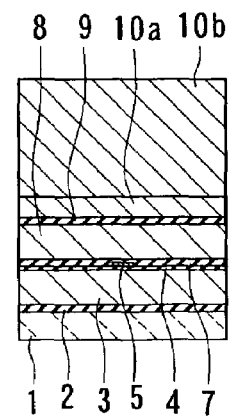
FIG. 32A    FIG. 32B
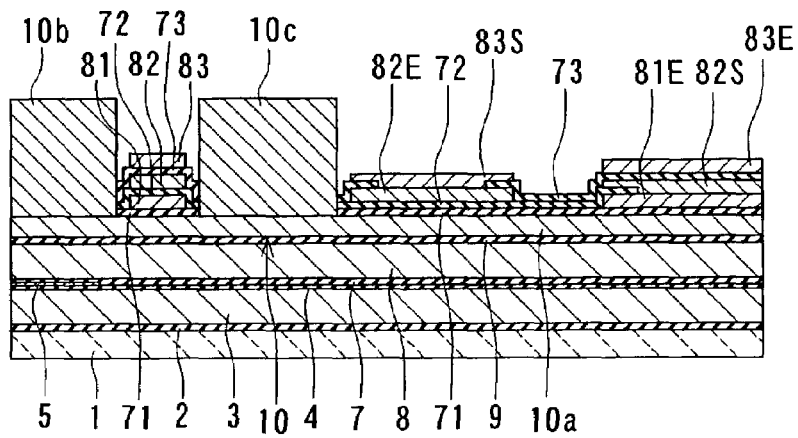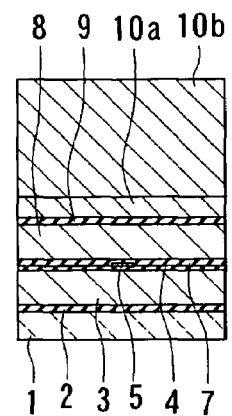
FIG. 33A    FIG. 33B

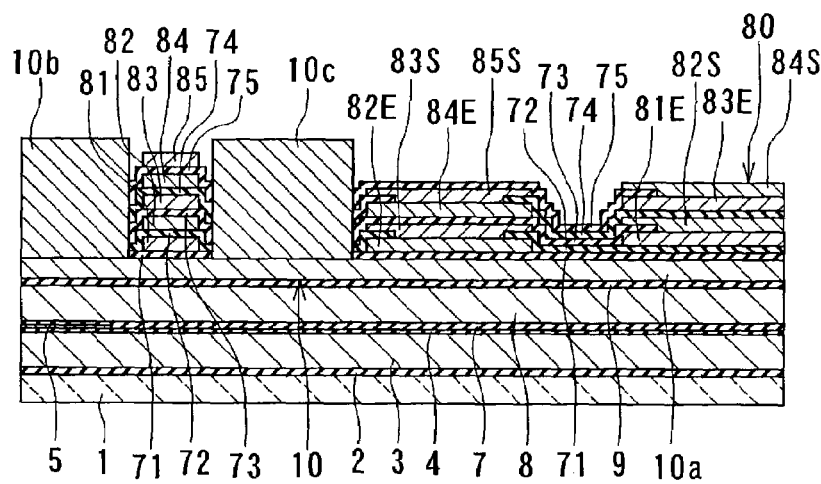 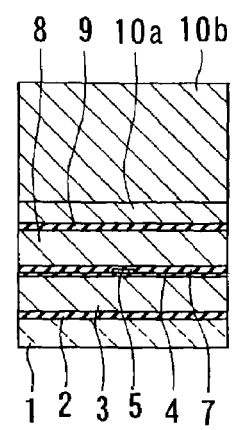
FIG. 34A    FIG. 34B
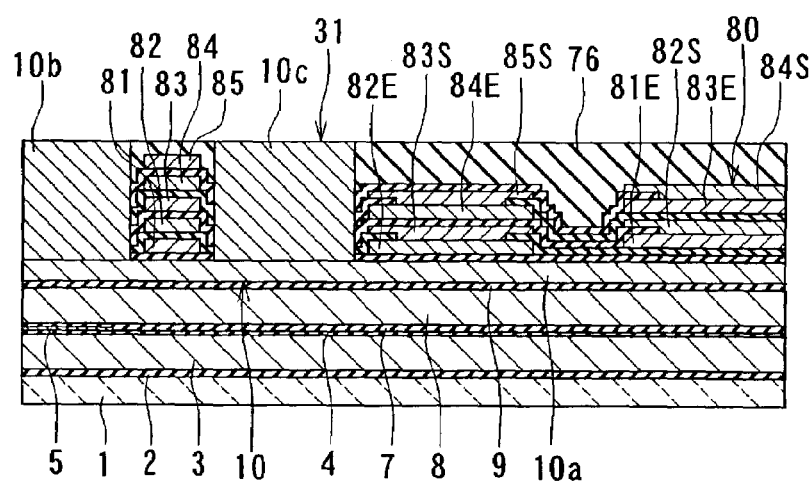 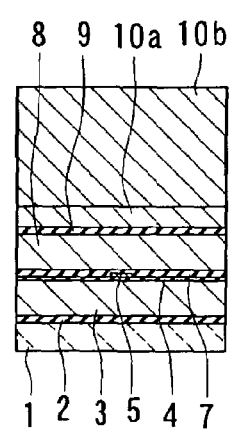
FIG. 35A    FIG. 35B

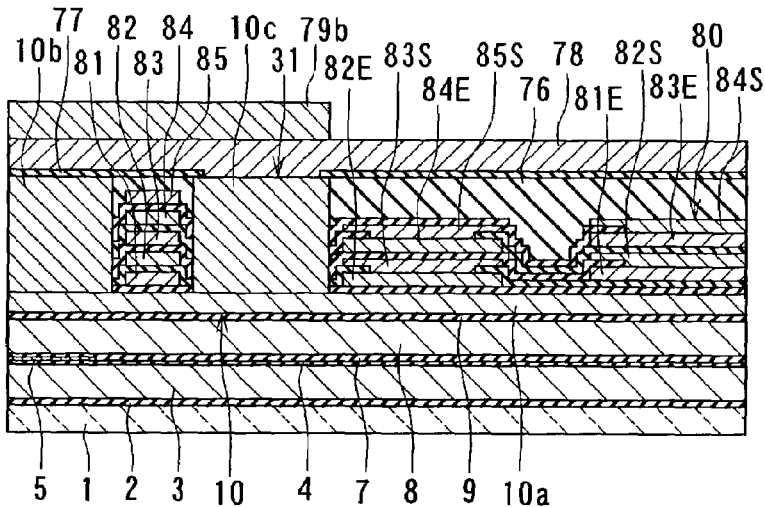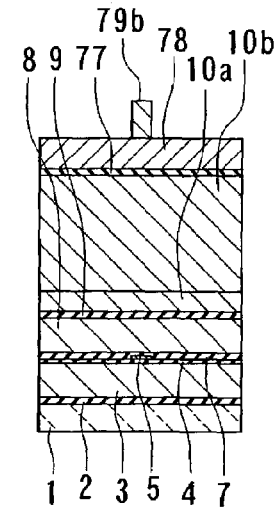
FIG. 36A  FIG. 36B
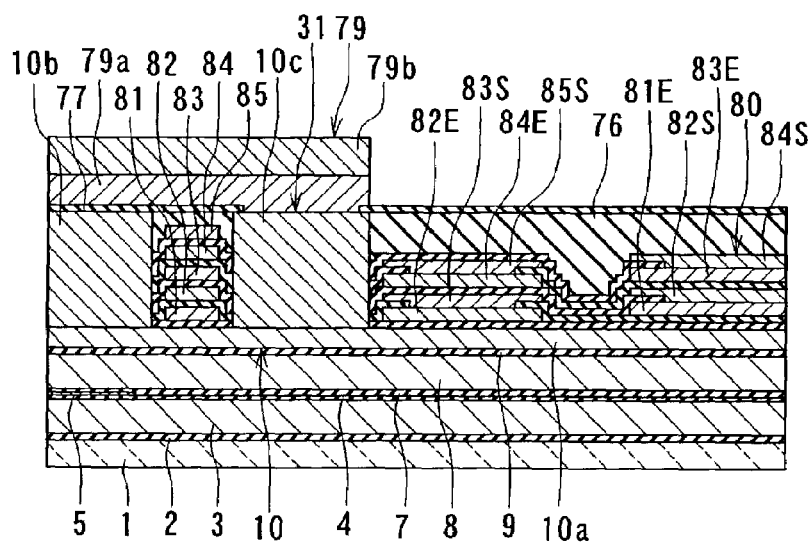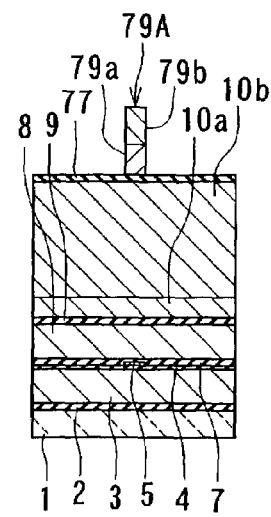
FIG. 37A  FIG. 37B

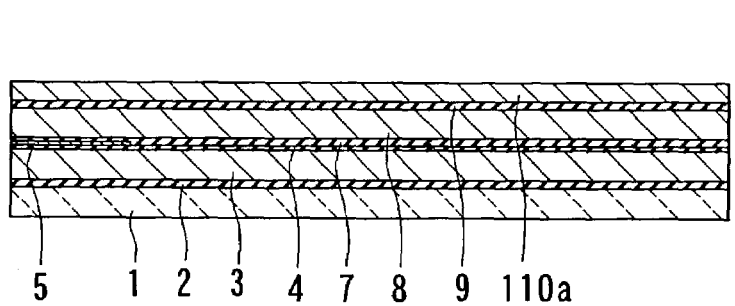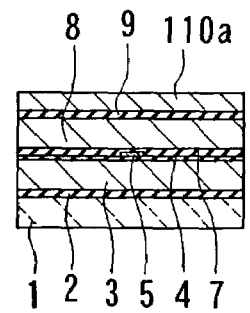
FIG. 46A      FIG. 46B
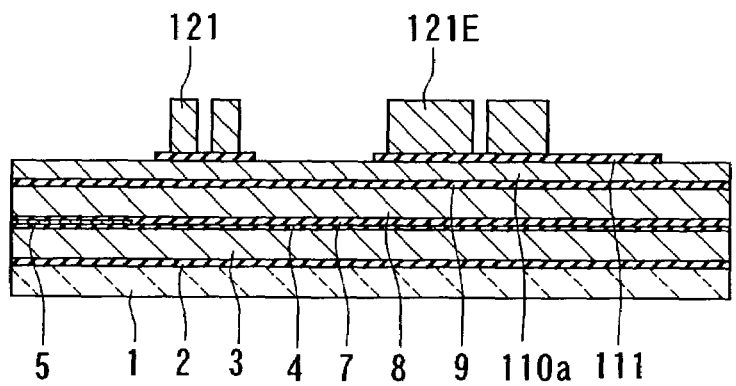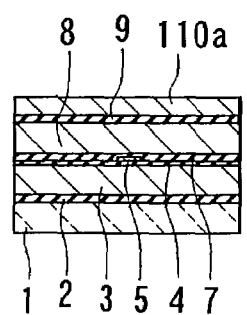
FIG. 47A      FIG. 47B
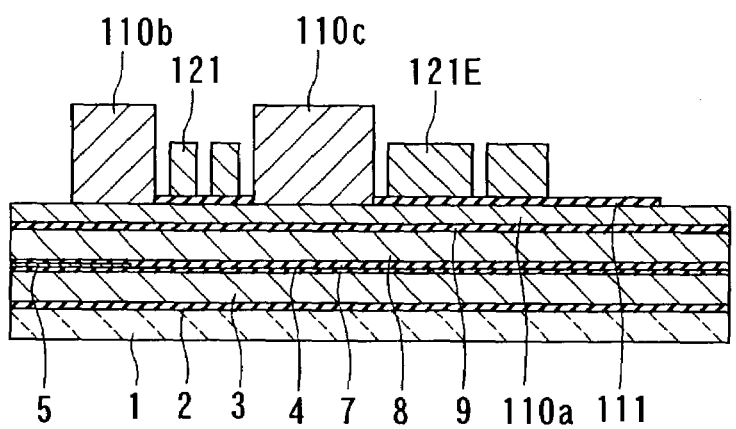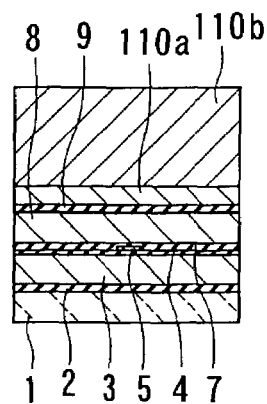
FIG. 48A      FIG. 48B

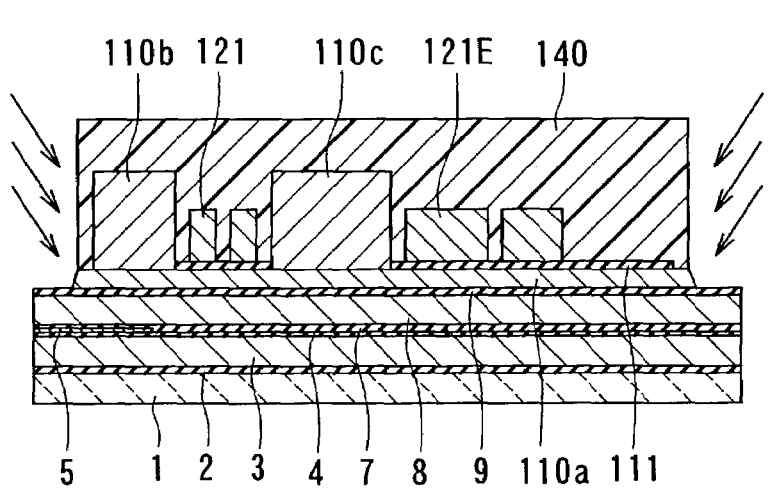 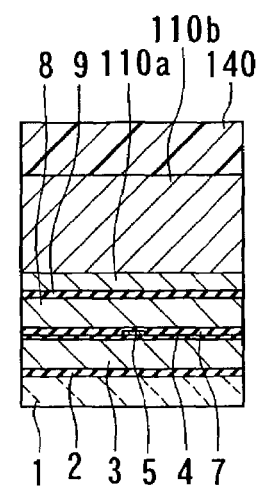
FIG. 49A                    FIG. 49B
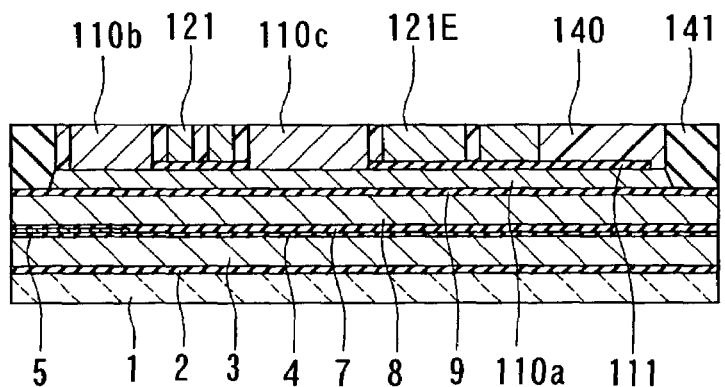 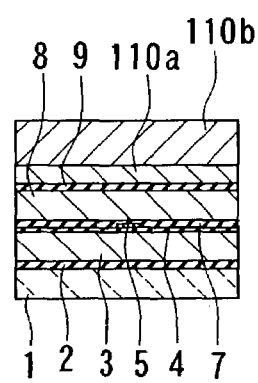
FIG. 50A                    FIG. 50B

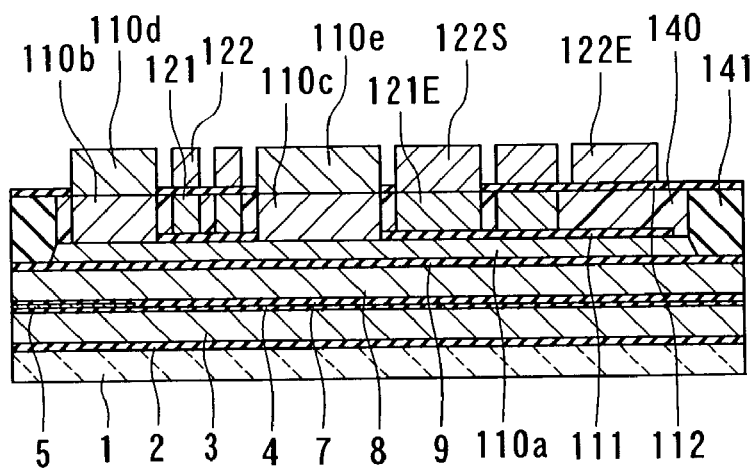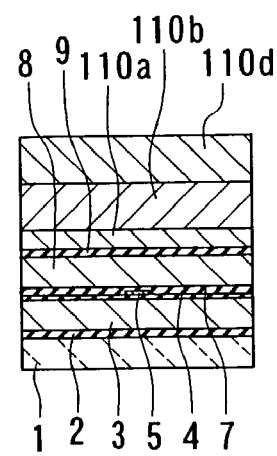
FIG. 51A                FIG. 51B
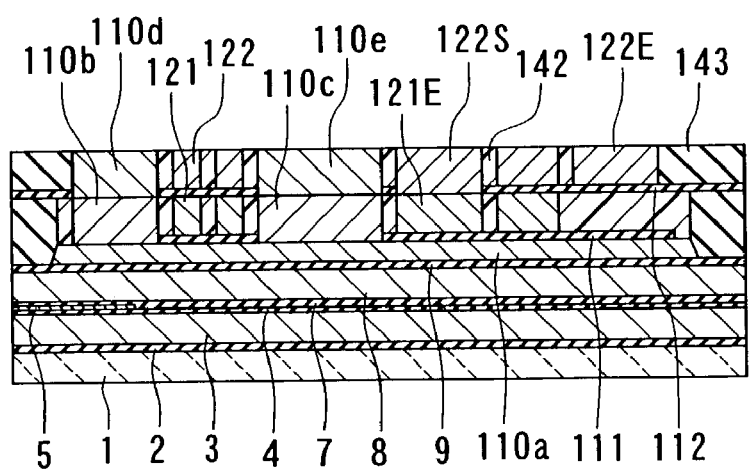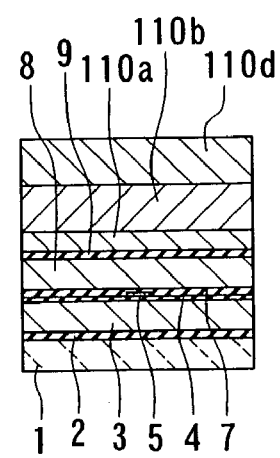
FIG. 52A                FIG. 52B

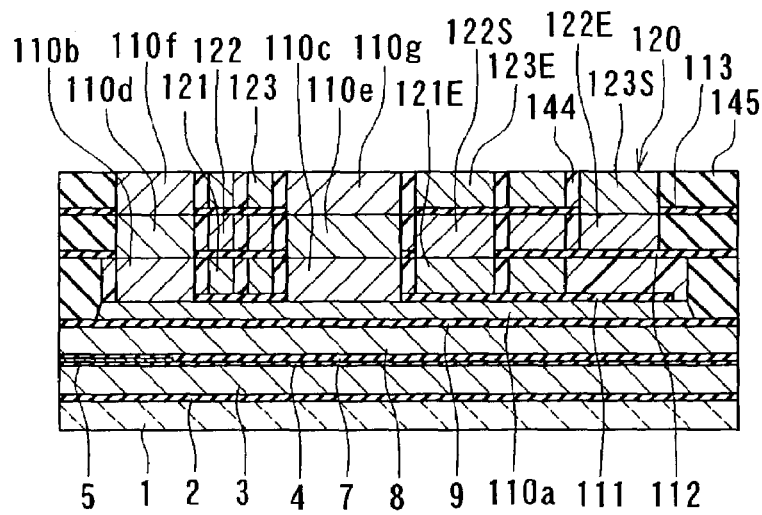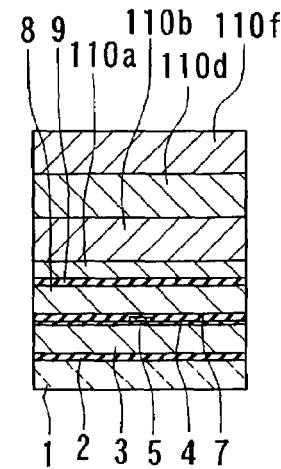
FIG. 53A  FIG. 53B
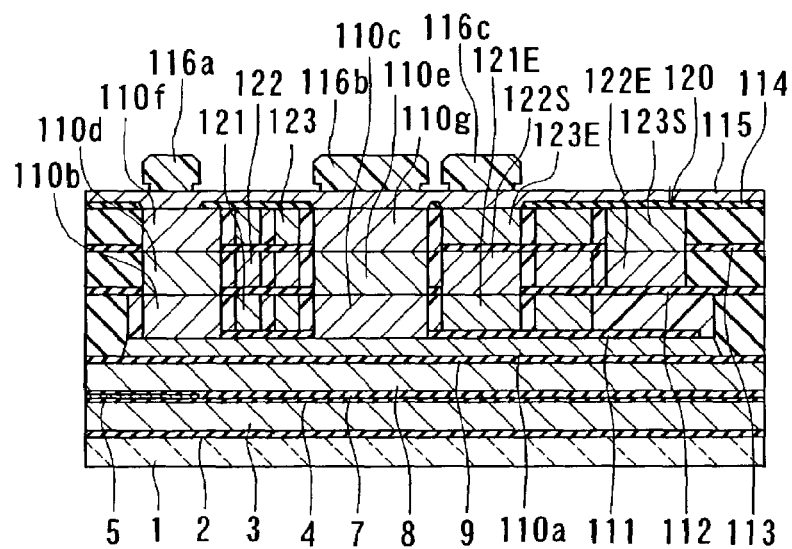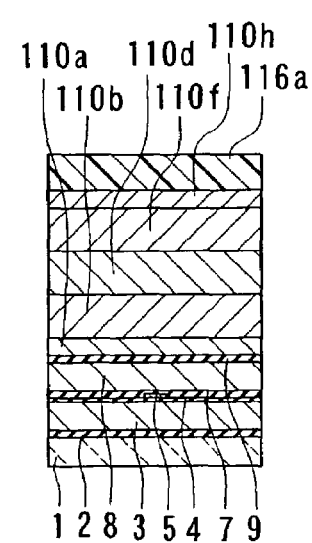
FIG. 54A  FIG. 54B

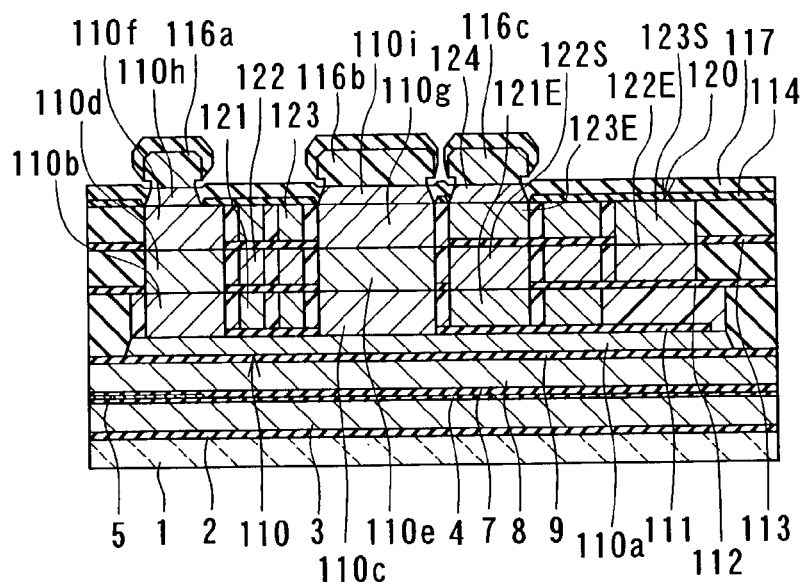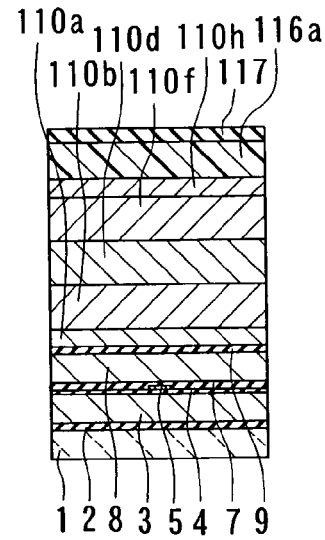
FIG. 55A  FIG. 55B
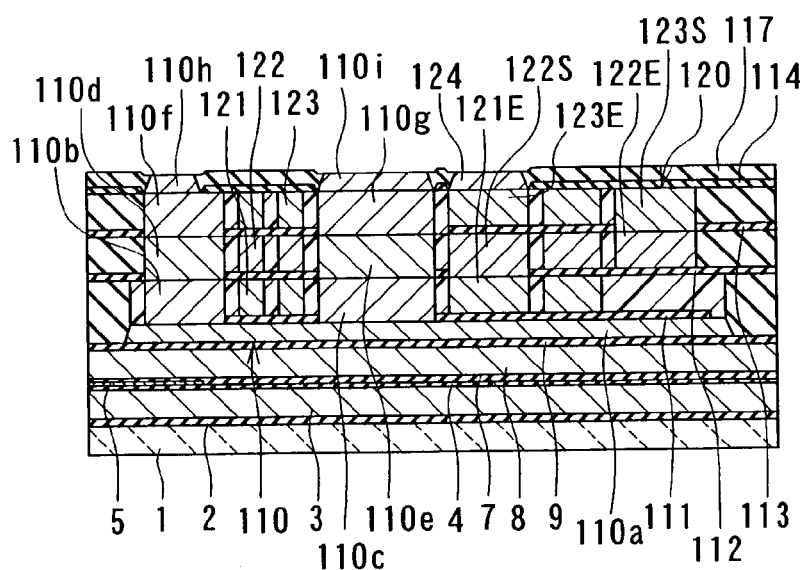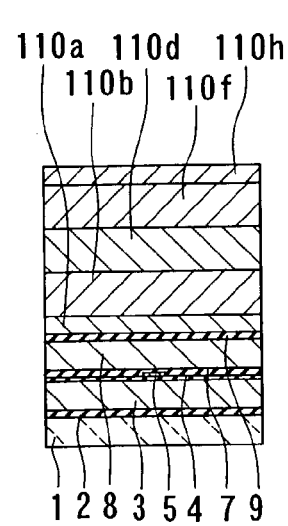
FIG. 56A  FIG. 56B

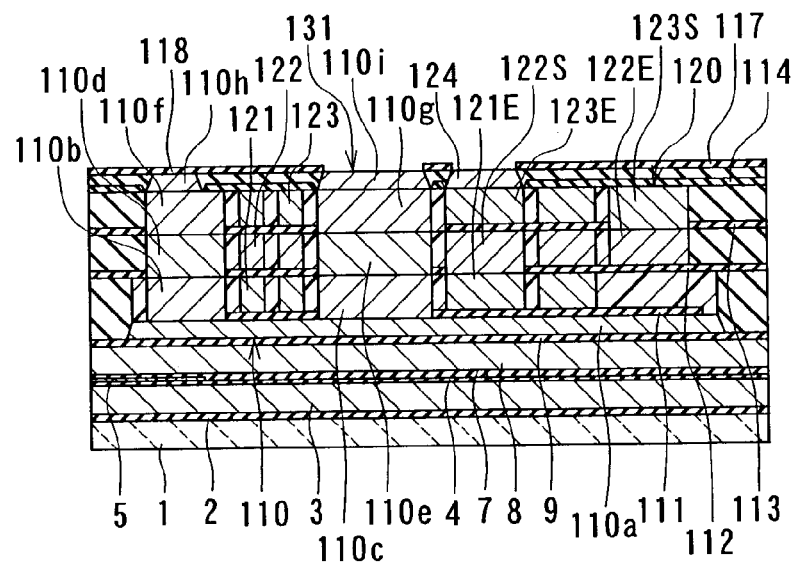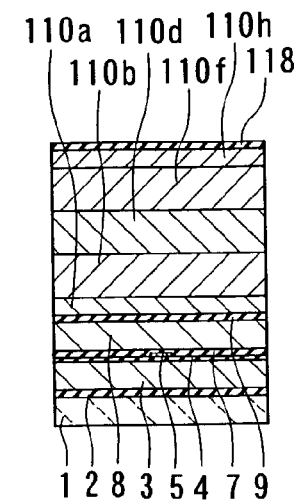
FIG. 57A  FIG. 57B
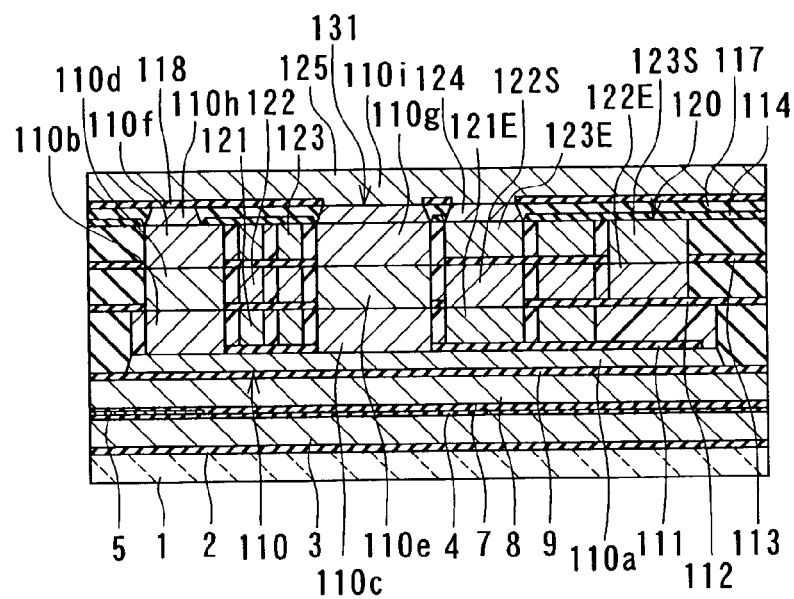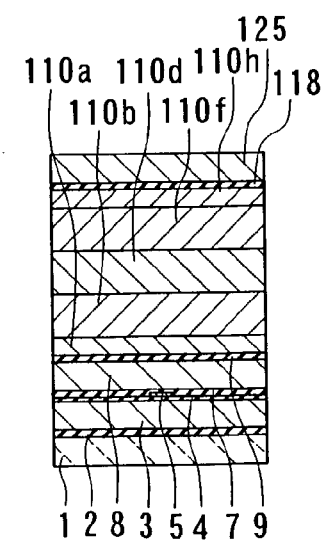
FIG. 58A  FIG. 58B

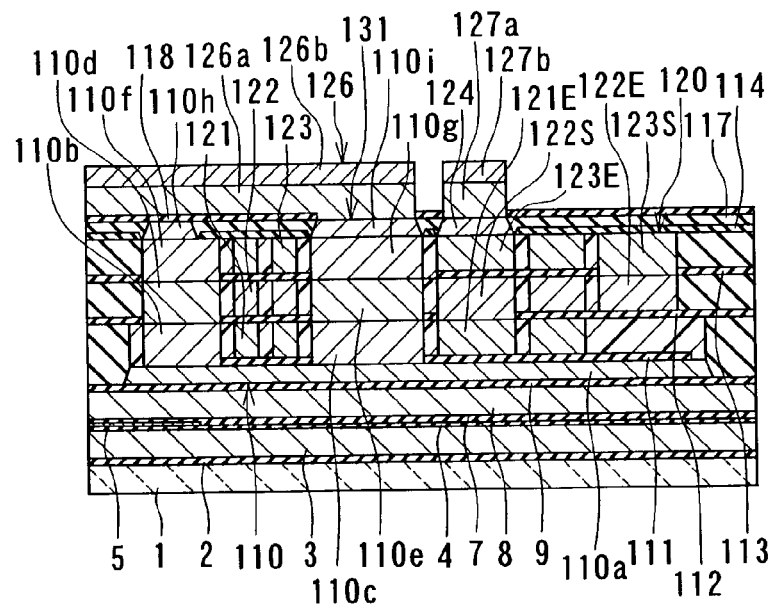
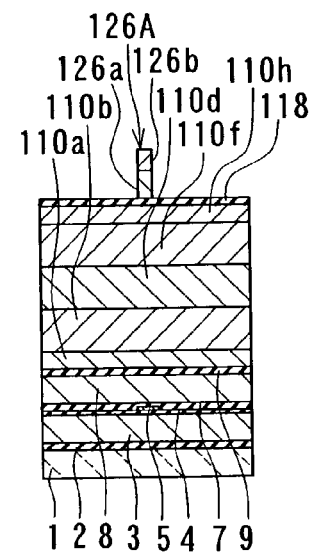
FIG. 59A          FIG. 59B
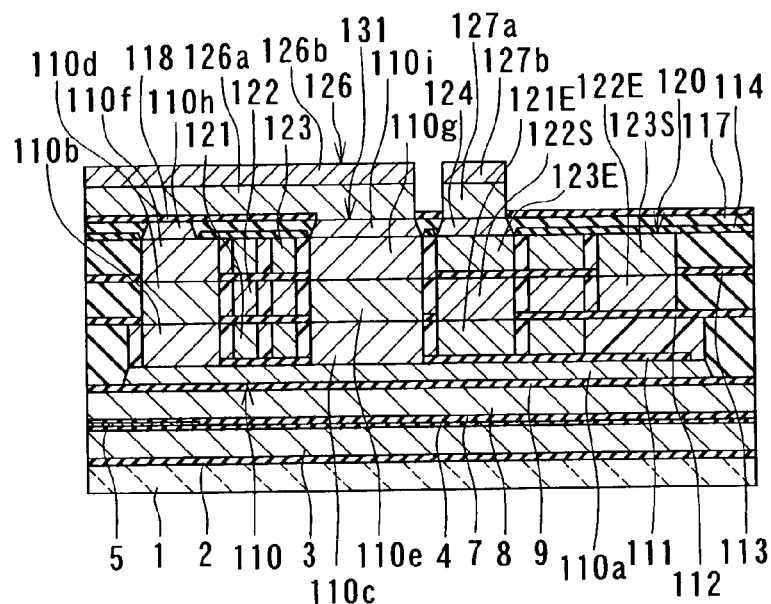
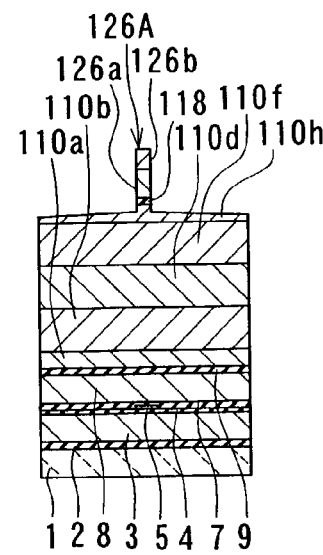
FIG. 60A          FIG. 60B

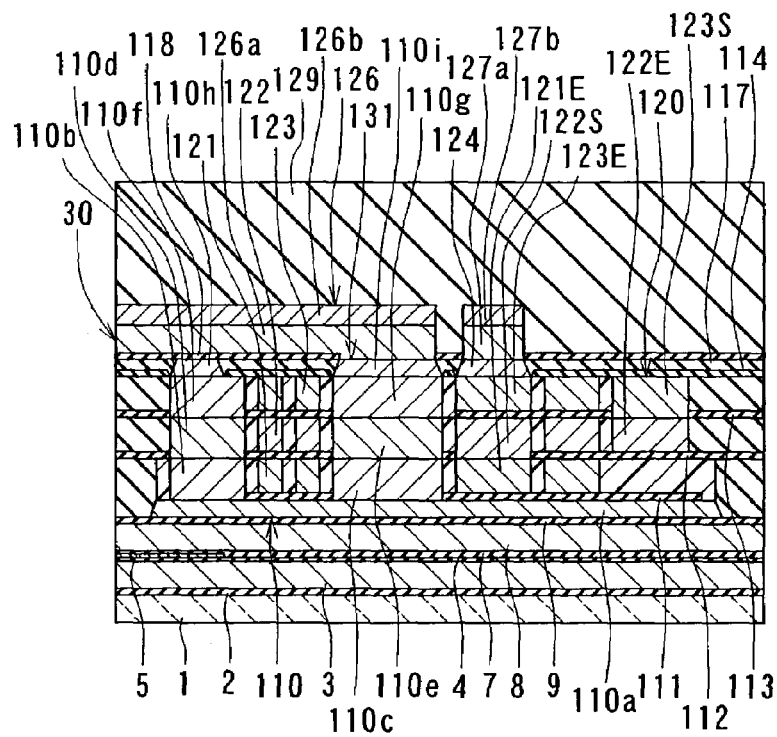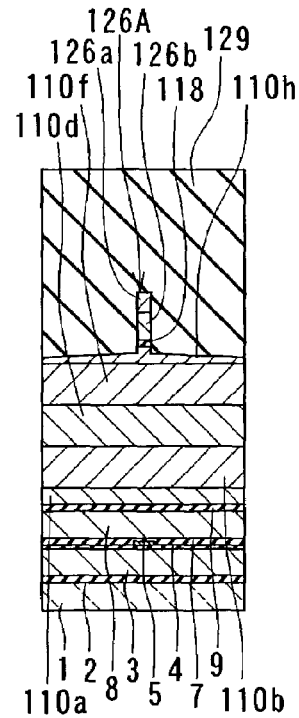
FIG. 61A FIG. 61B
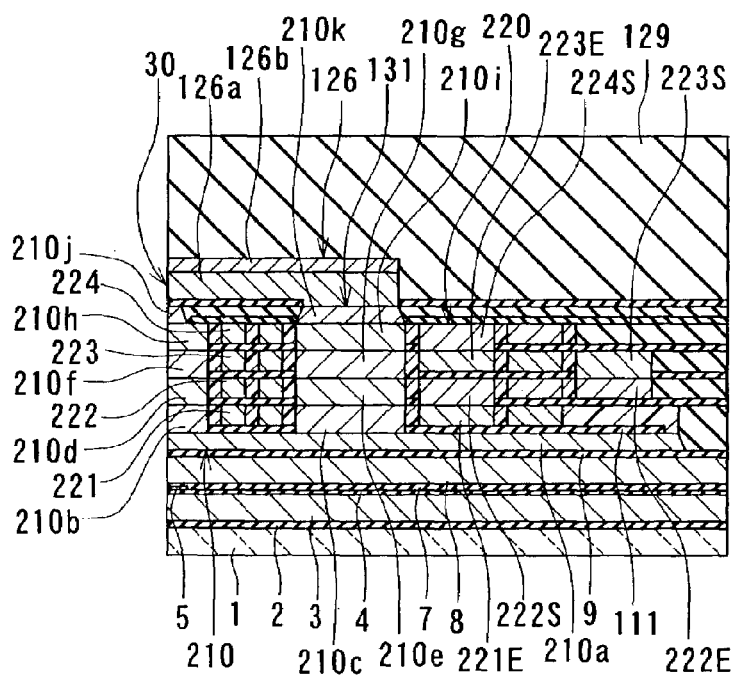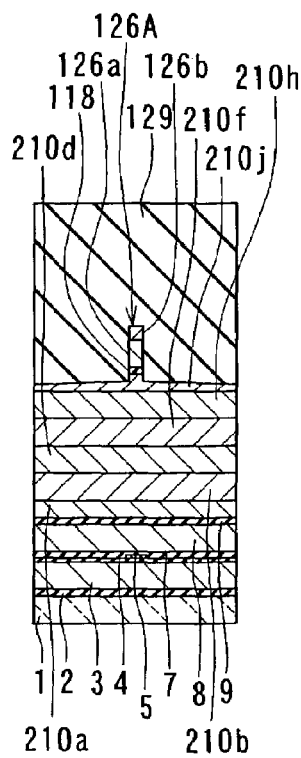
FIG. 62A FIG. 62B

THIN-FILM MAGNETIC HEAD AND METHOD OF MANUFACTURING SAME

BACKGROUND OF THE INVENTION

1. Field of the Invention

The present invention relates to a thin-film magnetic head having at least an induction-type electromagnetic transducer, and a method of manufacturing same.

2. Description of the Related Art

Recent years have seen significant improvements in the areal recording density of hard disk drives. In particular, areal recording densities of latest hard disk drives reach 80 to 100 GB/platter and are even on a pace to exceed that level. Thin-film magnetic heads are required of improved performance accordingly.

Among the thin-film magnetic heads, widely used are composite thin-film magnetic heads made of a layered structure including a recording head having an induction-type electromagnetic transducer for writing and a reproducing head having a magnetoresistive element (that may be hereinafter called an MR element) for reading.

In general, a recording head incorporates: a medium facing surface (air bearing surface) that faces toward a recording medium; a bottom pole layer and a top pole layer that are magnetically coupled to each other and include magnetic pole portions opposed to each other and located in regions of the pole layers on a side of the medium facing surface; a recording gap layer provided between the magnetic pole portions of the top and bottom pole layers; and a thin-film coil at least part of which is disposed between the top and bottom pole layers and insulated from the top and bottom pole layers. In the typical recording head, the bottom pole layer and the top pole layer are magnetically coupled to each other via a coupling portion which is located away from the medium facing surface. The thin-film coil has the shape of a flat spiral, being disposed around the coupling portion.

Higher track densities on a recording medium are essential to enhancing the recording density among the performances of a recording head. To achieve this, it is required to implement a recording head of a narrow track structure in which the track width, that is, the width of the two magnetic pole portions opposed to each other on a side of the medium facing surface, with the recording gap layer disposed in between, is reduced down to microns or the order of submicron. Semiconductor process techniques are utilized to achieve such a structure.

As the track width decreases, it becomes harder to generate a high-density magnetic flux between the two magnetic pole portions that are opposed to each other with the recording gap layer in between. On that account, it is desirable that the magnetic pole portions be made of a magnetic material having a higher saturation flux density.

When the frequency of the recording signal is raised to increase the recording density, recording heads require an improvement in the speed of change of flux, or equivalently, a reduction in flux rise time. The recording heads also require less degradation in such recording characteristics as an overwrite property and non-linear transition shift at high frequency bands. For improved recording characteristics at high frequency bands, the magnetic path length is preferably made smaller. The magnetic path length is determined chiefly by the length of a portion of the bottom or top pole layer lying between the coupling portion and the medium facing surface (referred to as yoke length in the present application). A reduction in yoke length is thus effective at reducing the magnetic path length. The yoke length is effectively reduced by decreasing the winding pitch of the thin-film coil, or the pitch of a portion of the winding which lies between the coupling portion and the medium facing surface, in particular.

One of known techniques for decreasing the winding pitch of a thin-film coil is to form a recess in the bottom pole layer so as to place the thin-film coil in the recess (see the specification of U.S. Pat. No. 6,043,959).

According to the method of manufacturing a thin-film magnetic head described in U.S. Pat. No. 6,043,959, the bottom pole layer, the top pole layer, and the thin-film coil are formed through the following steps. Initially, the bottom pole layer patterned into a predetermined shape is formed. A recording gap layer and a magnetic layer are then formed on the bottom pole layer in succession. Part of the magnetic layer is coupled to the bottom pole layer. Then, a mask is formed to cover portions of the magnetic layer where to form the magnetic pole portion of the top pole layer and where to form the coupling portion. The magnetic layer, the recording gap layer and the bottom pole layer are etched by using this mask. Consequently, the magnetic layer after the etching makes a pole portion layer that is to be the magnetic pole portion of the top pole layer, and a coupling layer that is to be the coupling portion. The above-mentioned etching also forms a trim structure, in which the magnetic pole portion of the top pole layer, the recording gap layer, and part of the bottom pole layer make vertical, self-aligned sidewalls. The etching also provides the bottom pole layer with a recess in which the thin-film coil is to be placed. An insulating film is then formed all over, and thereafter, the thin-film coil is formed by plating on the insulating film inside the recess. Then, a thick insulating layer is formed all over and the top surface of this insulating layer is flattened to expose the pole portion layer and the coupling layer of the top pole layer. On the flattened surface, a yoke portion layer of the top pole layer is formed so that the pole portion layer and the coupling layer are coupled to each other.

In the thin-film magnetic head described in the specification of U.S. Pat. No. 6,043,959, an end of the coupling portion closer to the medium facing surface has a part that extends linearly in parallel with the medium facing surface.

In the thin-film magnetic head described in the specification of U.S. Pat. No. 6,043,959, the end of the coupling portion closer to the medium facing surface has the part that extends linearly in parallel with the medium facing surface. In this thin-film magnetic head, the thin-film coil has a plurality of conductor portions (hereinafter referred to as linear conductor portions) that are arranged between the coupling portion and the medium facing surface so as to extend linearly in parallel with the medium facing surface. To reduce the yoke length of this thin-film magnetic head, the linear conductor portions must be made smaller in width. The longer the linear conductor portions are, the higher the resistance of the entire thin-film coil becomes. The shorter the linear conductor portions, the lower the resistance of the entire thin-film coil.

As described above, thin-film magnetic heads desirably have smaller yoke lengths for the sake of improved recording characteristics at high frequency bands. It is therefore effective to reduce the pitch of the portion of the thin-film coil winding which lies between the coupling portion and the medium facing surface. In conventional thin-film magnetic heads, however, a reduction in the above-mentioned pitch can decrease the width of the linear conductor portions and thus increase the resistance of the linear conductor portions. Since the conventional thin-film magnetic heads have linear conductor portions of relatively greater lengths, the resistance of the linear conductor portions occupies a considerable portion of the resistance of the entire thin-film coil, e.g., 60–70%. Under the circumstances, the conventional thin-film magnetic heads have had the problem that the thin-film coil increases in resistance when the yoke length is reduced to improve the recording characteristics at high frequency bands.

For improved recording characteristics of the thin-film magnetic heads, it is also desirable to increase the number of turns of the thin-film coil. Nevertheless, if the yoke length is reduced as described above and the number of turns of the thin-film coil is increased at the same time, the conventional thin-film magnetic heads become yet smaller in the width of the linear conductor portions with further increases in the resistance of the linear conductor portions and the resistance of the entire thin-film coil.

As the resistance of the thin-film coil increases, there arises a problem that the magnetic pole portions can protrude toward the recording medium due to heat occurring from the thin-film coil so that the magnetic pole portions are more likely to collide with the recording medium.

Thus, in the conventional thin-film magnetic heads, it has been unfeasible to reduce the yoke length considerably from the viewpoint of avoiding the problem that occurs from an increase in the resistance of the thin-film coil.

As mentioned above, for the sake of improved recording characteristics of the thin-film magnetic heads, it is also desirable to increase the number of turns of the thin-film coil. In the conventional thin-film magnetic heads, however, the turns of winding of the thin-film coil increase in length of the linear conductor portions as the turns are closer to the outer periphery of the winding. Thus, when the number of turns of the thin-film coil is increased, the thin-film coil becomes greater in resistance as well as in the area which the thin-film coil occupies. The increase in the area makes it difficult to obtain smaller thin-film magnetic heads.

In the conventional thin-film magnetic heads, the width of the linear conductor portions must be reduced for the sake of a smaller yoke length. As the width of the linear conductor portions decreases, however, it becomes difficult to form the linear conductor portions with precision, as will be discussed later.

In general, the thin-film coil is formed by frame plating through the following steps. Initially, a photoresist frame is formed by photolithography. Then, a thin electrode film is formed to cover this frame. With an electric current passed through this electrode film, the thin-film coil is formed by electroplating. When the thin-film coil is to be formed in a recess of the bottom pole layer, the frame must be formed on the uneven bottom pole layer. When the frame is formed by photolithography on such an uneven base, rays of light used for exposure of photolithography are reflected off the electrode film lying on the sidewalls of the recess. The photoresist is exposed to the reflected rays as well. For that reason, it is difficult to form a fine frame precisely on an uneven base by photolithography.

Consequently, for example, if a thin-film coil having a thickness of 1.5 µm or more and having linear conductor portions of 0.3 µm or less in width or 0.5 µm or less in pitch is to be formed in the recess of the bottom pole layer by the existing photolithography techniques, the yield of the thin-film coil becomes extremely low, and therefore it is practically difficult to form such a coil.

OBJECT AND SUMMARY OF THE INVENTION

It is an object of the invention to provide a thin-film magnetic head which is small in magnetic path length and thus excellent in recording characteristics at high frequency bands and which also has a thin-film coil of small resistance, and a method of manufacturing the same.

A thin-film magnetic head of the invention comprises:

a medium facing surface that faces toward a recording medium;

first and second pole layers that include magnetic pole portions opposed to each other and located in regions of the pole layers on a side of the medium facing surface;

a coupling portion for establishing magnetic coupling between the first pole layer and the second pole layer, the coupling portion being located away from the medium facing surface and including at least either one of a part of the first pole layer and a part of the second pole layer;

a gap layer interposed between the magnetic pole portion of the first pole layer and the magnetic pole portion of the second pole layer; and a thin-film coil disposed around the coupling portion, at least part of the thin-film coil being interposed between the first and second pole layers and insulated from the first and second pole layers.

In the thin-film magnetic head of the invention, the thin-film coil has a flat conductive layer of two or less turns. Consequently, according to the thin-film magnetic head of the invention, it is possible to reduce the resistance of the thin-film coil while shortening the magnetic path length.

In the thin-film magnetic head of the invention, the coupling portion may have an end face facing toward the medium facing surface, the end face including a curved surface convex toward the medium facing surface. In this case, the end face of the coupling portion may have a shape of a part of a cylindrical surface.

In the thin-film magnetic head of the invention, the conductive layer may include a portion located between the end face of the coupling portion and the medium facing surface, and the portion may have a minimum width of the conductive layer at a position on a virtual line connecting the end face of the coupling portion and the medium facing surface in the shortest distance, and may increase in width with distance from the virtual line. In this case, an inner periphery of the portion of the conductive layer may have a shape of an arc having a first radius of curvature; and an outer periphery of the portion of the conductive layer may have a shape of an arc having a second radius of curvature greater than the first radius of curvature. Alternatively, an inner periphery of the portion of the conductive layer may have a shape of an arc having a first radius of curvature; and an outer periphery of the portion of the conductive layer may include a linear portion located in a predetermined region covering the position on the virtual line, and two arc portions connected to respective ends of the linear portion, the two arc portions having a second radius of curvature greater than the first radius of curvature.

In the thin-film magnetic head of the invention, the conductive layer may include a first portion and a second portion arranged between the end face of the coupling portion and the medium facing surface, the second portion being located outside the first portion. Of the first and second portions, at least the first portion may have a minimum width of the conductive layer at a position on a virtual line connecting the end face of the coupling portion and the medium facing surface in the shortest distance, and may increase in width with distance from the virtual line.

An inner periphery of the first portion may have a shape of an arc having a first radius of curvature; an outer periphery of the first portion may have a shape of an arc having a second radius of curvature greater than the first radius of curvature; an inner periphery of the second portion may have a shape of an arc having a third radius of curvature greater than the second radius of curvature; and an outer periphery of the second portion may have a shape of an arc having a fourth radius of curvature greater than the third radius of curvature.

Alternatively, an inner periphery of the first portion may have a shape of an arc having a first radius of curvature; an outer periphery of the first portion may have a shape of an arc having a second radius of curvature greater than the first radius of curvature; an inner periphery of the second portion may have a shape of an arc having a third radius of curvature greater than the second radius of curvature; and an outer periphery of the second portion may include a linear portion located in a predetermined region covering the position on the virtual line, and two arc portions connected to respective ends of the linear portion, the two arc portions having a fourth radius of curvature greater than the third radius of curvature.

Alternatively, an inner periphery of the first portion may have a shape of an arc having a first radius of curvature; an outer periphery of the first portion may include a first linear portion located in a predetermined region covering the position on the virtual line, and two arc portions connected to respective ends of the first linear portion, the two arc portions having a second radius of curvature greater than the first radius of curvature; an inner periphery of the second portion may include a second linear portion located in a predetermined region covering the position on the virtual line, and two arc portions connected to respective ends of the second linear portion, the two arc portions having a third radius of curvature greater than the second radius of curvature; an outer periphery of the second portion may include a third linear portion located in a predetermined region covering the position on the virtual line, and two arc portions connected to respective ends of the third linear portion, the two arc portions having a fourth radius of curvature greater than the third radius of curvature; and the second linear portion may have a length greater than or equal to that of the first linear portion, and the third linear portion is longer than the second linear portion.

In the thin-film magnetic head of the invention, the thin-film coil may have a plurality of conductive layers, and the plurality of conductive layers may be laminated and electrically connected to each other. The plurality of conductive layers may include a lowermost conductive layer, an uppermost conductive layer, and one or more intermediate conductive layers interposed therebetween. The lowermost conductive layer may have a connecting portion to be connected to the intermediate conductive layer located thereover; the uppermost conductive layer may have a connecting portion to be connected to the intermediate conductive layer located thereunder; and the intermediate conductive layer may have two connecting portions to be connected to two other conductive layers located thereunder and thereover. The connecting portions of the lowermost conductive layer, the uppermost conductive layer, and the intermediate conductive layer may each be located at either one of two positions farther from the medium facing surface than the coupling portion is. A center of the coupling portion and the two positions at which the connecting portions are located may be aligned on a line.

In the thin-film magnetic head of the invention, the first pole layer may have a first layer opposed to the thin-film coil, a second layer connected to the first layer near the medium facing surface, and a third layer connected to the first layer, the third layer including at least a part of the coupling portion. A part of the conductive layer may be disposed between the second layer and the third layer. In this case, the second pole layer may be a flat layer.

A thin-film magnetic head manufactured by a method of manufacturing a thin-film magnetic head of the invention comprises:

a medium facing surface that faces toward a recording medium;

first and second pole layers that include magnetic pole portions opposed to each other and located in regions of the pole layers on a side of the medium facing surface;

a coupling portion for establishing magnetic coupling between the first pole layer and the second pole layer, the coupling portion being located away from the medium facing surface and including at least either one of a part of the first pole layer and a part of the second pole layer;

a gap layer interposed between the magnetic pole portion of the first pole layer and the magnetic pole portion of the second pole layer; and a thin-film coil disposed around the coupling portion, at least part of the thin-film coil being interposed between the first and second pole layers and insulated from the first and second pole layers.

The method of manufacturing a thin-film magnetic head of the invention comprises the steps of:

forming the first pole layer;

forming the thin-film coil on the first pole layer;

forming the gap layer on the magnetic pole portion of the first pole layer;

forming the second pole layer on the gap layer and the thin-film coil.

In the method of manufacturing a thin-film magnetic head of the invention, one of the steps of forming the first pole layer and forming the second pole layer includes the step of forming the coupling layer, and the thin-film coil has a flat conductive layer of two or less turns. Consequently, in the thin-film magnetic head, it is possible to reduce the resistance of the thin-film coil while shortening the magnetic path length.

In the method of manufacturing a thin-film magnetic head of the invention, the coupling portion may have an end face facing toward the medium facing surface, the end face including a curved surface convex toward the medium facing surface. In this case, the conductive layer may include a portion located between the end face of the coupling portion and the medium facing surface. The portion may have a minimum width of the conductive layer at a position on a virtual line connecting the end face of the coupling portion and the medium facing surface in the shortest distance, and may increase in width with distance from the virtual line. Alternatively, the conductive layer may include a first portion and a second portion arranged between the end face of the coupling portion and the medium facing surface, the second portion being located outside the first portion. Of the first and second portions, at least the first portion may have a minimum width of the conductive layer at a position on a virtual line connecting the end face of the coupling portion and the medium facing surface in the shortest distance, and may increase in width with distance from the virtual line.

In the method of manufacturing a thin-film magnetic head of the invention, the thin-film coil may have a plurality of conductive layers, and, in the step of forming the thin-film coil, the plurality of conductive layers may be formed so as to be laminated and electrically connected to each other.

In the method of manufacturing a thin-film magnetic head of the invention, the step of forming the first pole layer may form a first layer opposed to the thin-film coil, a second layer connected to the first layer near the medium facing surface, and a third layer connected to the first layer, the third layer including at least a part of the coupling portion. In the step of forming the thin-film coil, a part of the conductive layer may be disposed between the second layer and the third layer.

Other and further objects, features and advantages of the invention will appear more fully from the following description.

BRIEF DESCRIPTION OF THE DRAWINGS

FIGS. 1A and 1B are cross sections for illustrating a step in a method of manufacturing a thin-film magnetic head according to a first embodiment of the invention.

FIGS. 2A and 2B are cross sections for illustrating a step that follows FIGS. 1A and 1B.

FIGS. 3A and 3B are cross sections for illustrating a step that follows FIGS. 2A and 2B.

FIGS. 4A and 4B are cross sections for illustrating a step that follows FIGS. 3A and 3B.

FIGS. 5A and 5B are cross sections for illustrating a step that follows FIGS. 4A and 4B.

FIGS. 6A and 6B are cross sections for illustrating a step that follows FIGS. 5A and 5B.

FIGS. 7A and 7B are cross sections for illustrating a step that follows FIGS. 6A and 6B.

FIGS. 8A and 8B are cross sections for illustrating a step that follows FIGS. 7A and 7B.

FIGS. 9A and 9B are cross sections for illustrating a step that follows FIGS. 8A and 8B.

FIGS. 10A and 10B are cross sections for illustrating a step that follows FIGS. 9A and 9B.

FIGS. 11A and 11B are cross sections for illustrating a step that follows FIGS. 10A and 10B.

FIGS. 12A and 12B are cross sections for illustrating a step that follows FIGS. 11A and 11B.

FIGS. 30A and 30B are cross sections for illustrating a step in a method of manufacturing a thin-film magnetic head according to a second embodiment of the invention.

FIGS. 31A and 31B are cross sections for illustrating a step that follows FIGS. 30A and 30B.

FIGS. 32A and 32B are cross sections for illustrating a step that follows FIGS. 31A and 31B.

FIGS. 33A and 33B are cross sections for illustrating a step that follows FIGS. 32A and 32B.

FIGS. 34A and 34B are cross sections for illustrating a step that follows FIGS. 33A and 33B.

FIGS. 35A and 35B are cross sections for illustrating a step that follows FIGS. 34A and 34B.

FIGS. 36A and 36B are cross sections for illustrating a step that follows FIGS. 35A and 35B.

FIGS. 37A and 37B are cross sections for illustrating a step that follows FIGS. 36A and 36B.

FIGS. 46A and 46B are cross sections for illustrating a step in a method of manufacturing a thin-film magnetic head according to a third embodiment of the invention.

FIGS. 47A and 47B are cross sections for illustrating a step that follows FIGS. 46A and 46B.

FIGS. 48A and 48B are cross sections for illustrating a step that follows FIGS. 47A and 47B.

FIGS. 49A and 49B are cross sections for illustrating a step that follows FIGS. 48A and 48B.

FIGS. 50A and 50B are cross sections for illustrating a step that follows FIGS. 49A and 49B.

FIGS. 51A and 51B are cross sections for illustrating a step that follows FIGS. 50A and 50B.

FIGS. 52A and 52B are cross sections for illustrating a step that follows FIGS. 51A and 51B.

FIGS. 53A and 53B are cross sections for illustrating a step that follows FIGS. 52A and 52B.

FIGS. 54A and 54B are cross sections for illustrating a step that follows FIGS. 53A and 53B.

FIGS. 55A and 55B are cross sections for illustrating a step that follows FIGS. 54A and 54B.

FIGS. 56A and 56B are cross sections for illustrating a step that follows FIGS. 55A and 55B.

FIGS. 57A and 57B are cross sections for illustrating a step that follows FIGS. 56A and 56B.

FIGS. 58A and 58B are cross sections for illustrating a step that follows FIGS. 57A and 57B.

FIGS. 59A and 59B are cross sections for illustrating a step that follows FIGS. 58A and 58B.

FIGS. 60A and 60B are cross sections for illustrating a step that follows FIGS. 59A and 59B.

FIGS. 61A and 61B are cross sections for illustrating a step that follows FIGS. 60A and 60B.

FIGS. 62A and 62B are cross sections for illustrating a step in a method of manufacturing a thin-film magnetic head of a modified example of the third embodiment of the invention.

DETAILED DESCRIPTION OF THE PREFERRED EMBODIMENTS

Embodiments of the invention will now be described in detail with reference to the accompanying drawings.

First Embodiment

Figures 14A, 14B:
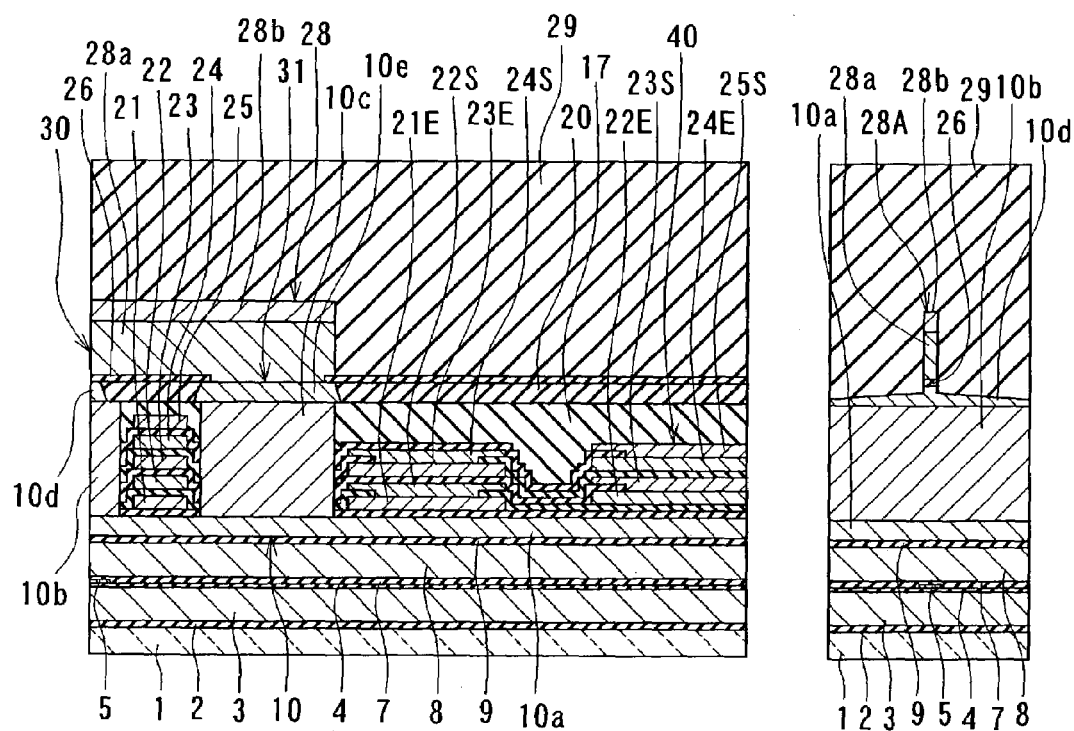
FIGS. 14A and 14B are cross sections for illustrating a step that follows FIGS. 13A and 13B.
Figure 15:
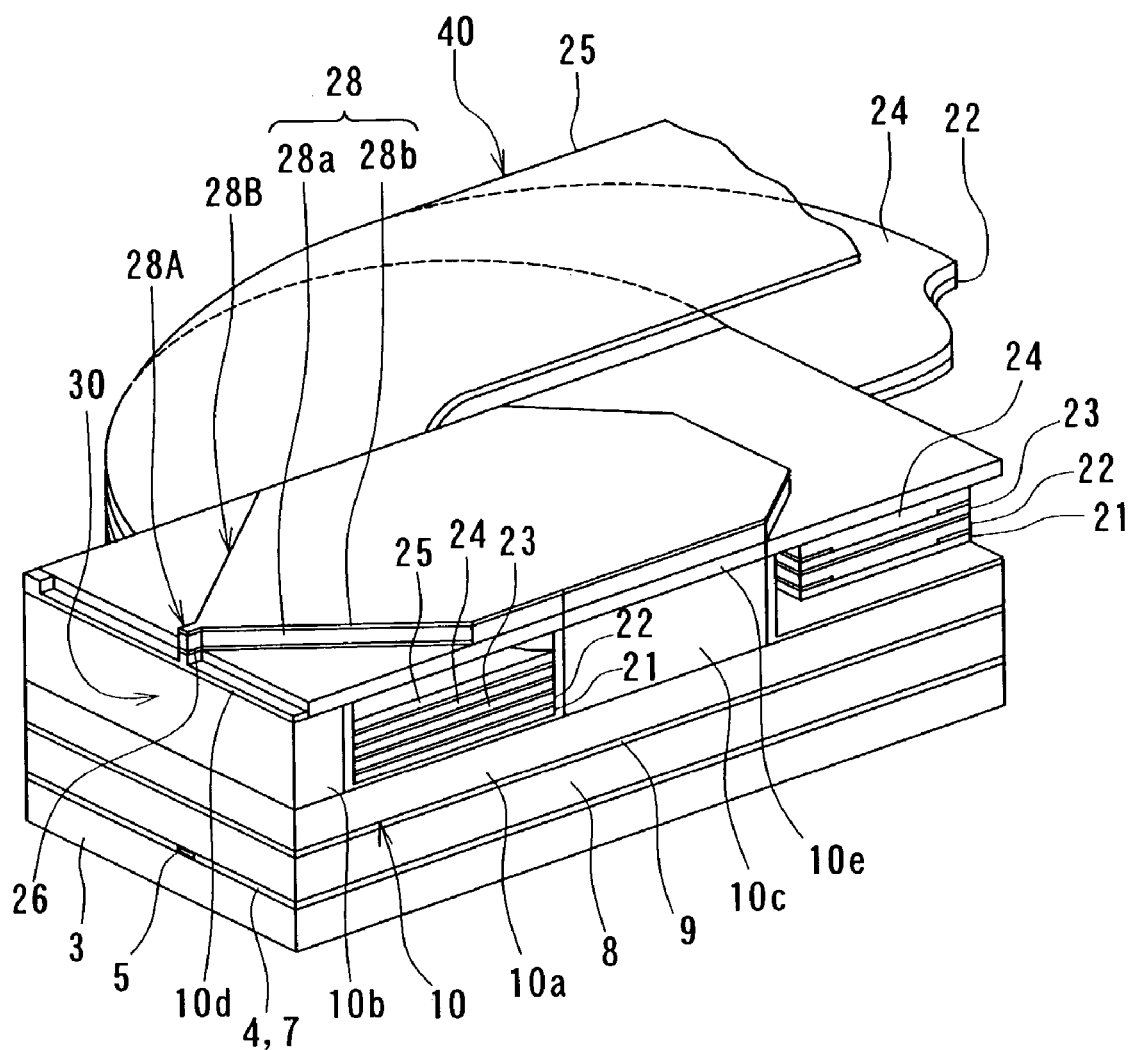
FIG. 15 is a perspective view of the thin-film magnetic head according to the first embodiment of the invention.

First, a method of manufacturing a thin-film magnetic head according to a first embodiment of the invention will now be described with reference to FIGS. 1A to 14A, FIGS. 1B to 14B, and FIG. 15 to FIG. 20. FIGS. 1A to 14A are cross sections each orthogonal to the air bearing surface and the top surface of the substrate. FIGS. 1B to 14B are cross sections of the magnetic pole portion each parallel to the air bearing surface. FIG. 15 is a perspective view showing the thin-film magnetic head according to the present embodiment excluding an overcoat layer. FIG. 16 to FIG. 20 are plan views for explaining the method of forming a thin-film coil of the present embodiment.

In the method of manufacturing the thin-film magnetic head of the present embodiment, as shown in FIGS. 1A and 1B, an insulating layer 2 made of alumina ($Al_2O_3$), for example, is first deposited to a thickness of about 1 to 3 µm on a substrate 1 made of aluminum oxide and titanium carbide ($Al_2O_3$—TiC), for example. On the insulating layer 2, a bottom shield layer 3 of a magnetic material such as Permalloy (NiFe) is formed to a thickness of about 2 to 3 µm for making a reproducing head. The bottom shield layer 3 is selectively formed on the insulating layer 2 by plating using a photoresist film as a mask, for example. Then, although not shown, an insulating layer made of alumina, for example, is formed all over to a thickness of 3 to 4 µm, for example. The insulating layer is then polished through chemical mechanical polishing (hereinafter referred to as CMP), for example, to expose the bottom shield layer 3, and the surface is thereby flattened.

On the bottom shield layer 3, a bottom shield gap film 4 serving as an insulating film is formed to a thickness of about 20 to 40 nm, for example. On the bottom shield gap film 4, an MR element 5 for magnetic signal detection is formed to a thickness of tens of nanometers. For example, the MR element 5 may be formed by selectively etching an MR film formed by sputtering. The MR element 5 is located near a region where to form an air bearing surface to be described later. The MR element 5 may be an element utilizing a magnetosensitive film that exhibits magnetoresistivity, such as an AMR element, a GMR element or a TMR (tunnel magnetoresistive) element. Next, although not shown, a pair of electrode layers to be electrically connected to the MR element 5 are formed to a thickness of tens of nanometers on the bottom shield gap film 4. Then, a top shield gap film 7 serving as an insulating film is formed to a thickness of about 20 to 40 nm, for example, on the bottom shield gap film 4 and the MR element 5. The MR element 5 is embedded in the shield gap films 4 and 7. Examples of insulating materials to be used for the shield gap films 4 and 7 include alumina, aluminum nitride, and diamond-like carbon (DLC). The shield gap films 4 and 7 may be formed by sputtering or chemical vapor deposition (hereinafter referred to as CVD).

On the top shield gap film 7, a top shield layer 8 made of a magnetic material is selectively formed to a thickness of approximately 1.0 to 1.5 µm for the reproducing head. Then, an insulating layer 9 made of alumina, for example, is formed to a thickness of approximately 0.15 to 0.3 µm over the entire top surface of the laminate obtained through the foregoing steps. Next, a first layer 10a of a bottom pole layer 10 is formed to a thickness of approximately 0.4 to 0.8 µm over the entire top surface of the laminate. The bottom pole layer 10 includes the first layer 10a, and second to fifth layers 10b, 10c, 10d and 10e to be described later.

The first layer 10a is formed of a high saturation flux density material such as FeAlN, FeN, FeCo, CoFeN, and FeZrN by sputtering. The first layer 10a may also be formed by plating, using NiFe (Ni: 80 weight %; Fe: 20 weight %), NiFe (Ni: 45 weight %; Fe: 55 weight %) that is a high saturation flux density material, or FeCo (Fe: 67 weight %; Co: 33 weight %).

Next, as shown in FIGS. 2A and 2B, an insulating film 11 made of alumina, for example, is formed to a thickness of 0.2 µm on the first layer 10a. The insulating film 11 is then selectively etched to form openings in the insulating film 11 at positions where to form the second layer 10b and the third layer 10c.

Next, a first layer portion 21 of the thin-film coil is formed on the insulating film 11. Here, the method of forming the first layer portion 21 will be described in conjunction with three examples thereof.

In a first example, a conductive film made of Cu, for example, is formed over the entire top surface of the laminate to a thickness of 200 to 350 nm by sputtering. Next, an etching mask made of a photoresist is formed by photolithography on the conductive film at a region where to form the first layer portion 21. The conductive film is then etched by, for example, ion beam etching using the foregoing etching mask. Consequently, the remaining portion of the conductive film makes the first layer portion 21.

In a second example, a lift-off mask having a T-shaped cross section is formed on the laminate by, for example, patterning a double-layer resist film. This mask is disposed in regions other than where to form the first layer portion 21. A conductive film made of Cu, for example, is formed over the entire top surface of the laminate by sputtering. The mask is then lifted off. Consequently, the remaining conductive film makes the first layer portion 21.

In a third example, an electrode film made of Cu, for example, is formed over the entire top surface of the laminate to a thickness of, for example, 50 nm by sputtering. A frame made of a photoresist is formed on the electrode film by photolithography. This frame has an opening in the region where to form the first layer portion 21. An electric current is passed through the electrode film for electroplating to form a plating layer made of Cu, for example, to a thickness of 300 to 400 nm. After the frame is removed, the electrode film is etched by, for example, ion beam etching using the plating layer as a mask. Consequently, the electrode film is removed at portions other than the portion lying under the plating layer, and the plating layer is adjusted to a thickness of 250 to 350 nm. The remaining portion of the electrode film and the plating layer make the first layer portion 21.

When the first layer portion 21 is formed by sputtering as in the first or second example, the sheet resistivity of the first layer portion 21 can be made smaller than when the first layer portion 21 is formed by plating as in the third example. In the first or second example, the first layer portion 21 made of Cu has a sheet resistivity of 1.7 Ω/square, for example. In the third example, the first layer portion 21 made of Cu has a sheet resistivity of 1.8 to 2.0 Ω/square, for example.

Figure 16:
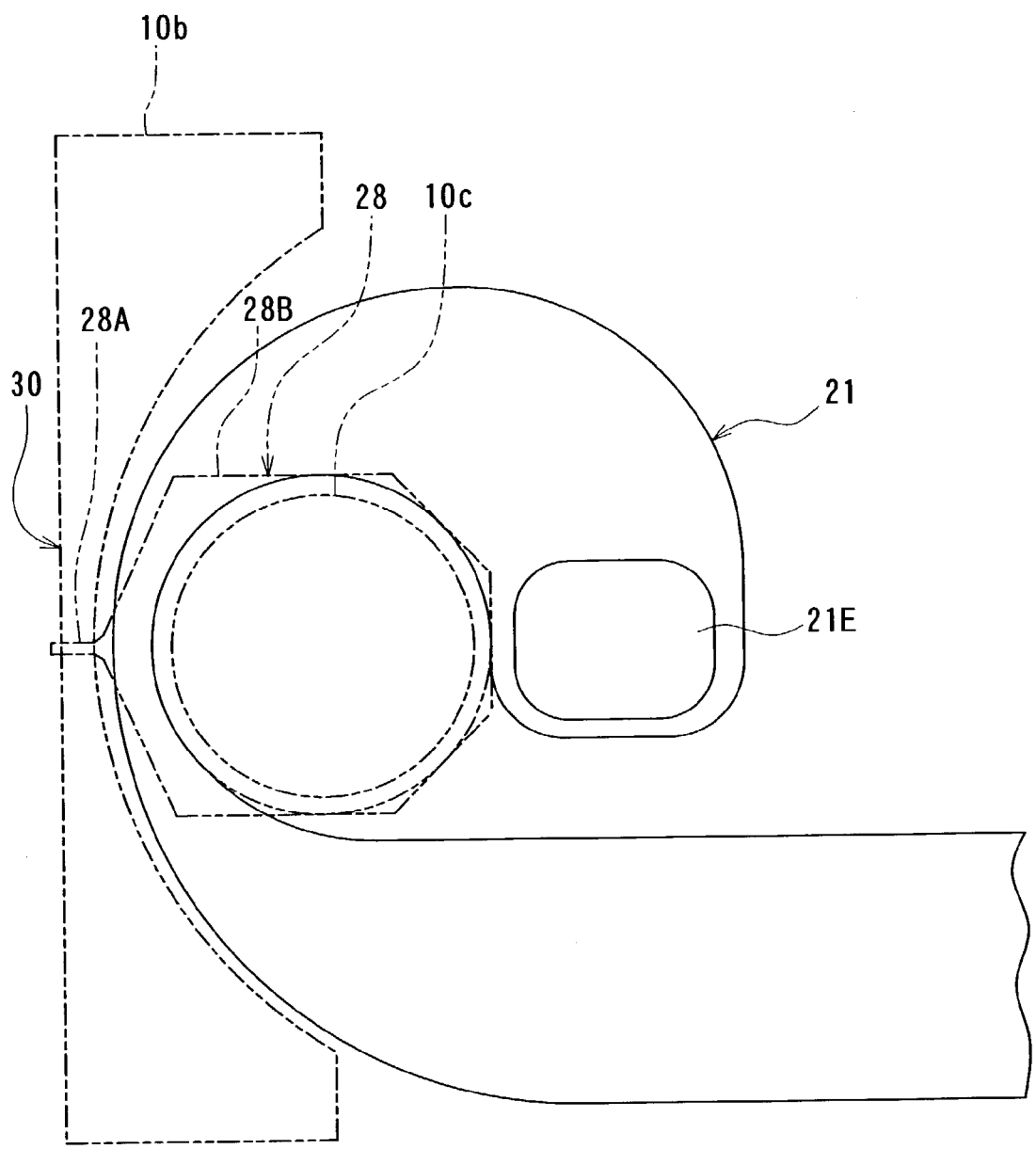
FIG. 16 is a plan view showing a first layer portion of the thin-film coil in the first embodiment of the invention.

FIG. 16 is a plan view showing the first layer portion 21. FIG. 16 also shows the second layer 10b, the third layer 10c, a top pole layer 28, and an air bearing surface 30 to be formed later. The first layer portion 21 is a flat conductive layer of a single turn. The first layer portion 21 has a connecting portion 21E near one of its ends, which is to be connected to a second layer portion 22 of the thin-film coil to be formed later. The connecting portion 21E is located at a first position farther from the air bearing surface 30 than the third layer 10c is. The other end of the first layer portion 21 is connected to a single electrode pad to be described later.

Next, an insulating film 12 made of alumina, for example, is formed over the entire top surface of the laminate to a thickness of 80 to 120 nm by sputtering or CVD. The insulating film 12 is selectively removed at portions corresponding to the regions where to dispose the second layer 10b and the third layer 10c and at a portion lying over the connecting portion 21E by ion beam etching or reactive ion etching (hereinafter, referred to as RIE), for example. Consequently, a contact hole is formed over the connecting portion 21E.

Figure 17:
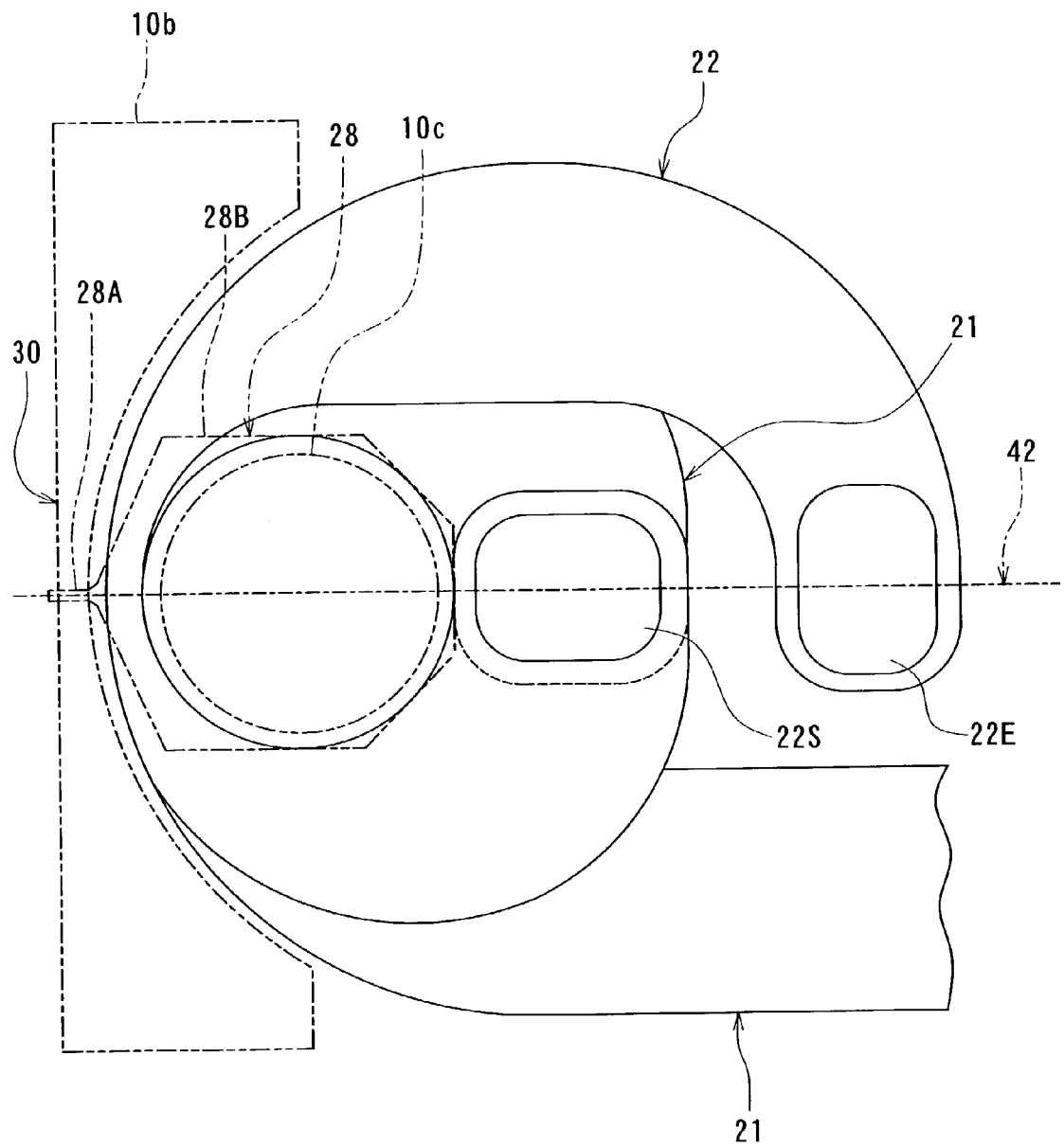
FIG. 17 is a plan view showing a second layer portion of the thin-film coil in the first embodiment of the invention.

Next, as shown in FIGS. 3A and 3B, a second layer portion 22 is formed on the insulating film 12. FIG. 17 is a plan view showing the second layer portion 22. FIG. 17 also shows the second layer 10b, the third layer 10c, the top pole layer 28, and the air bearing surface 30 to be formed later. The second layer portion 22 is a flat conductive layer of a single turn. The method for forming the second layer portion 22 is the same as that for forming the first layer portion 21. The second layer portion 22 has a connecting portion 22S near one of its ends, and a connecting portion 22E near the other end. The connecting portion 22S is connected to the connecting portion 21E of the first layer portion 21 through the contact hole. The connecting portion 22E is connected to a third layer portion 23 of the thin-film coil to be formed later. The connecting portion 22E is located at a second position which is farther from the air bearing surface 30 than the third layer 10c is and farther from the air bearing surface 30 than the connecting portion 21E shown in FIG. 16 is. As shown in FIG. 17, the center of the third layer 10c and the centers of the connecting portions 21E, 22E are aligned on a line 42 which is perpendicular to the air bearing surface 30. The connecting portion 21E lies under the connecting portion 22S.

Next, an insulating film 13 is formed by the same method as that for the insulating film 12. The insulating film 13 is selectively removed at portions corresponding to the regions where to dispose the second layer 10b and the third layer 10c and at a portion lying over the connecting portion 22E by ion beam etching or RIE, for example. Consequently, a contact hole is formed over the connecting portion 22E.

Figure 18:
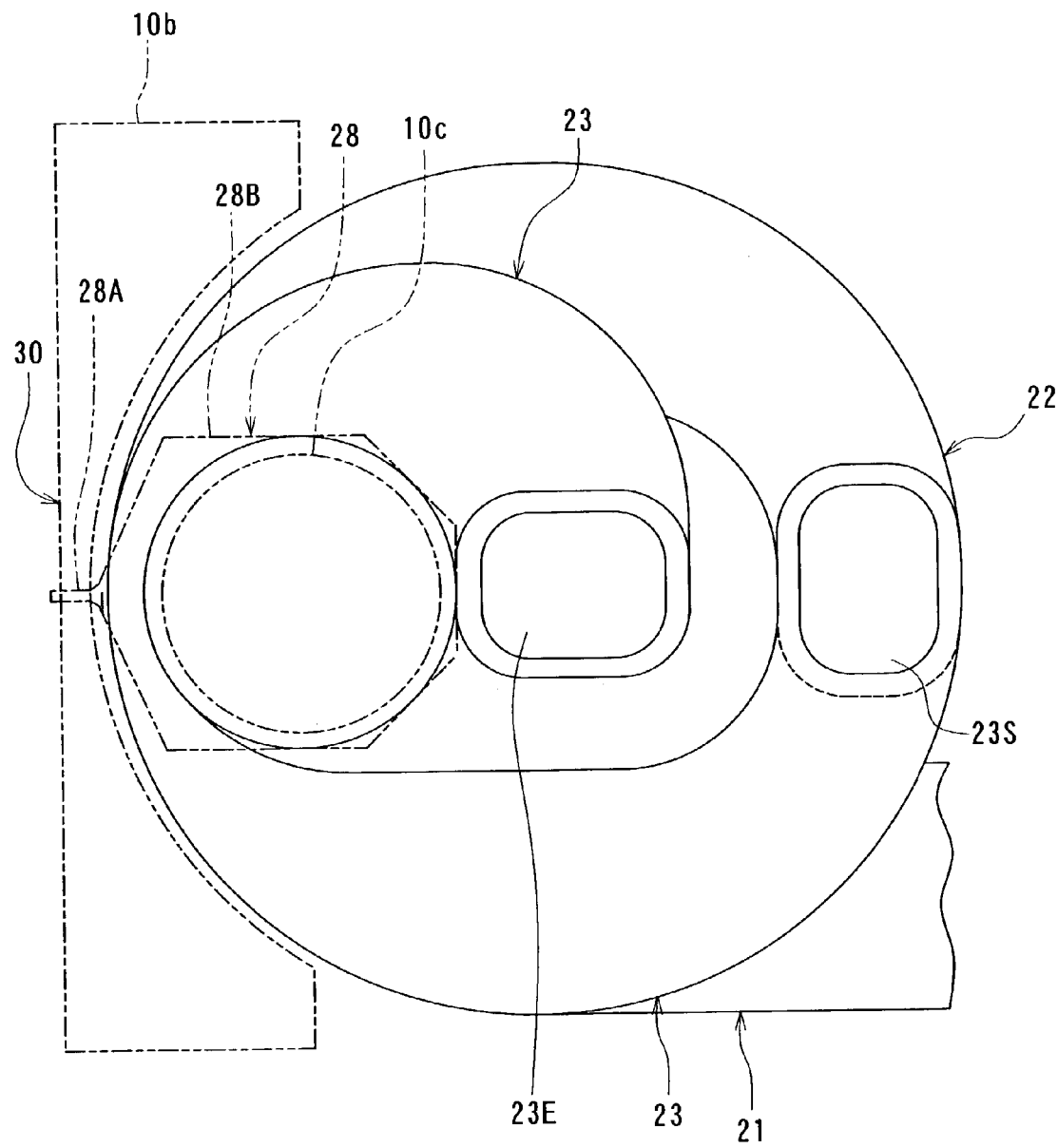
FIG. 18 is a plan view showing a third layer portion of the thin-film coil in the first embodiment of the invention.

Next, as shown in FIGS. 4A and 4B, a third layer portion 23 is formed on the insulating film 13. FIG. 18 is a plan view showing the third layer portion 23. FIG. 18 also shows the second layer 10b, the third layer 10c, the top pole layer 28, and the air bearing surface 30 to be formed later. The third layer portion 23 is a flat conductive layer of a single turn. The third layer portion 23 is formed by the same method as that for the first layer portion 21. The third layer portion 23 has a connecting portion 23S near one of its ends, and a connecting portion 23E near the other end. The connecting portion 23S is connected to the connecting portion 22E of the second layer portion 22 through the contact hole. The connecting portion 23E is connected to a fourth layer portion 24 of the thin-film coil to be formed later. The connecting portion 23E lies over the connecting portion 22S via the insulating film 13.

Figure 20:
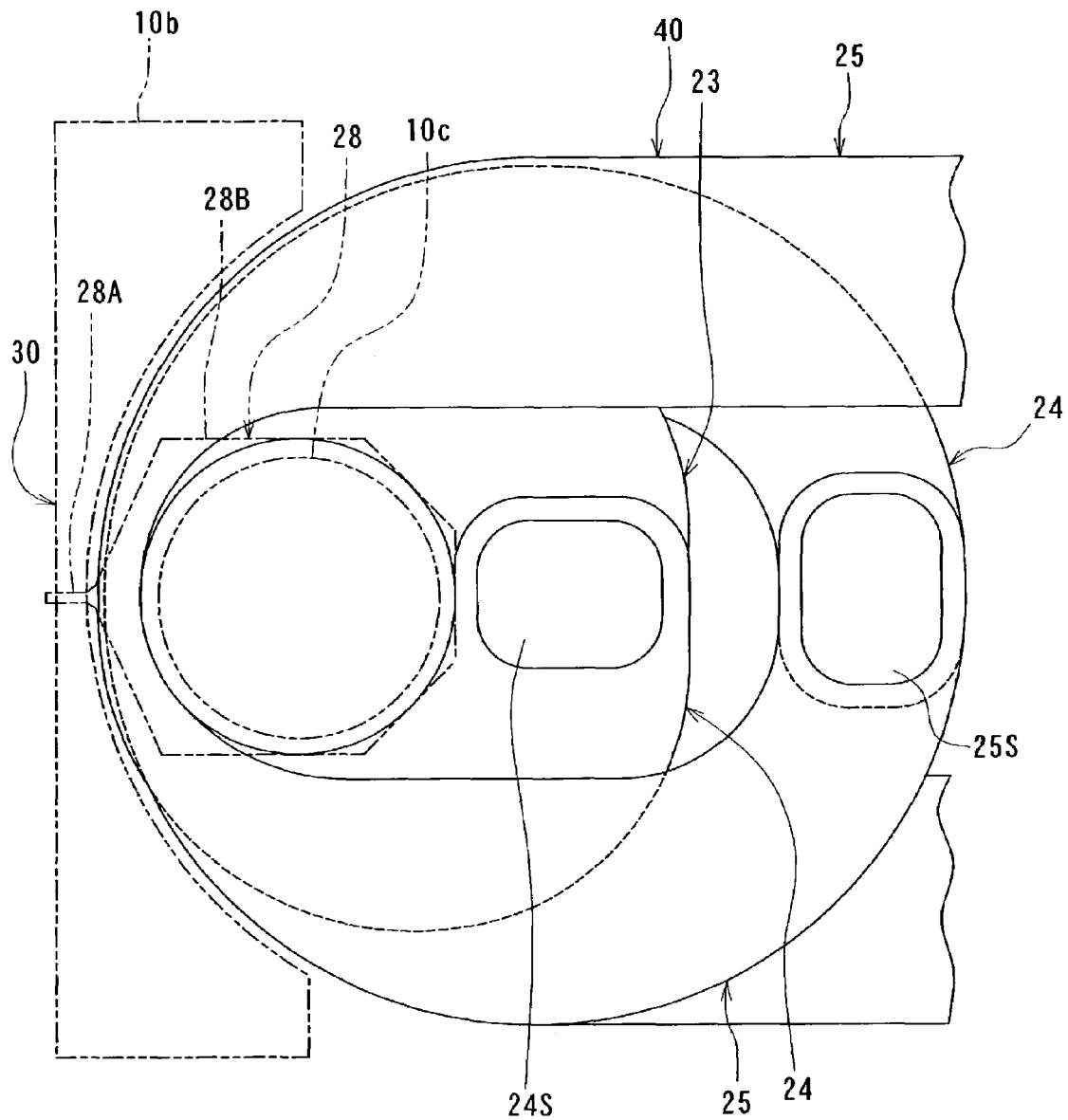
FIG. 20 is a plan view showing a fifth layer portion of the thin-film coil in the first embodiment of the invention.

Subsequently, the same steps as the ones for forming the insulating film 13 and forming the third layer portion 23 are repeated to complete the thin-film coil 40 having a desired number of conductive layers. FIGS. 5A and 5B show an example where the thin-film coil 40 having five conductive layers is formed. In this example, an insulating film 14, the fourth layer portion 24, an insulating film 15, and a fifth layer portion 25 are laminated on the third layer portion 23 in succession. FIG. 20 is a plan view showing the fifth layer portion 25 in this example. FIG. 20 also shows the second layer 10b, the third layer 10c, the top pole layer 28, and the air bearing surface 30 to be formed later.

In the example shown in FIGS. 5A, 5B, and FIG. 20, the insulating film 14 has a contact hole in a position over the connecting portion 23E. The fourth layer portion 24 is a flat conductive layer of a single turn. The fourth layer portion 24 has a connecting portion 24S near one of its ends, and a connecting portion 24E near the other end. The connecting portion 24S is connected to the connecting portion 23E of the third layer portion 23 through the contact hole. The connecting portion 24E is connected to the fifth layer portion 25. The connecting portion 24E lies over the connecting portion 23S via the insulating film 14. The insulating film 15 has a contact hole in a position over the connecting portion 24E. The fifth layer portion 25 is a flat conductive layer of a single turn. The fifth layer portion 25 has a connecting portion 25S near one of its ends, which is connected to the connecting portion 24E of the fourth layer portion 24 through the contact hole. The other end of the fifth layer portion 25 is connected to a single electrode pad to be described later. In the example shown in FIGS. 5A, 5B, and FIG. 20, the thin-film coil 40 has five conductive layers, i.e., the first layer portion 21 to the firth layer portion 25. The first to fifth layer portions 21–25 are electrically connected in series to each other. Thus, the number of turns of the thin-film coil 40 is five.

Figure 19:
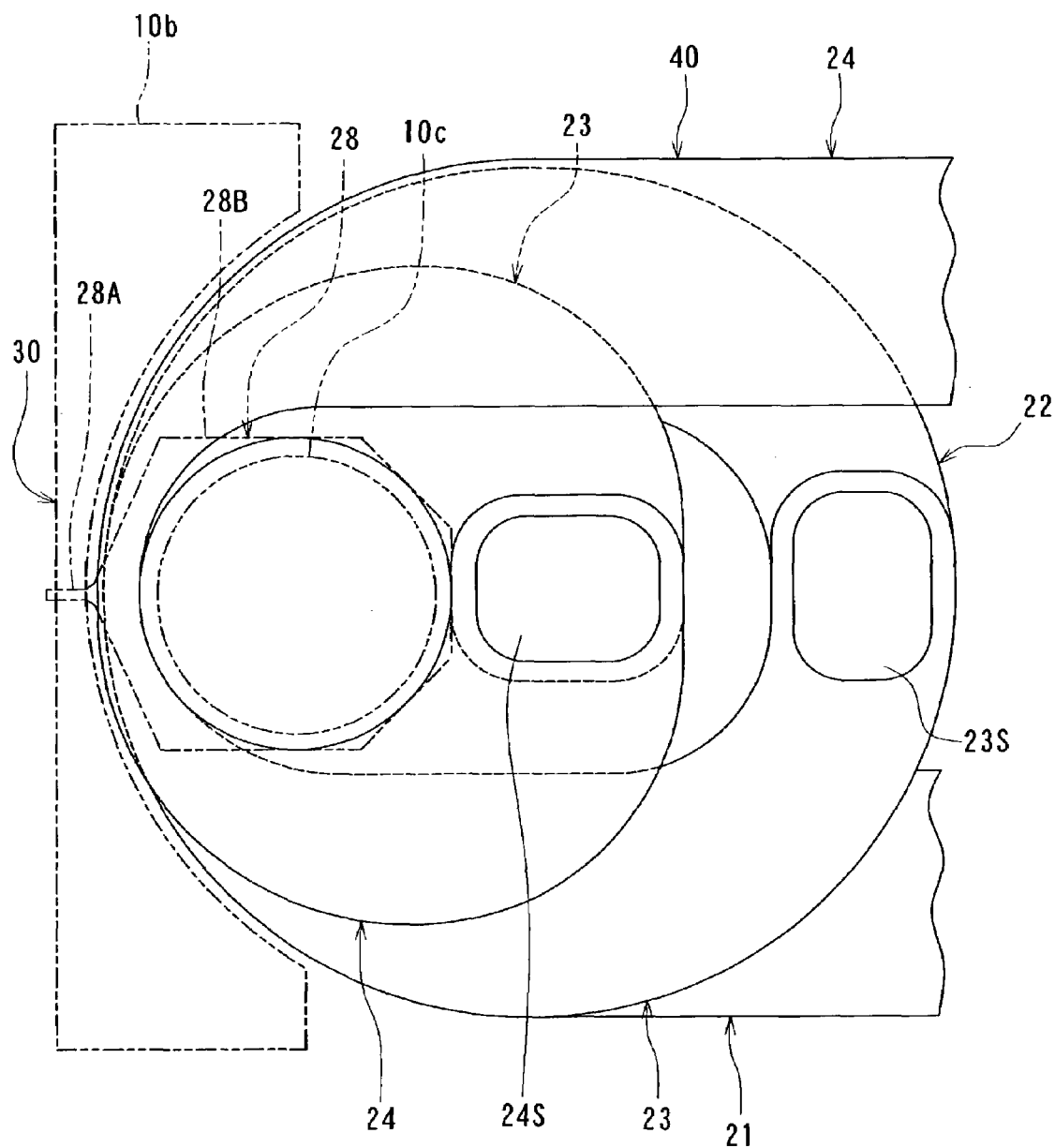
FIG. 19 is a plan view showing a fourth layer portion of the thin-film coil in the first embodiment of the invention.

FIG. 19 is a plan view showing the fourth layer portion 24 in an example where the thin-film coil 40 has four conductive layers. FIG. 19 also shows the second layer 10b, the third layer 10c, the top pole layer 28, and the air bearing surface 30 to be formed later. In this example, the fourth layer portion 24 has a connecting portion 24S near one of its ends, which is connected to the connecting portion 23E of the third layer portion 23 through a contact hole. The other end of the fourth layer portion 24 is connected to a single electrode pad to be described later. In the example shown in FIG. 19, the thin-film coil 40 has four conductive layers, i.e., the first layer portion 21 to the fourth layer portion 24. The first to fourth layer portions 21–24 are electrically connected in series to each other. Thus, in the example shown in FIG. 19, the number of turns of the thin-film coil 40 is four.

FIG. 16 to FIG. 20 show the thin-film coil 40 that is wound clockwise from the end of the first layer portion 21 on the electrode-pad side to the end of the fourth layer portion 24 or fifth layer portion 25 on the electrode-pad side. However, the thin-film coil 40 may be wound in the opposite direction.

Hereinafter, description will be continued of the method of manufacturing a thin-film magnetic head in conjunction with the case where the thin-film coil 40 has five conductive layers, i.e., the first layer portion 21 to the fifth layer portion 25. After the formation of the thin-film coil 40, a frame for forming the second layer 10b and the third layer 10c by frame plating is formed, although not shown, on the laminate by photolithography.

Next, as shown in FIGS. 5A and 5B, electroplating is performed to form the second layer 10b and the third layer 10c of a magnetic material to a thickness of 3 μm each, for example, on the first layer 10a. For example, the material of the second layer 10b and the third layer 10c may be CoNiFe or FeCo. Each of the second layer 10b and the third layer 10c may be made up of two layers consisting of a CoNiFe layer and an FeCo layer. In the present embodiment, the second layer 10b and the third layer 10c are formed by plating without any special electrode film, but using the unpatterned first layer 10a as an electrode and a seed layer for plating.

The second layer 10b is disposed near the region where to form the air bearing surface 30 described later. The third layer 10c is a portion for connecting the first layer 10a to the top pole layer 28 to be described later, and is disposed near the center of the first thin-film coil 40 (the first layer portion 21 to the fifth layer portion 25).

Next, as shown in FIGS. 6A and 6B, a photoresist layer 16 is formed to cover the thin-film coil 40, the second layer 10b and the third layer 10c. Using this photoresist layer 16 as a mask, the first layer 10a is selectively etched by ion beam etching, for example, to thereby pattern the first layer 10a.

Next, as shown in FIGS. 7A and 7B, the photoresist layer 16 is removed, and then an insulating layer 17 made of alumina, for example, is formed to a thickness of 3.0 to 4.0 μm to cover the entire top surface of the laminate. The insulating layer 17 is polished by, for example, CMP so that the second layer 10b and the third layer 10c are exposed and the top surfaces of the second layer 10b, the third layer 10c and the insulating layer 17 are flattened. By this polishing, the second layer 10b is also adjusted to a thickness of 2.0 to 3.0 μm.

Next, as shown in FIGS. 8A and 8B, a magnetic layer 18 of a magnetic material is formed to a thickness of 0.8 to 1.0 μm to cover the entire top surface of the laminate. For example, the magnetic layer 18 is formed by sputtering, using a high saturation flux density material such as FeAlN, FeN, FeCo, CoFeN, and FeZrN. The magnetic layer 18 may also be formed by plating, using CoNiFe (Co: 10 weight %; Ni: 20 weight %; Fe: 70 weight %) or FeCo (Fe: 67 weight %; Co: 33 weight %).

Next, etching masks 19a and 19b having a thickness of, for example, 1.0 μm are formed on the magnetic layer 18 at portions corresponding to the second layer lob and the third layer 10c, respectively. For example, the etching masks 19a and 19b are formed of NiFe by frame plating.

Next, as shown in FIGS. 9A and 9B, the magnetic layer 18 is etched by RIE using halogen-type gas with the etching masks. For example, the halogen-type gas may be one containing at least either one of $Cl_2$ and $BCl_3$. After the etching, portions of the magnetic layer 18 remaining under the etching masks 19a and 19b make a fourth layer 10d and a fifth layer 10e. The fourth layer 10d lies on the second layer 10b, and the fifth layer 10e lies on the third layer 10c.

In the present embodiment, after the etching of the magnetic layer 18 by RIE, at least part of the region, or the whole region for example, which has undergone the RIE, may be slightly etched by, for example, ion beam etching. For example, this etching is performed over several minutes in such a way that ion beams travel at an angle of 40 to 75° with respect to a direction perpendicular to the top surface of the fourth layer 10d. This etching yields the following effects. First, etching residuals lying on the region having undergone the RIE can be eliminated to clean the surface of the region. Additionally, since the sidewalls that have been formed by the RIE are slightly etched, it is possible to clean the surfaces of those sidewalls. Furthermore, molecules of the halogen-type gas such as chlorine molecules which have adhered to those sidewalls during the RIE can be removed, so that it is possible to protect those sidewalls from corrosion.

Furthermore, as shown in FIGS. 9A and 9B, the sidewalls of the fourth layer 10d make inclined surfaces such that each of the sidewalls of the fourth layer 10d forms an angle of smaller than 90° with the top surface of the base of the fourth layer 10d. Consequently, it is possible to prevent the magnetic flux passing through the bottom pole layer 10 from being saturated on the way and to thereby introduce the magnetic flux to the vicinity of a recording gap layer to be described later.

Next, as shown in FIGS. 10A and 10B, an insulating layer 20 made of alumina, for example, is formed to a thickness of 1 to 2 μm so as to cover the entire top surface of the laminate. The insulating layer 20 is then polished by CMP, for example. This polishing is performed so as to remove the etching masks 19a, 19b and to flatten the top surfaces of the fourth layer 10d, the fifth layer 10e and the insulating layer 20. By this polishing, the fourth layer 10d and the fifth layer 10e are also adjusted to a thickness of 0.5 to 1.0 μm.

The end of the fourth layer 10d located farther from the air bearing surface defines the throat height of the recording head. The throat height is the length (height) of the magnetic pole portions, that is, the portions of the two pole layers opposed to each other with the recording gap layer in between, as taken from the air-bearing-surface-side end to the other end.

The third layer 10c and the fifth layer 10e constitute a coupling portion 31 for establishing magnetic coupling between the bottom pole layer 10 and the top pole layer 28.

Next, as shown in FIGS. 11A and 11B, a recording gap layer 26 is formed to a thickness of 0.06 to 0.1 μm so as to cover the entire top surface of the laminate. The recording gap layer 26 may be made of an insulating material such as alumina, or a nonmagnetic metal or nonmagnetic metal compound material. The nonmagnetic metal material may be high-melting metal material. Examples of the nonmagnetic metal material or the nonmagnetic metal compound material include NiCu, Ru, Ta, Mo, W, $NiSi_2$, $MoSi_2$, and $WSi_2$. Then, a portion of the recording gap layer 26 lying over the fifth layer 10e is selectively etched.

Next, a magnetic layer 27 of a magnetic material is formed to a thickness of 0.5 to 1.2 μm so as to cover the entire top surface of the laminate. For example, the magnetic layer 27 is formed by sputtering, using a high saturation flux density material such as FeAlN, FeN, FeCo, CoFeN, and FeZrN. The magnetic layer 27 may also be formed by plating, using CoNiFe (Co: 10 weight %; Ni: 20 weight %; Fe: 70 weight %) or FeCo (Fe: 67 weight %; Co: 33 weight %). The magnetic layer 27 is connected to the fifth layer 10e.

Next, a second layer 28b of the top pole layer 28 to be described later is formed to a thickness of, for example, 1 to 2 μm on the magnetic layer 27 by frame plating, for example. The second layer 28b is made of a metal magnetic material different from the material constituting the magnetic layer 27, such as NiFe. The second layer 28b is arranged to extend from a position corresponding to the fourth layer 10d to a position corresponding to the fifth layer 10e.

Next, as shown in FIGS. 12A and 12B, the magnetic layer 27 is selectively etched by RIE using the second layer 28b as an etching mask. Consequently, the portion of the magnetic layer 27 left unetched makes a first layer 28a of the top pole layer 28. The first layer 28a lies under the second layer 28b. The foregoing RIE is performed by using halogen-type gas, for example. For example, the halogen-type gas may be one containing at least either one of $Cl_2$ and $BCl_3$. During the etching, the magnetic layer 27 preferably falls within the range of 50–300° C., and more preferably 200–250° C., in temperature. If the RIE is performed at such high temperatures using etching masks made of Ni-containing material such as NiFe, it is possible to prevent adhesion of Ni molecules separating from the etching masks to the sidewalls of the magnetic layer 27.

The top pole layer 28 has the first layer 28a that touches the recording gap layer 26, and the second layer 28b that is located on the first layer 28a. As shown in FIG. 15 to FIG. 20, the top pole layer 28 includes: a track width defining portion 28A having an end located at the air bearing surface 30 and the other end located away from the air bearing surface 30; and a yoke portion 28B connected to the other end of the track width defining portion 28A. The yoke portion 28B has a width equal to that of the track width defining portion 28A at the interface with the track width defining portion 28A. The width of the yoke portion 28B gradually increases from this interface with an increase in distance from the track width defining portion 28A, and finally becomes constant. The track width defining portion 28A is the magnetic pole portion of the top pole layer 28, and defines the recording track width.

Next, although not shown, a photoresist mask having an opening around the track width defining portion 28A is formed. Then, as shown in FIGS. 13A and 13B, the recording gap layer 26 around the track width defining portion 28A is etched by, for example, RIE with a mixed gas of $Cl_2$ and $BCl_3$ as the etching gas, using the above-mentioned photoresist mask and the top pole layer 28 as masks.

Next, a portion of the fourth layer 10d of the bottom pole layer 10 located around the track width defining portion 28A is etched by, for example, ion beam etching, using the top pole layer 28, the recording gap layer 26 lying thereunder, and the foregoing photoresist mask as masks. This etching may be effected, for example, by combining an ion beam etching in which ion beams travel at an angle of 0° with respect to the direction perpendicular to the top surface of the second layer 28b, and an ion beam etching in which the above-mentioned angle is 40° to 50°. This makes it possible to reduce the track width defining portion 28A in width and remove etching residuals occurring from the RIE.

Figures 13A, 13B:
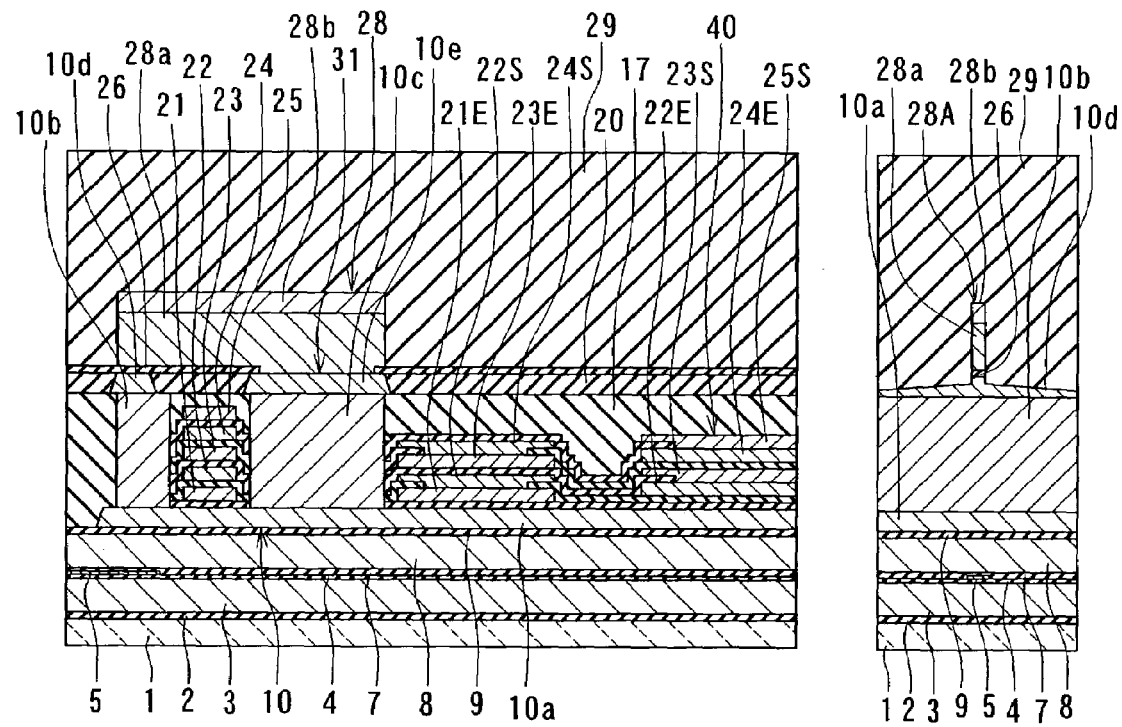
FIGS. 13A and 13B are cross sections for illustrating a step that follows FIGS. 12A and 12B.

A trim structure as shown in FIG. 13B is thereby formed. The trim structure suppresses an increase in the effective recording track width due to expansion of a magnetic flux generated during writing in a narrow track. A portion of the fourth layer 10d, the portion opposed to the track width defining portion 28A of the top pole layer 28 with the recording gap layer 26 in between, is the magnetic pole portion of the bottom pole layer 10.

When the recording gap layer 26 is made of a nonmagnetic metal material or a nonmagnetic metal compound material, the recording gap layer 26 and the fourth layer 10d may be etched by ion beam etching.

Next, an overcoat layer 29 made of alumina, for example, is formed to a thickness of 20 to 40 μm so as to cover the entire top surface of the laminate. Its surface is flattened, and not-shown four electrode pads are formed thereon. Two out of the four electrode pads are connected to the thin-film coil 40. The other two are connected to the pair of electrode layers that are connected to the MR element 5. Finally, as shown in FIGS. 14A and 14B, a slider including the foregoing layers is lapped to form the air bearing surface 30. This completes the thin-film magnetic head including the recording head and the reproducing head.

The thin-film magnetic head according to the present embodiment has the air bearing surface 30 serving as a medium facing surface that faces toward a recording medium, and the reproducing head and the recording head (induction-type electromagnetic transducer).

The reproducing head includes: the MR element 5 located near the air bearing surface 30; the bottom shield layer 3 and the top shield layer 8 for shielding the MR element 5; the bottom shield gap film 4 located between the MR element 5 and the bottom shield layer 3; and the top shield gap film 7 located between the MR element 5 and the top shield layer 8. Portions of the bottom and top shield layers 3 and 8 located on a side of the air bearing surface 30 are opposed to each other with the MR element 5 in between.

The recording head comprises: the bottom pole layer 10 and the top pole layer 28 that are magnetically coupled to each other and that include the magnetic pole portions opposed to each other and located in regions of the pole layers on the side of the air bearing surface 30; the recording gap layer 26 interposed between the magnetic pole portion of the bottom pole layer 10 and the magnetic pole portion of the top pole layer 28; and the thin-film coil 40, at least a part of which is disposed between the bottom and top pole layers 10 and 28 and insulated from the bottom and top pole layers 10 and 28. The bottom pole layer 10 and the top pole layer 28 of the present embodiment correspond to the first pole layer and the second pole layer of the invention, respectively.

The bottom pole layer 10 includes the first to fifth layers 10a–10e. The first layer 10a is located to face toward the thin-film coil 40. The second layer 10b is located closer to the air bearing surface 30 than the thin-film coil 40 is, and connected to the surface of the first layer 10a that is closer to the recording gap layer 26. The fourth layer 10d has two surfaces one of which is connected to the surface of the second layer 10b closer to the recording gap layer 26, and the other of which is adjacent to the recording gap layer 26. The third layer 10c is located on the first layer 10a at a position away from the air bearing surface 30. The fifth layer 10e is located on the third layer 10c. The third layer 10c and the fifth layer 10e constitute the coupling portion 31 for establishing magnetic coupling between the bottom pole layer 10 and the top pole layer 28.

The top pole layer 28 has the first layer 28a and the second layer 28b both of which are flat. The top pole layer 28 includes the track width defining portion 28A and the yoke portion 28B. The track width defining portion 28A has one end located at the air bearing surface 30 and the other end located away from the air bearing surface 30. The yoke portion 28B is connected to the other end of the track width defining portion 28A. The track width defining portion 28A is the magnetic pole portion of the top pole layer 28, and defines the recording track width.

As shown in FIG. 14A, FIG. 14B, and FIG. 15, the thin-film coil 40 according to the present embodiment has the first layer portion 21, to the fifth layer portion 25 each of which is made of a flat conductive layer of a single turn. The first to fifth layer portions 21–25 are laminated, and electrically connected in series to each other. The first to fifth layer portions 21–25 are disposed around the third layer 10c that constitutes the coupling portion 31. Each of the first to fifth layer portions 21–25 is interposed in part between the second layer 10b and the third layer 10c.

The first layer portion 21 corresponds to the lowermost conductive layer of the invention. The fifth layer portion 25 corresponds to the uppermost conductive layer of the invention. The second layer portion 22 to the fourth layer portion 24 correspond to the intermediate conductive layers of the invention. The first layer portion 21 has a single connecting portion 21E connected to the second layer portion 22. The second layer portion 22 has the connecting portion 22S connected to the connecting portion 21E of the first layer portion 21, and the connecting portion 22E connected to the connecting portion 23S of the third layer portion 23. Similarly, the third layer portion 23 has the connecting portion 23S connected to the connecting portion 22E of the second layer portion 22, and the connecting portion 23E connected to the connecting portion 24S of the fourth layer portion 24. The fourth layer portion 24 has the connecting portion 24S connected to the connecting portion 23E of the third layer portion 23, and the connecting portion 24E connected to the connecting portion 25S of the fifth layer portion 25. The fifth layer portion 25 has a single connecting portion 25S connected to the connecting portion 24E of the fourth layer portion 24.

Among the plurality of connecting portions mentioned above, the connecting portions 21E, 22S, 23E, and 24S are located at the first position farther from the air bearing surface 30 than the third layer 10c is. The connecting portions 22E, 23S, 24E, and 25S are located at the second position which is farther from the air bearing surface 30 than the third layer 10c is and farther from the air bearing surface 30 than the first position is. The center of the coupling portion 31, the first position, and the second position are aligned on the line 42 which is perpendicular to the air bearing surface 30.

Figure 21:
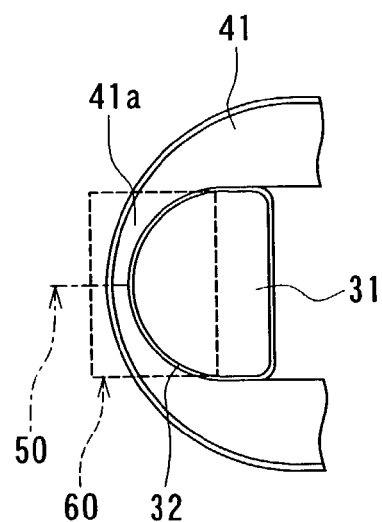
FIG. 21 is a plan view showing a first example of the shape of the thin-film coil in the first embodiment of the invention.
Figure 22:
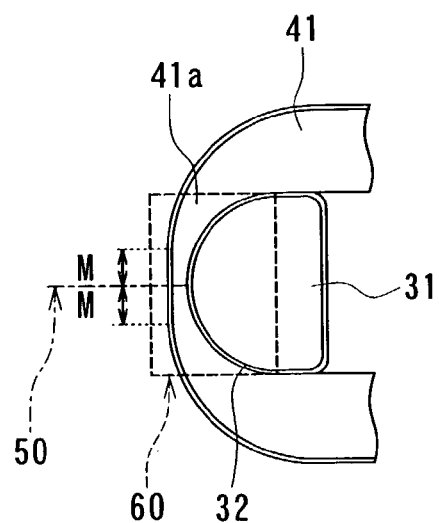
FIG. 22 is a plan view showing a second example of the shape of the thin-film coil in the first embodiment of the invention.

Now, the shape and arrangement of the coupling portion 31 and the thin-film coil 40 in the present embodiment will be described in conjunction with first and second examples thereof. FIG. 21 is a plan view showing the first example. FIG. 22 is a plan view showing the second example. In FIGS. 21 and 22, the reference numeral 41 represents a conductive layer which typifies the first layer portion 21 to the fifth layer portion 25 of the thin-film coil 40. In each of the examples, the coupling portion 31 has an end face 32 that faces toward the air bearing surface 30 (not shown). The end face 32 includes a curved surface convex toward the air bearing surface 30. For example, the end face 32 has the shape of a part of a cylindrical surface.

In both of the first and second examples, the conductive layer 41 has a portion 41a which lies between the end face 32 of the coupling portion 31 and the air bearing surface 30. In FIGS. 21 and 22, the region designated by the reference numeral 60 is a region where the portion 41a is located. The inner periphery of the portion 41a lies along the end face 32 of the coupling portion 31. The portion 41a has a minimum width of the conductive layer 41 at a position on a virtual line 50 that connects the end face 32 of the coupling portion 31 and the air bearing surface 30 in the shortest distance, and increases in width with distance from the virtual line 50. The minimum width of the conductive layer 41 is 0.5 to 1.0 μm, for example. Except where it increases in width with distance from the virtual line 50 as described above, the conductive layer 41 has generally constant widths of 2 to 5 μm, for example.

In the first example shown in FIG. 21, the inner periphery of the portion 41a is shaped into an arc having a first radius of curvature. The outer periphery of the portion 41a is shaped into an arc having a second radius of curvature which is greater than the first radius of curvature. For a part of the conductive layer 41 including the portion 41a, the inner and outer peripheries thereof are each shaped into a semicircle, for example. The center of the semicircle shaping the outer periphery is located farther from the air bearing surface 30 than the center of the semicircle shaping the inner periphery is. Thus, the part of the conductive layer 41 increases in width with distance from the virtual line 50.

In the second example shown in FIG. 22, the inner periphery of the portion 41a is shaped into an arc having a first radius of curvature. The outer periphery of the portion 41a includes a linear portion and two arc portions connected to respective ends of the linear portion. The linear portion is located in a predetermined region covering the position on the virtual line 50. The two arc portions have a second radius of curvature greater than the first radius of curvature. The ends of the linear portion are located a length M away from the position on the virtual line 50 in opposite directions. The linear portion thus has a length of 2×M. M is 1 to 3 μm, for example.

For a part of the conductive layer 41 including the portion 41a, the inner periphery thereof is shaped into a semicircle, for example. For the part of the conductive layer 41 including the portion 41a, the outer periphery thereof includes the two arc portions connected to the respective ends of the linear portion. Each of these arc portions is an arc having a central angle of 90°, for example. The centers of the arcs shaping these arc portions are located farther from the air bearing surface 30 than the center of the semicircle shaping the inner periphery of the part of the conductive layer 41 is. Thus, the part of the conductive layer 41 increases in width with distance from the virtual line 50.

Here, comparison will be made between the first and second examples. In the first example, the outer periphery of a part of the conductive layer 41 including the portion 41a is semicircular. In the second example, the outer periphery of a part of the conductive layer 41 including the portion 41a includes the linear portion and the two arc portions. In the second example, the radius of curvature of the arc portions can be made smaller than the radius of the semicircle in the first example. As a result, in the second example, the arc portions can protrude more toward the air bearing surface 30 than the outer periphery of the first example does. Thus, according to the second example, the width of the conductive layer 41 can be increased more sharply with distance from the virtual line 50 than in the first example. This consequently allows a reduction in the resistance of the conductive layer 41.

Next, with reference to FIG. 23 to FIG. 29, the shape of the top surface of the coupling portion 31 will be described in conjunction with seven examples. FIG. 23 to FIG. 29 are plan views of the coupling portion 31. Note that any section of the coupling portion 31 taken in parallel with the top surface has the same shape as that of the top surface.

Figure 23:
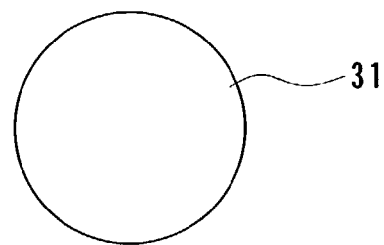
FIG. 23 is a plan view showing a first example of the shape of the top surface of the coupling portion in the first embodiment of the invention.

In the first example shown in FIG. 23, the top surface of the coupling portion 31 is circular in shape. In the second example shown in FIG. 24, the top surface of the coupling portion 31 has the shape of a semicircle. In this example, the arc of the semicircle faces toward the air bearing surface 30.

Figure 25:
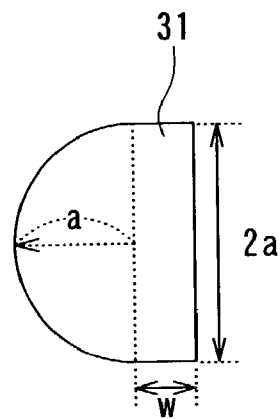
FIG. 25 is a plan view showing a third example of the shape of the top surface of the coupling portion in the first embodiment of the invention.

In the third example shown in FIG. 25, the top surface of the coupling portion 31 has the shape of a combination of a semicircle and a rectangle. The semicircle has a radius of a. The rectangle has long sides of 2a in length and short sides of W in length. The chord of the semicircle and one of the long sides of the rectangle are in contact with each other. In this example, the arc of the semicircle faces toward the air bearing surface 30.

Figure 26:
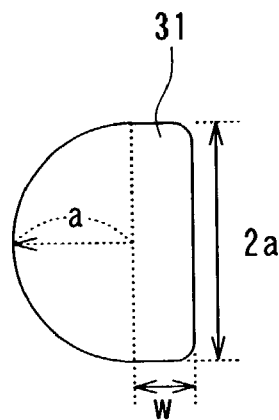
FIG. 26 is a plan view showing a fourth example of the shape of the top surface of the coupling portion in the first embodiment of the invention.

In the fourth example shown in FIG. 26, the top surface of the coupling portion 31 has the shape shown in FIG. 25 with the two corners rounded.

Figure 27:
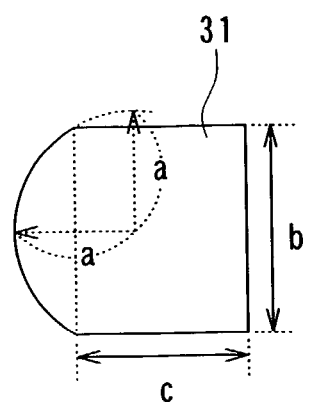
FIG. 27 is a plan view showing a fifth example of the shape of the top surface of the coupling portion in the first embodiment of the invention.

In the fifth example shown in FIG. 27, the top surface of the coupling portion 31 has the shape of a combination of a segment and a rectangle. The segment has a chord of b in length. The rectangle has two parallel sides of b in length and the other two parallel sides of c in length. The chord of the segment and one of the length-b sides of the rectangle are in contact with each other. The arc of the segment is a part of a circle having a radius of a, with a central angle of less than 180°. In this example, the arc of the segment faces toward the air bearing surface 30.

Figure 28:
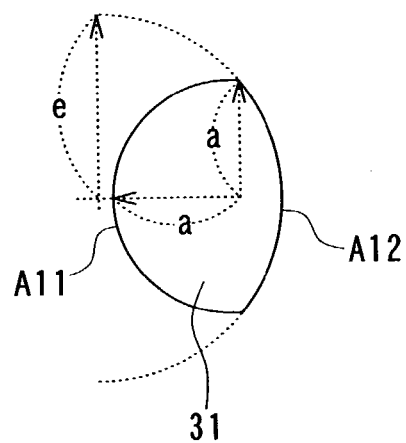
FIG. 28 is a plan view showing a sixth example of the shape of the top surface of the coupling portion in the first embodiment of the invention.

In the sixth example shown in FIG. 28, the top surface of the coupling portion 31 is shaped as if enclosed by arcs A11 and A12. The arc A11 has a radius of a, and a central angle of 180°. The arc A12 has a radius of e. The radius e of the arc A12 is greater than the radius a of the arc A11. The central angle of the arc A12 is smaller than 180°. The arc A11 and the arc A12 are placed to be convex in opposite directions. In this example, the arc A11 faces toward the air bearing surface 30.

Figure 29:
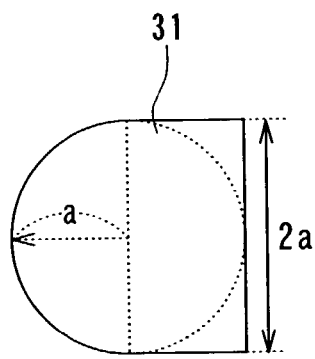
FIG. 29 is a plan view showing a seventh example of the shape of the top surface of the coupling portion in the first embodiment of the invention.

In the seventh example shown in FIG. 29, the top surface of the coupling portion 31 has the shape of a combination of a semicircle and a rectangle. The semicircle has a radius of a. The rectangle has long sides of 2a in length and short sides of a in length. The chord of the semicircle and one of the long sides of the rectangle are in contact with each other. In this example, the arc of the semicircle faces toward the air bearing surface 30.

As described above, in the thin-film magnetic head according to the present embodiment, the thin-film coil 40 has the first to fifth layer portions 21–25 each of which is made of the flat conductive layer 41 of a single turn. In the present embodiment, the yoke length depends on the minimum width of the conductive layer 41, irrespective of the total number of turns of the thin-film coil 40. The minimum width of the conductive layer 41 is 0.5 to 1.0 µm, for example. According to the present embodiment, it is therefore possible to reduce the yoke length without much reduction in the minimum width of the conductive layer 41. In the present embodiment, the yoke length can be reduced to as extremely small as 1–3 µm, for example. Consequently, according to the present embodiment, it is possible to reduce the resistance of the thin-film coil 40 with a reduction in the magnetic path length. According to the present embodiment, it is therefore possible to achieve a thin-film magnetic head which is small in magnetic path length and thus excellent in recording characteristics at high frequency bands, and has the thin-film coil 40 of small resistance.

In the case where the end face of the coupling portion closer to the air bearing surface is a flat surface which is parallel to the air bearing surface and where the conductive layer of the thin-film coil has a constant width over the portion lying between the coupling portion and the air bearing surface, then a reduction in yoke length would inevitably require the portion lying between the coupling portion and the air bearing surface to be reduced in width. This would increase the total resistance of the thin-film coil.

In contrast, in the thin-film magnetic head according to the present embodiment, the coupling portion 31 has the end face 32 that faces toward the air bearing surface 30, and the end face 32 includes a curved surface convex toward the air bearing surface 30. The conductive layer 41 (the first layer portion 21 to the fifth layer portion 25) of the thin-film coil 40 has the portion 41a that lies between the end face 32 of the coupling portion 31 and the air bearing surface 30. The portion 41a has a minimum width of the conductive layer 41 at the position on the virtual line 50 that connects the end face 32 of the coupling portion 31 and the air bearing surface 30 in the shortest distance, and increases in width with distance from the virtual line 50. Consequently, according to the present embodiment, it is possible to reduce the resistance of the thin-film coil 40 while reducing the yoke length, i.e., the magnetic path length. The thin-film coil 40 of the present embodiment can be reduced by 30–60% or so in resistance as compared with thin-film coils having conductive layers of constant width, particularly when the minimum width of the conductive layer 41 is not greater than 1 µm. As above, according to the present embodiment, it is possible to achieve a thin-film magnetic head which has excellent recording characteristics at high frequency bands and has the thin-film coil 40 of smaller resistance, also because of the shape of the end face 32 of the coupling portion 31 and the shape of the conductive layer 41 of the thin-film coil 40.

In conventional thin-film magnetic heads, if the number of turns of the thin-film coil is increased while the yoke length is kept constant, the thin-film coil would decrease in width of the conductive layer with a sharp increase in resistance. In contrast, in the present embodiment, the number of conductive layers 41 to be laminated can be increased without reducing the width of each conductive layer 41. It is therefore possible to increase the number of turns of the thin-film coil 40 with the yoke length kept constant. According to the present embodiment, it is therefore possible to suppress an increase in the resistance of the thin-film coil 40 when the number of turns of the thin-film coil 40 is increased. Consequently, according to the present embodiment, the recording characteristics of the thin-film magnetic head can be improved easily by increasing the number of turns of the thin-film coil 40.

According to the present embodiment, since the resistance of the thin-film coil 40 can be reduced, it is possible to prevent the magnetic pole portions from protruding toward the recording medium due to the heat caused by the thin-film coil 40.

According to the present embodiment, the area where to dispose the thin-film coil 40 can be small. Thus, the present embodiment allows miniaturization of the thin-film magnetic head.

Figure 24:
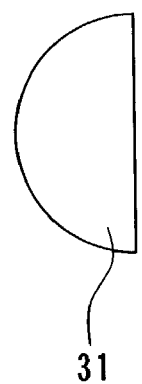
FIG. 24 is a plan view showing a second example of the shape of the top surface of the coupling portion in the first embodiment of the invention.

The top surface of the coupling portion 31 shown in each of FIG. 25 to FIG. 29 has the shape of a semicircle or segment, with another figure such as a rectangle connected to the chord thereof. When the top surface of the coupling portion 31 has such a shape, the width of the coupling portion 31 (the vertical length of the coupling portion 31 in FIG. 24 to FIG. 29) can be made smaller without reducing the area of the top surface of the coupling portion 31, as compared with the case where the coupling portion 31 has a semicircular top surface as shown in FIG. 24. Consequently, the portion 41a of the conductive layer 41 lying between the end face 32 of the coupling portion 31 and the air bearing surface 30 can be reduced in length to make the resistance of the thin-film coil 40 even smaller.

Second Embodiment

Now, a thin-film magnetic head and a method of manufacturing the same according to a second embodiment of the invention will be described with reference to FIGS. 30A to 40A, FIGS. 30B to 40B, and FIGS. 41 to 45. FIGS. 30A to 40A are cross sections each orthogonal to the air bearing surface and the top surface of the substrate. FIGS. 30B to 40B are cross sections of the magnetic pole portion each parallel to the air bearing surface. FIGS. 41 to 45 are plan views for explaining the method of forming a thin-film coil of the present embodiment.

The method of manufacturing the thin-film magnetic head according to the present embodiment is the same as that of the first embodiment up to the step of forming the first layer 10a of the bottom pole layer 10 as shown in FIGS. 30A and 30B. The material, thickness, and forming method of the first layer 10a are the same as in the first embodiment. Here, by way of example, the first layer 10a shall be formed of CoFeN to a thickness of 0.5 μm by sputtering. In the present embodiment, a not-shown photoresist layer is then formed on the first layer 10a. The first layer 10a is selectively etched by, for example, ion beam etching with the photoresist layer as a mask, to thereby pattern the first layer 10a.

Next, as shown in FIGS. 31A and 31B, an insulating film 71 made of alumina, for example, is formed to a thickness of 0.2 μm on the first layer 10a. The insulating film 71 is then selectively etched to form openings in the insulating film 71 at positions where to form the second layer 10b and the third layer 10c.

Next, the second layer 10b and the third layer 10c are formed on the first layer 10a through the following steps. Initially, a magnetic layer made of a magnetic material is formed to a thickness of, for example, 3 μm to cover the entire top surface of the laminate. For example, the magnetic layer is formed by sputtering, using a high saturation flux density material such as FeAlN, FeN, FeCo, CoFeN, and FeZrN. The magnetic layer may also be formed by plating, using CoNiFe (Co: 10 weight %; Ni: 20 weight %; Fe: 70 weight %) or FeCo (Fe: 67 weight %; Co: 33 weight %).

Next, etching masks having a thickness of 3 μm each, for example, are formed on the magnetic layer at portions to be the second layer 10b and the third layer 10c. For example, the etching masks are formed of NiFe by frame plating.

Next, the magnetic layer is etched by RIE with halogen-type gas, using the above-mentioned etching masks. Consequently, portions of the magnetic layer remaining under the etching masks make the second layer 10b and the third layer 10c. For example, the halogen-type gas may be one containing at least either one of $Cl_2$ and $BCl_3$. During the etching, the magnetic layer preferably falls within the range of 50–300° C., and more preferably 200–250° C., in temperature.

In the present embodiment, after the etching of the magnetic layer by RIE, at least part of the region, or the whole region for example, which has undergone the RIE, may be slightly etched by, for example, ion beam etching. By performing this etching, etching residuals lying on the region having undergone the RIE can be eliminated to clean the surface of the region. Additionally, since this etching slightly etches the sidewalls that have been formed by the RIE, the surfaces of those sidewalls can be made clean. Furthermore, molecules of the halogen-type gas such as chlorine molecules which have adhered to those sidewalls during the RIE can be removed, so that it is possible to protect those sidewalls from corrosion.

Next, a first layer portion 81 of the thin-film coil is formed on the insulating film 71. The material, thickness, and forming method of the first layer portion 81 are the same as those of the first layer portion 21 in the first embodiment.

Figure 41:
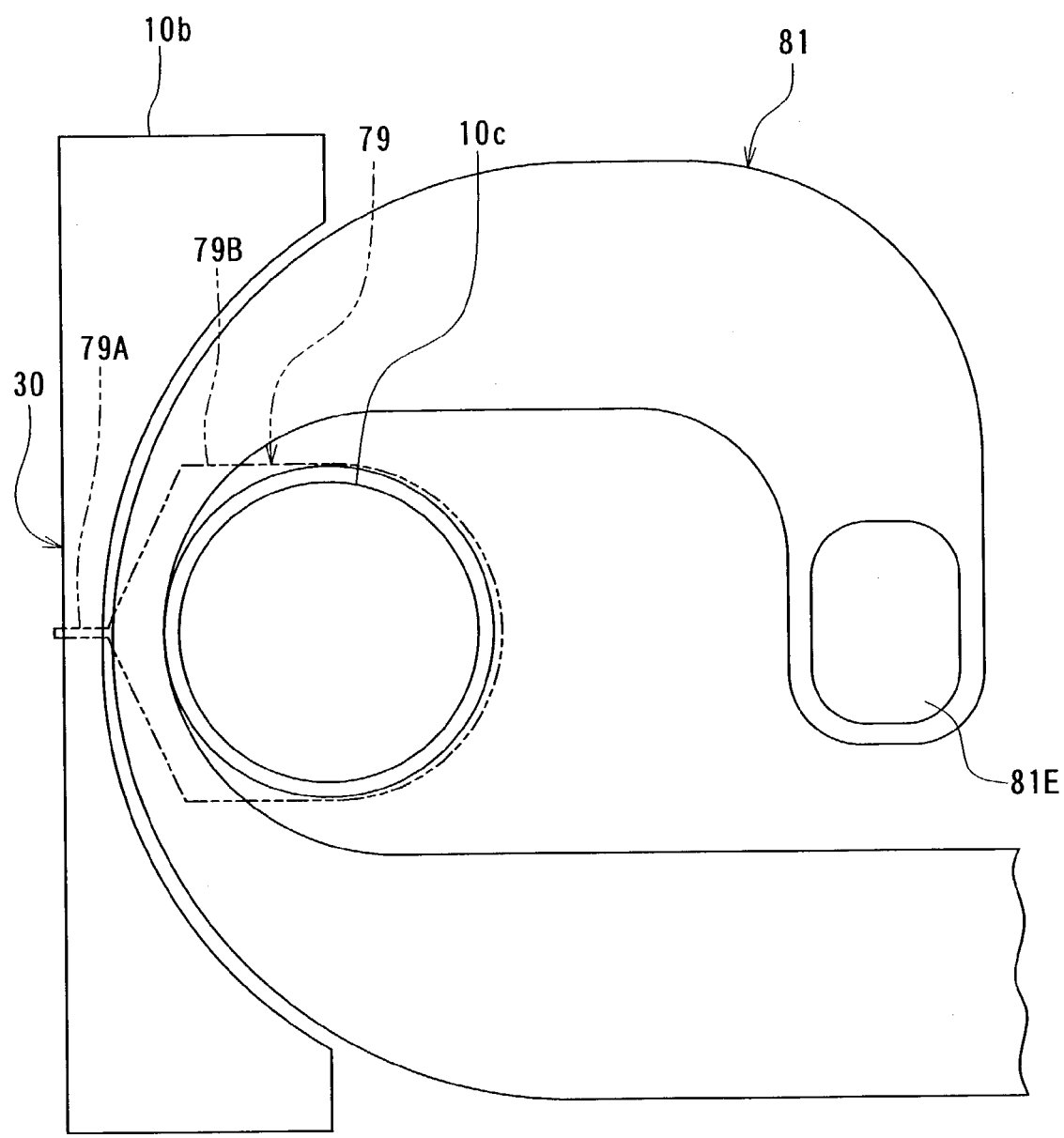
FIG. 41 is a plan view showing a first layer portion of the thin-film coil in the second embodiment of the invention.

FIG. 41 is a plan view showing the first layer portion 81. FIG. 41 also shows a top pole layer 79 and the air bearing surface 30 to be formed later. The first layer portion 81 is a flat conductive layer of a single turn. The first layer portion 81 has a connecting portion 81E near one of its ends, which is connected to a second layer portion 82 of the thin-film coil to be formed later. The connecting portion 81E is located at a first position farther from the air bearing surface 30 than the third layer 10c is. The other end of the first layer portion 81 is connected to a single electrode pad to be described later.

Next, an insulating film 72 made of alumina, for example, is formed over the entire top surface of the laminate to a thickness of 80 to 120 nm by sputtering or CVD. The insulating film 72 is then selectively removed at portions lying over the second layer 10b, the third layer 10c and the connecting portion 81E by ion beam etching or RIE, for example. Consequently, a contact hole is formed over the connecting portion 81E.

Figure 42:
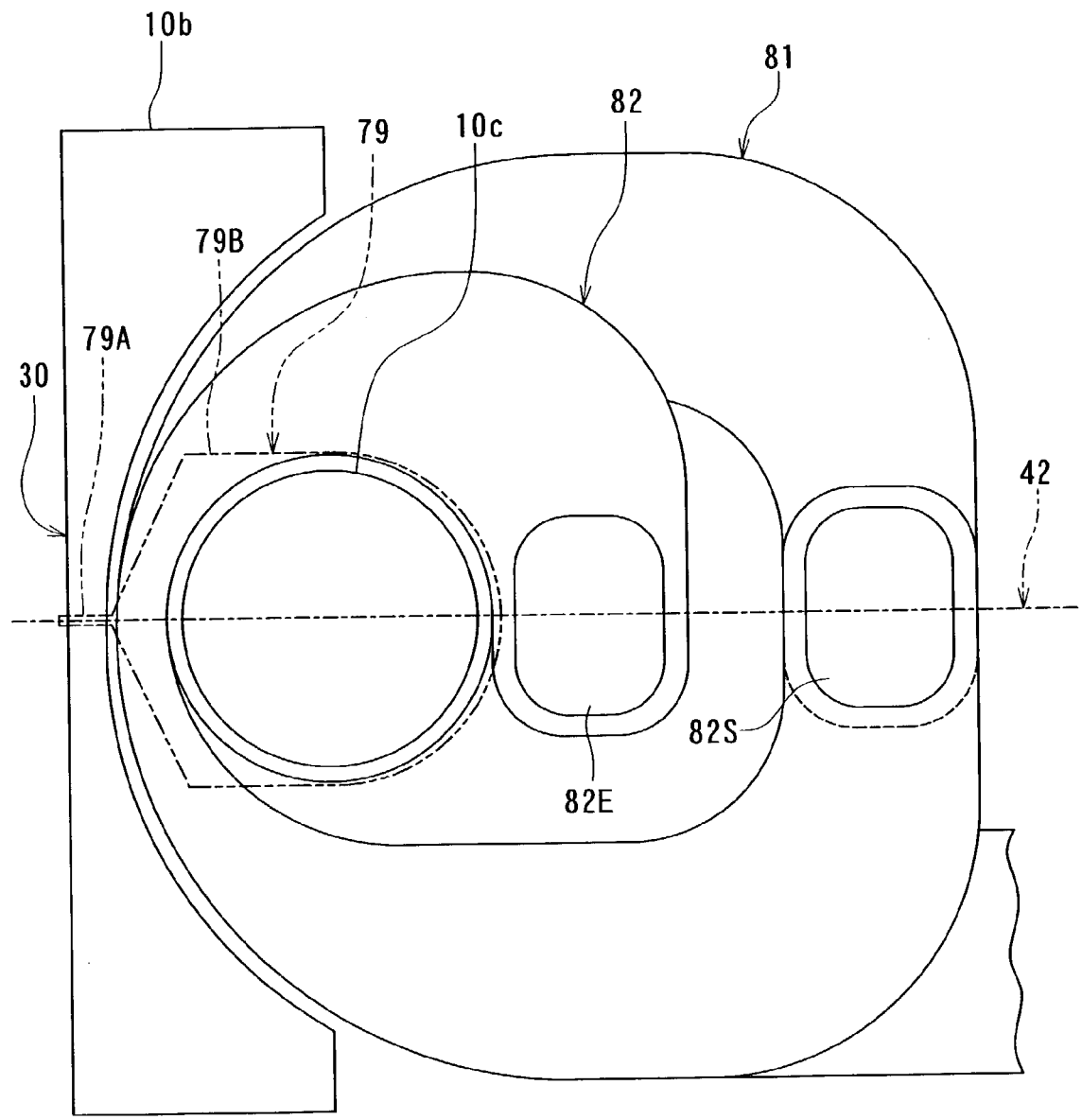
FIG. 42 is a plan view showing a second layer portion of the thin-film coil in the second embodiment of the invention.

Next, as shown in FIGS. 32A and 32B, the second layer portion 82 is formed on the insulating film 72. FIG. 42 is a plan view showing the second layer portion 82. FIG. 42 also shows the top pole layer 79 and the air bearing surface 30 to be formed later. The second layer portion 82 is a flat conductive layer of a single turn. The method for forming the second layer portion 82 is the same as that for forming the first layer portion 81. The second layer portion 82 has a connecting portion 82S near one of its ends, and a connecting portion 82E near the other end. The connecting portion 82S is connected to the connecting portion 81E of the first layer portion 81 through the contact hole. The connecting portion 82E is connected to a third layer portion 83 of the thin-film coil to be formed later. The connecting portion 82E is located at a second position which is farther from the air bearing surface 30 than the third layer 10c is and closer to the air bearing surface 30 than the connecting portion 81E shown in FIG. 41 is. As shown in FIG. 42, the center of the third layer 10c and the centers of the connecting portions 81E, 82E are aligned on the line 42 which is perpendicular to the air bearing surface 30. The connecting portion 81E lies under the connecting portion 82S.

Next, an insulating film 73 is formed by the same method as that for the insulating film 72. The insulating film 73 is then selectively removed at portions lying over the second layer 10b, the third layer 10c, and the connecting portion 82E by ion beam etching or RIE, for example. Consequently, a contact hole is formed over the connecting portion 82E.

Figure 43:
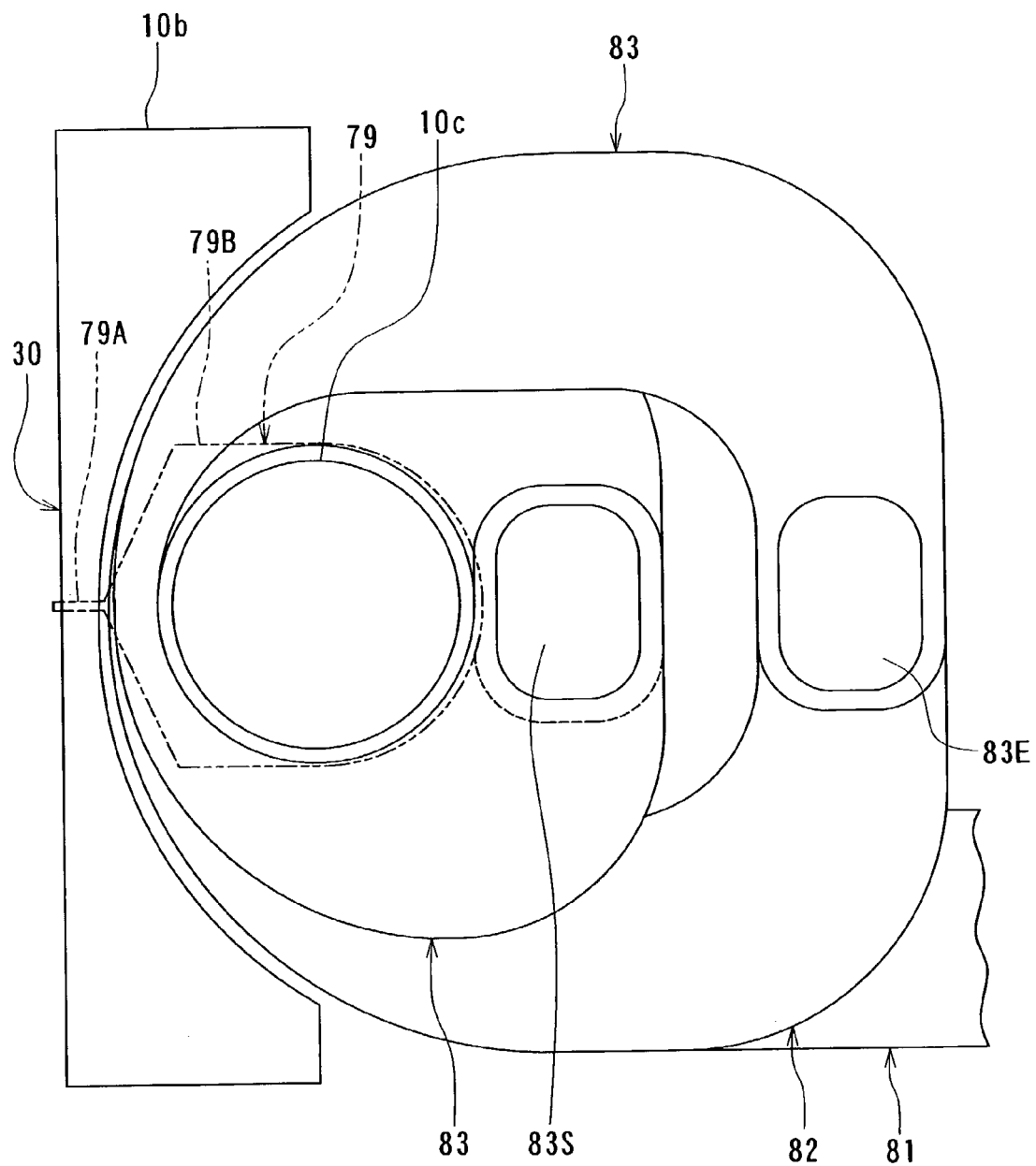
FIG. 43 is a plan view showing a third layer portion of the thin-film coil in the second embodiment of the invention.

Next, as shown in FIGS. 33A and 33B, a third layer portion 83 is formed on the insulating film 73. FIG. 43 is a plan view showing the third layer portion 83. FIG. 43 also shows the top pole layer 79 and the air bearing surface 30 to be formed later. The third layer portion 83 is a flat conductive layer of a single turn. The third layer portion 83 is formed by the same method as that for the first layer portion 81. The third layer portion 83 has a connecting portion 83S near one of its ends, and a connecting portion 83E near the other end. The connecting portion 83S is connected to the connecting portion 82E of the second layer portion 82 through the contact hole. The connecting portion 83E is connected to a fourth layer portion 84 of the thin-film coil to be formed later. The connecting portion 83E lies over the connecting portion 82S via the insulating film 73.

Figure 45:
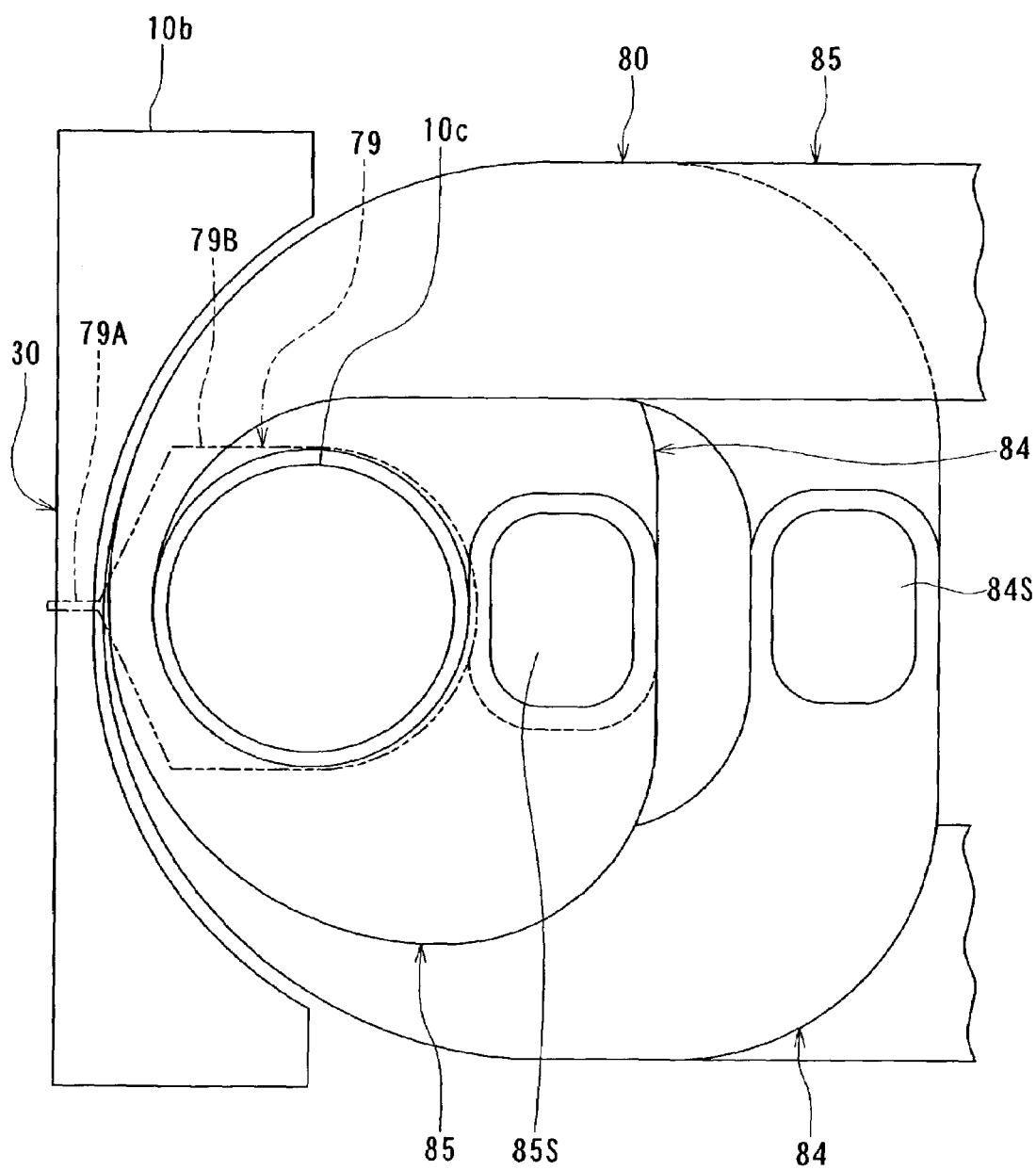
FIG. 45 is a plan view showing a fifth layer portion of the thin-film coil in the second embodiment of the invention.

Subsequently, the same steps as the ones for forming the insulating film 73 and forming the third layer portion 83 are repeated to complete the thin-film coil 80 having a desired number of conductive layers. FIGS. 34A and 34B show an example where the thin-film coil 80 having five conductive layers is formed. In this example, an insulating film 74, the fourth layer portion 84, an insulating film 75, and a fifth layer portion 85 are laminated on the third layer portion 83 in succession. FIG. 45 is a plan view showing the fifth layer portion 85 in this example. FIG. 45 also shows the top pole layer 79 and the air bearing surface 30 to be formed later.

In the example shown in FIGS. 34A, 34B, and FIG. 45, the insulating film 74 has a contact hole in a position over the connecting portion 83E. The fourth layer portion 84 is a flat conductive layer of a single turn. The fourth layer portion 84 has a connecting portion 84S near one of its ends, and a connecting portion 84E near the other end. The connecting portion 84S is connected to the connecting portion 83E of the third layer portion 83 through the contact hole. The connecting portion 84E is connected to the fifth layer portion 85. The connecting portion 84E lies over the connecting portion 83S via the insulating film 74. The insulating film 75 has a contact hole in a position over the connecting portion 84E. The fifth layer portion 85 is a flat conductive layer of a single turn. The fifth layer portion 85 has a connecting portion 85S near one of its ends, which is connected to the connecting portion 84E of the fourth layer portion 84 through the contact hole. The other end of the fifth layer portion 85 is connected to a single electrode pad to be described later. In the example shown in FIGS. 34A, 34B, and FIG. 45, the thin-film coil 80 has five conductive layers, i.e., the first layer portion 81 to the fifth layer portion 85. The first to fifth layer portions 81-85 are electrically connected in series to each other. Thus, the number of turns of the thin-film coil 80 is five.

Figure 44:
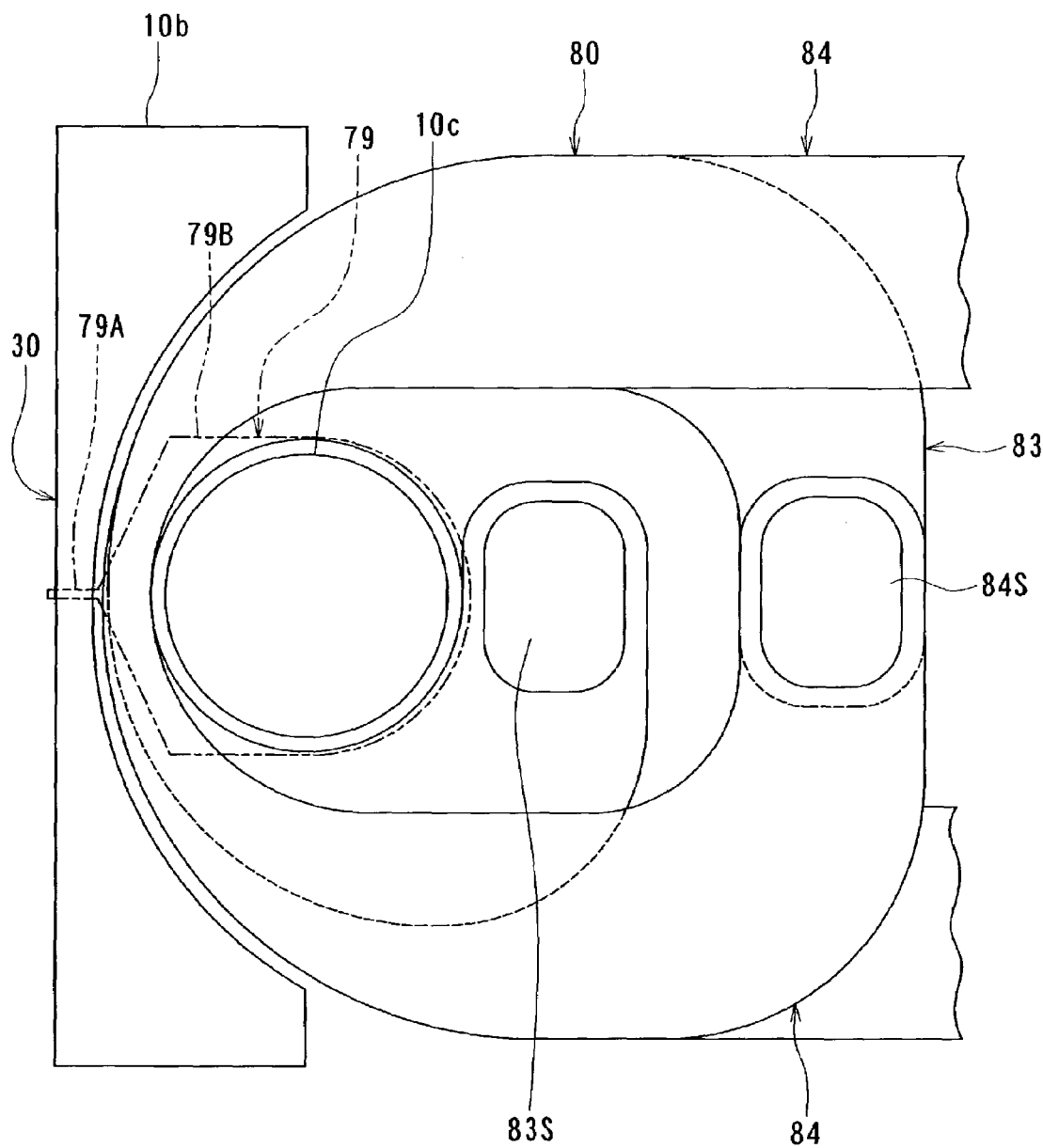
FIG. 44 is a plan view showing a fourth layer portion of the thin-film coil in the second embodiment of the invention.

FIG. 44 is a plan view showing the fourth layer portion 84 in an example where the thin-film coil 80 has four conductive layers. FIG. 44 also shows the top pole layer 79 and the air bearing surface 30 to be formed later. In this example, the fourth layer portion 84 has a connecting portion 84S near one of its ends, which is connected to the connecting portion 83E of the third layer portion 83 through a contact hole. The other end of the fourth layer portion 84 is connected to a single electrode pad to be described later. In the example shown in FIG. 44, the thin-film coil 80 has four conductive layers, i.e., the first layer portion 81 to the fourth layer portion 84. The first to fourth layer portions 81-84 are electrically connected in series to each other. Thus, in the example shown in FIG. 44, the number of turns of the thin-film coil 80 is four.

FIG. 41 to FIG. 45 show the thin-film coil 80 that is wound clockwise from the end of the first layer portion 81 on the electrode-pad side to the end of the fourth layer portion 84 or fifth layer portion 85 on the electrode-pad side. However, the thin-film coil 80 may be wound in the opposite direction.

Hereinafter, description will be continued of the method of manufacturing the thin-film magnetic head in conjunction with the case where the thin-film coil 80 has five conductive layers, i.e., the first layer portion 81 to the fifth layer portion 85. After the formation of the thin-film coil 80, as shown in FIGS. 35A and 35B, an insulating layer 76 made of alumina, for example, is formed to a thickness of 3.0 to 4.0 µm to cover the entire top surface of the laminate. The insulating layer 76 is polished by, for example, CMP so that the second layer 10b and the third layer 10c are exposed and the top surfaces of the second layer 10b, the third layer 10c and the insulating layer 76 are flattened. By this polishing, the second layer 10b is also adjusted to a thickness of 2.0 to 3.0 µm. The end of the second layer 10b located farther from the air bearing surface defines the throat height of the recording head. The third layer 10c forms a coupling portion 31 for establishing magnetic coupling between the bottom pole layer 10 and the top pole layer 79.

Next, as shown in FIGS. 36A and 36B, a recording gap layer 77 is formed to a thickness of 0.08 µm so as to cover the entire top surface of the laminate. The recording gap layer 77 may be made of an insulating material such as alumina, or a nonmagnetic metal or nonmagnetic metal compound material. The nonmagnetic metal material may be a high-melting metal material. Examples of the nonmagnetic metal material or the nonmagnetic metal compound material include NiCu, Ru, Ta, Mo, W, $NiSi_2$, $MoSi_2$, and $WSi_2$. Then, a portion of the recording gap layer 77 lying over the third layer 10c is selectively-etched.

Next, a magnetic layer 78 of a magnetic material is formed to a thickness of 0.8 to 1.5 µm so as to cover the entire top surface of the laminate. For example, the magnetic layer 78 is formed by sputtering, using a high saturation flux density material such as FeAlN, FeN, FeCo, CoFeN, and FeZrN. The magnetic layer 78 may also be formed by plating, using CoNiFe (Co: 10 weight %; Ni: 20 weight %; Fe: 70 weight %) or FeCo (Fe: 67 weight %; Co: 33 weight %). The magnetic layer 78 is connected to the third layer 10c.

Next, a second layer 79b of the top pole layer 79 to be described later is formed to a thickness of, for example, 1.5 µm on the magnetic layer 78 by frame plating, for example. The second layer 79b is made of a metal magnetic material different from the material constituting the magnetic layer 78, such as NiFe. The second layer 79b is arranged to extend from a position corresponding to the second layer 10b to a position corresponding to the third layer 10c.

Next, as shown in FIGS. 37A and 37B, the magnetic layer 78 is selectively etched by RIE using the second layer 79b as an etching mask. Consequently, the portion of the magnetic layer 78 left unetched makes a first layer 79a of the top pole layer 79. The first layer 79a lies under the second layer 79b. The foregoing RIE is performed by using halogen-type gas, for example. For example, the halogen-type gas may be one containing at least either one of $Cl_2$ and $BCl_3$. During the etching, the magnetic layer 78 preferably falls within the range of 50–300° C., and more preferably 200–250° C., in temperature.

In the present embodiment, after the etching of the magnetic layer 78 by RIE, at least part of the region, or the whole region for example, which has undergone the RIE, may be slightly etched by, for example, ion beam etching. For example, this etching is performed over several minutes in such a way that ion beams travel at an angle of 40 to 75° with respect to a direction perpendicular to the top surface of the second layer 79b. This etching yields the following effects. First, etching residuals lying on the region having undergone the RIE can be eliminated to clean the surface of the region. Additionally, since the sidewalls that have been formed by the RIE are slightly etched, the surfaces of those sidewalls can be made clean. Furthermore, molecules of the halogen-type gas such as chlorine molecules which have adhered to those sidewalls during the RIE can be removed, so that it is possible to protect those sidewalls from corrosion.

The top pole layer 79 has the first layer 79a that touches the recording gap layer 77, and the second layer 79b that is located on the first layer 79a. As shown in FIG. 41 to FIG. 45, the top pole layer 79 includes: a track width defining portion 79A having an end located at the air bearing surface 30 and the other end located away from the air bearing surface 30; and a yoke portion 79B connected to the other end of the track width defining portion 79A. The yoke portion 79B has a width equal to that of the track width defining portion 79A at the interface with the track width defining portion 79A. The width of the yoke portion 79B gradually increases from this interface with an increase in distance from the track width defining portion 79A, and finally becomes constant. The track width defining portion 79A is the magnetic pole portion of the top pole layer 79, and defines the recording track width.

Figure 38A:
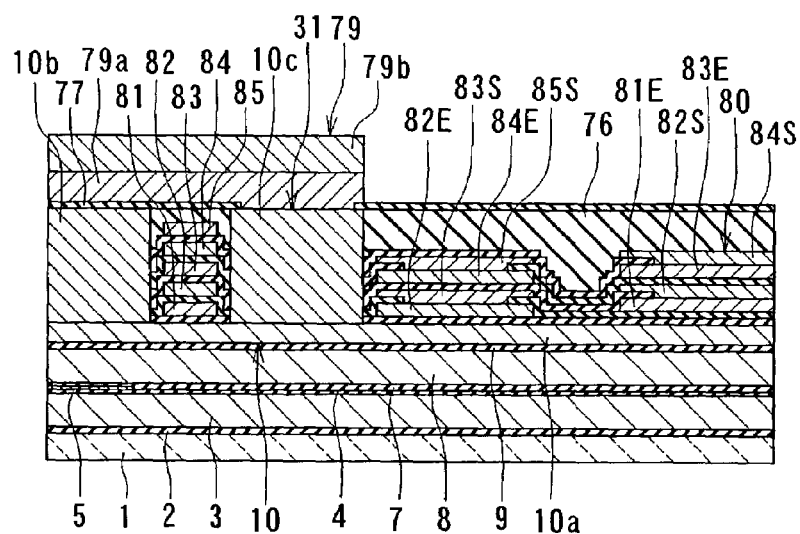
FIGS. 38A and 38B are cross sections for illustrating a step that follows FIGS. 37A and 37B.
Figure 38B:
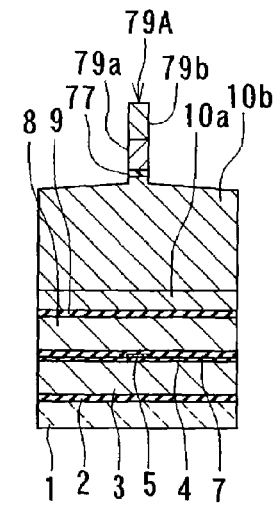

Next, although not shown, a photoresist mask having an opening around the track width defining portion 79A is formed. Then, as shown in FIGS. 38A and 38B, the recording gap layer 77 around the track width defining portion 79A is etched by, for example, RIE with a mixed gas of $Cl_2$ and $BCl_3$ as the etching gas, using the above-mentioned photoresist mask and the top pole layer 79 as masks.

Next, a portion of the second layer 10b of the bottom pole layer 10 located around the track width defining portion 79A is etched by, for example, ion beam etching, using the top pole layer 79, the recording gap layer 77 lying thereunder, and the above-mentioned photoresist mask as masks. A trim structure as shown in FIG. 38B is thereby formed.

Figure 39A:
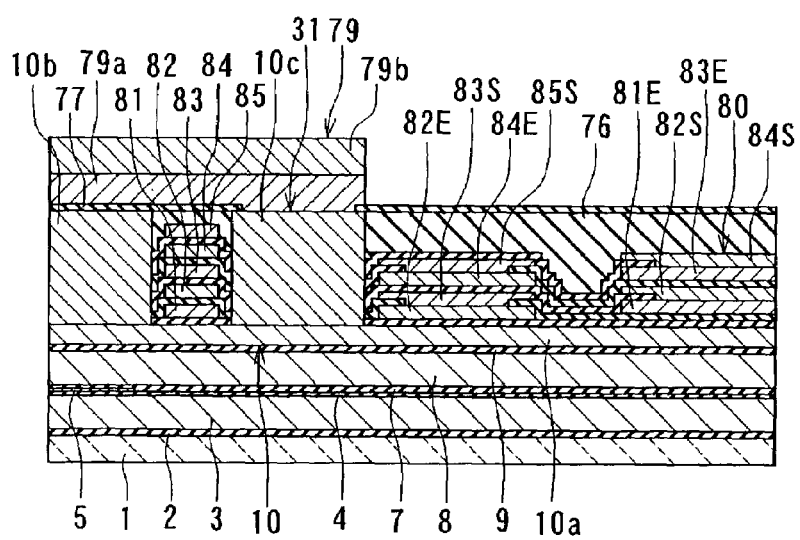
FIGS. 39A and 39B are cross sections for illustrating a step that follows FIGS. 38A and 38B.
Figure 39B:
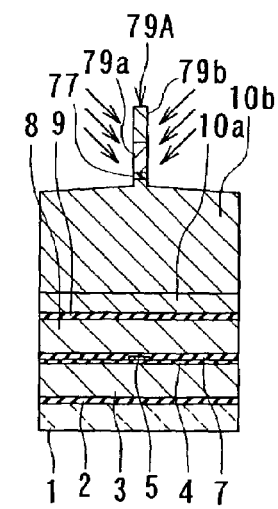

Next, as shown in FIGS. 39A and 39B, the sidewalls of the track width defining portion 79A, and the sidewalls of the recording gap layer 77 and part of the second layer 10b lying under the track width defining portion 79A, are etched by ion beam etching such that ion beams travel at an angle of 40° to 50° with respect to the direction perpendicular to the top surface of the second layer 79b. Consequently, the track width defining portion 79A, and the recording gap layer 77 and part of the second layer 10b lying thereunder, can be reduced in width. In addition, etching residuals occurring from the RIE can be removed. A portion of the second layer 10b, the portion opposed to the track width defining portion 79A with the recording gap layer 77 in between, is the magnetic pole portion of the bottom pole layer 10.

When the recording gap layer 77 is made of a nonmagnetic metal material or a nonmagnetic metal compound material, the recording gap layer 77 and the second layer 10b may be etched by ion beam etching.

Figure 40A:
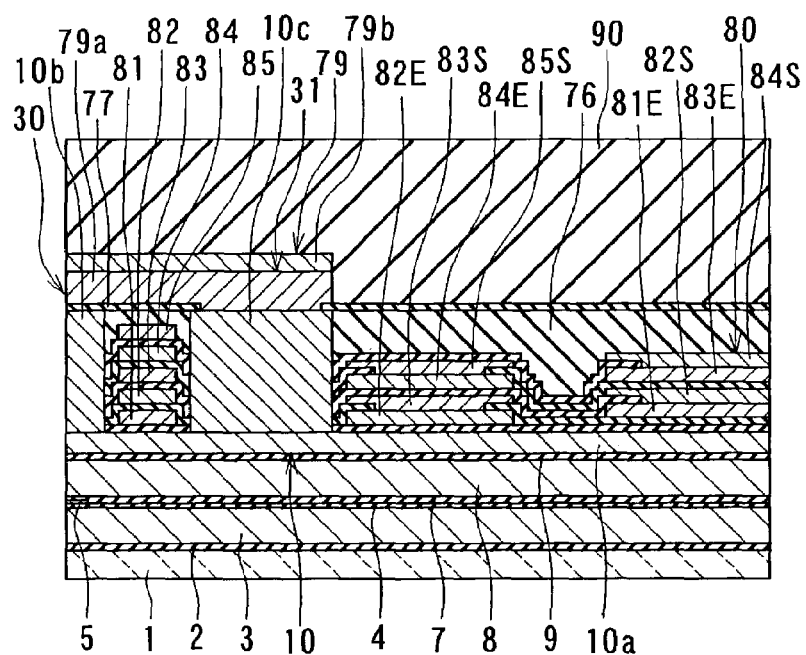
FIGS. 40A and 40B are cross sections for illustrating a step that follows FIGS. 39A and 39B.
Figure 40B:
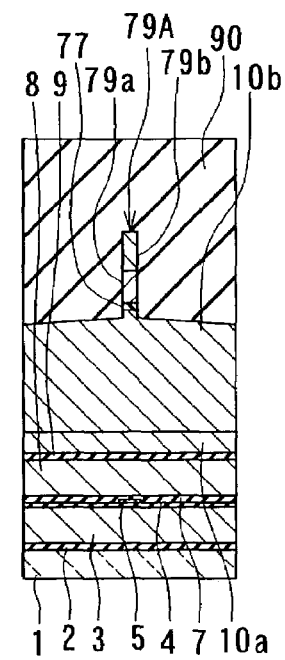

Next, as shown in FIGS. 40A and 40B, an overcoat layer 90 made of alumina, for example, is formed to a thickness of 20 to 40 μm so as to cover the entire top surface of the laminate. Its surface is flattened, and not-shown four electrode pads are formed thereon. Two out of the four electrode pads are connected to the thin-film coil 80. The other two are connected to the pair of electrode layers that are connected to the MR element 5. Finally, a slider including the foregoing layers is lapped to form the air bearing surface 30. This completes the thin-film magnetic head including the recording head and the reproducing head.

In the present embodiment, the recording head comprises: the bottom pole layer 10 and the top pole layer 79 that are magnetically coupled to each other and that include the magnetic pole portions opposed to each other and located in regions of the pole layers on the side of the air bearing surface 30; the recording gap layer 77 interposed between the magnetic pole portion of the bottom pole layer 10 and the magnetic pole portion of the top pole layer 79; and the thin-film coil 80, at least a part of which is disposed between the bottom and top pole layers 10 and 79 and insulated from the bottom and top pole layers 10 and 79. The bottom pole layer 10 and the top pole layer 79 of the present embodiment correspond to the first pole layer and the second pole layer of the invention, respectively.

The bottom pole layer 10 includes the first to third layers 10a–10c. The first layer 10a is located to face toward the thin-film coil 80. The second layer 10b is located closer to the air bearing surface 30 than the thin-film coil 80 is, and connected to the surface of the first layer 10a that is closer to the recording gap layer 77. The third layer 10c is located on the first layer 10a at a position away from the air bearing surface 30. The third layer 10c forms the coupling portion 31 for establishing magnetic coupling between the bottom pole layer 10 and the top pole layer 79.

The top pole layer 79 has the first layer 79a and the second layer 79b both of which are flat. The top pole layer 79 includes the track width defining portion 79A and the yoke portion 79B. The track width defining portion 79A has one end located at the air bearing surface 30 and the other end located away from the air bearing surface 30. The yoke portion 79B is connected to the other end of the track width defining portion 79A. The track width defining portion 79A is the magnetic pole portion of the top pole layer 79, and defines the recording track width.

As shown in FIGS. 40A and 40B, the thin-film coil 80 according to the present embodiment has the first layer portion 81 to the fifth layer portion 85 each of which is made of a flat conductive layer of a single turn. The first to fifth layer portions 81–85 are laminated, and electrically connected in series to each other. The first to fifth layer portions 81–85 are disposed around the third layer 10c that constitutes the coupling portion 31. Each of the first to fifth layer portions 81–85 is interposed in part between the second layer 10b and the third layer 10c.

The first layer portion 81 corresponds to the lowermost conductive layer of the invention. The fifth layer portion 85 corresponds to the uppermost conductive layer of the invention. The second layer portion 82 to the fourth layer portion 84 correspond to the intermediate conductive layers of the invention. The first layer portion 81 has a single connecting portion 81E connected to the second layer portion 82. The second layer portion 82 has the connecting portion 82S connected to the connecting portion 81E of the first layer portion 81, and the connecting portion 82E connected to the connecting portion 83S of the third layer portion 83. Similarly, the third layer portion 83 has the connecting portion 83S connected to the connecting portion 82E of the second layer portion 82, and the connecting portion 83E connected to the connecting portion 84S of the fourth layer portion 84. The fourth layer portion 84 has the connecting portion 84S connected to the connecting portion 83E of the third layer portion 83, and the connecting portion 84E connected to the connecting portion 85S of the fifth layer portion 85. The fifth layer portion 85 has a single connecting portion 85S connected to the connecting portion 84E of the fourth layer portion 84.

Among the plurality of connecting portions mentioned above, the connecting portions 81E, 82S, 83E, and 84S are located at the first position which is farther from the air bearing surface 30 than the third layer 10c is. The connecting portions 82E, 83S, 84E, and 85S are located at the second position which is farther from the air bearing surface 30 than the third layer 10c is and closer to the air bearing surface 30 than the first position is. The center of the coupling portion 31, the first position, and the second position are aligned on the line 42 which is perpendicular to the air bearing surface 30.

The remainder of the configuration, functions and effects of the present embodiment are the same as those of the first embodiment.

Third Embodiment

Now, a method of manufacturing a thin-film magnetic head according to a third embodiment of the invention will be described with reference to FIGS. 46A to 62A, FIGS. 46B to 62B, and FIGS. 63 to 66. FIGS. 46A to 62A are cross sections each orthogonal to the air bearing surface and the top surface of the substrate. FIGS. 46B to 62B are cross sections of the magnetic pole portion each parallel to the air bearing surface. FIGS. 63 to 66 are plan views for explaining the method of forming a thin-film coil of the present embodiment.

In the method of manufacturing the thin-film magnetic head of the present embodiment, as shown in FIGS. 46A and 46B, an insulating layer 2 made of alumina ($Al_2O_3$), for example, is first deposited to a thickness of about 2 to 5 μm on a substrate 1 made of aluminum oxide and titanium carbide ($Al_2O_3$—TiC), for example. On the insulating layer 2, a bottom shield layer 3 of a magnetic material such as Permalloy (NiFe) is formed to a thickness of about 2 to 3 μm for making a reproducing head. The bottom shield layer 3 is selectively formed on the insulating layer 2 by plating using a photoresist film as a mask, for example. Then, although not shown, an insulating layer made of alumina, for example, is formed all over to a thickness of 3 to 4 μm, for example. The insulating layer is then polished by, for example, CMP, to expose the bottom shield layer 3 and to flatten the surface.

On the bottom shield layer 3, a bottom shield gap film 4 serving as an insulating film is formed to a thickness of about 20 to 40 nm, for example. On the bottom shield gap film 4, an MR element 5 for magnetic signal detection is formed to a thickness of tens of nanometers. For example, the MR element 5 may be formed by selectively etching an MR film formed by sputtering. The MR element 5 is located near a region where to form an air bearing surface to be described later. Next, although not shown, a pair of electrode layers to be electrically connected to the MR element 5 are formed to a thickness of tens of nanometers on the bottom shield gap film 4. Then, a top shield gap film 7 serving as an insulating film is formed to a thickness of about 20 to 40 nm, for example, on the bottom shield gap film 4 and the MR element 5. The MR element 5 is embedded in the shield gap films 4 and 7.

On the top shield gap film 7, a top shield layer 8 made of a magnetic material is selectively formed to a thickness of approximately 1.0 to 1.5 μm for the reproducing head. Then, an insulating layer 9 made of alumina, for example, is formed to a thickness of approximately 0.15 to 0.3 μm over the entire top surface of the laminate obtained through the foregoing steps. Next, a first layer 110a of a bottom pole layer 110 is formed to a thickness of approximately 0.5 to 1.0 μm over the entire top surface of the laminate. The bottom pole layer 110 includes the first layer 110a, and second to ninth layers 110b–110i to be described later.

The first layer 110a is formed of a high saturation flux density material such as FeAlN, FeN, FeCo, CoFeN, and FeZrN by sputtering. The first layer 110a may also be formed by plating, using NiFe (Ni: 80 weight %; Fe: 20 weight %), NiFe (Ni: 45 weight %; Fe: 55 weight %) that is a high saturation flux density material, or FeCo (Fe: 67 weight %; Co: 33 weight %).

Next, as shown in FIGS. 47A and 47B, an insulating film 111 made of alumina, for example, is formed to a thickness of 0.2 μm on the first layer 110a. The insulating film 111 is then selectively etched to form openings in the insulating film 111 at positions where to form the second layer 110b and the third layer 110c.

Next, the first layer portion 121 of the thin-film coil is formed on the insulating film 111 through the following steps. Initially, an electrode film (not shown) made of Cu, for example, is formed over the entire top surface of the laminate to a thickness of, for example, 50 to 80 nm by sputtering. A frame made of a photoresist is formed on the electrode film by photolithography. This frame has an opening in the region where to form the first layer portion 121. An electric current is passed through the electrode film for electroplating to form a plating layer made of Cu, for example, to a thickness of 1.0 to 1.5 μm. After the frame is removed, the electrode film is etched by, for example, ion beam etching using the plating layer as a mask. Consequently, the electrode film is removed at portions other than the portion lying under the plating layer. The remaining portion of the electrode film and the plating layer make the first layer portion 121. The first layer portion 121 is a flat conductive layer of two turns. The first layer portion 121 has a connecting portion 121E near one of its ends, which is connected to a second layer portion 122 of the thin-film coil to be formed later.

Next, although not shown, a frame for forming the second layer 110b and the third layer 110c by frame plating is formed on the laminate by photolithography.

Next, as shown in FIGS. 48A and 48B, electroplating is performed to form the second layer 110b and the third layer 110c, each made of a magnetic material, on the first layer 110a to a thickness of, for example, 2.5 to 3.5 µm each. For example, the material of the second layer 110b and the third layer 110c may be CoNiFe (Co: 67 weight %, Ni: 15 weight %, Fe: 18 weight %) having a saturation flux density of 1.8 to 1.9 T, or FeCo (Fe: approximately 60 weight %, Co: approximately 40 weight %) having a saturation flux density of 2.4 T. In the present embodiment, when the second layer 110b and the third layer 110c are formed by plating, no special electrode film is used but the unpatterned first layer 110a is used as an electrode and a seed layer for plating.

The second layer 110b is disposed near the region where to form the air bearing surface 30 described later. The third layer 110c is a portion for connecting the first layer 110a to a top pole layer 126 to be described later, and is disposed near the center of the first layer portion 121.

Next, as shown in FIGS. 49A and 49B, a photoresist layer 140 is formed to cover the first layer portion 121, the second layer 110b and the third layer 110c. Using this photoresist layer 140 as a mask, the first layer 110a is selectively etched by, for example, ion beam etching, to thereby pattern the first layer 110a.

Next, as shown in FIGS. 50A and 50B, an insulating layer 141 made of alumina, for example, is formed to a thickness of 2 to 3 µm by bias sputtering, for example, to cover the entire top surface of the laminate. The insulating layer 141 is polished by, for example, CMP so that the second layer 110b and the third layer 110c are exposed and the top surfaces of the second layer 110b, the third layer 110c, the photoresist layer 140, and the insulating layer 141 are flattened. By this polishing, the second layer 110b and the third layer 110c are also adjusted to a thickness of 0.5 to 0.8 µm.

In the foregoing description, the insulating layer 141 is formed without removing the photoresist layer 140. Nevertheless, the photoresist layer 140 may be removed, and then an insulating film may be formed to fill the winding gap of the first layer portion 121 so as to form the insulating layer 141 thereon. In this case, the insulating film is preferably a photoresist film or a spin-on-glass (SOG) film.

Figure 63:
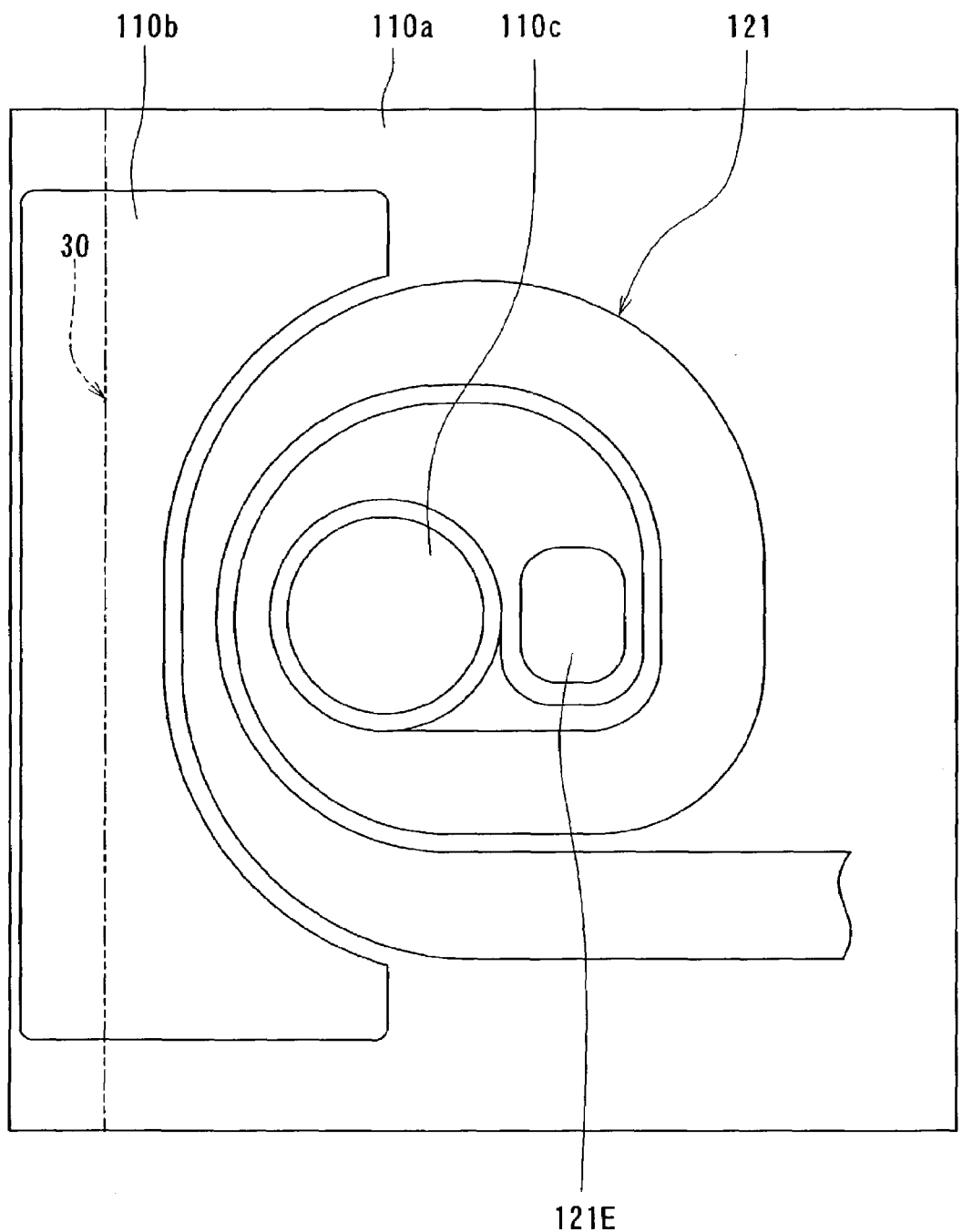
FIG. 63 is a plan view showing a first layer portion of the thin-film coil in the third embodiment of the invention.

FIG. 63 is a plan view showing the second layer 110b, the third layer 110c, and the first layer portion 121. FIG. 63 also shows an air bearing surface 30 to be formed later. As mentioned above, the first layer portion 121 has the connecting portion 121E. The connecting portion 121E is located at a first position which is farther from the air bearing surface 30 than the third layer 110c is. The other end of the first layer portion 121 is connected to a single electrode pad to be described later.

Next, as shown in FIGS. 51A and 51B, an insulating film 112 made of alumina, for example, is formed over the entire top surface of the laminate to a thickness of 0.1 to 0.2 µm. The insulating film 112 is selectively etched to remove portions corresponding to the regions where to dispose the fourth layer 110d and the fifth layer 110e and the portion lying over the connecting portion 121E. Consequently, a contact hole is formed over the connecting portion 121E.

Next, the fourth layer 110d is formed on the second layer 110b, the fifth layer 110e on the third layer 110c, and the second layer portion 122 on the insulating film 112. The fourth layer 110d, the fifth layer 110e, and the second layer portion 122 have a thickness of 1.0 to 1.5 µm, for example. The material and forming method of the fourth layer 110d and the fifth layer 110e are the same as those of the second layer 110b and the third layer 110c. The material and forming method of the second layer portion 122 are the same as those of the first layer portion 121. The second layer portion 122 is a flat conductive layer of two turns. The second layer portion 122 has a connecting portion 122S near one of its ends, and a connecting portion 122E near the other end. The connecting portion 122S is connected to the connecting portion 121E of the first layer portion 121 through the contact hole. The connecting portion 122E is connected to a third layer portion 123 of the thin-film coil to be formed later.

Next, as shown in FIGS. 52A and 52B, an insulating film 142 made of photoresist, for example, is formed to fill the winding gap of the second layer portion 122. An insulating layer 143 made of alumina, for example, is then formed to a thickness of 2 to 3 µm so as to cover the entire top surface of the laminate. The insulating layer 143 is polished by, for example, CMP so that the fourth layer 110d and the fifth layer 110e are exposed and the top surfaces of the fourth layer 110d, the fifth layer 110e, the insulating film 142, and the insulating layer 143 are flattened. By this polishing, the fourth layer 110d and the fifth layer 110e are also adjusted to a thickness of 0.5 to 0.8 µm.

Figure 64:
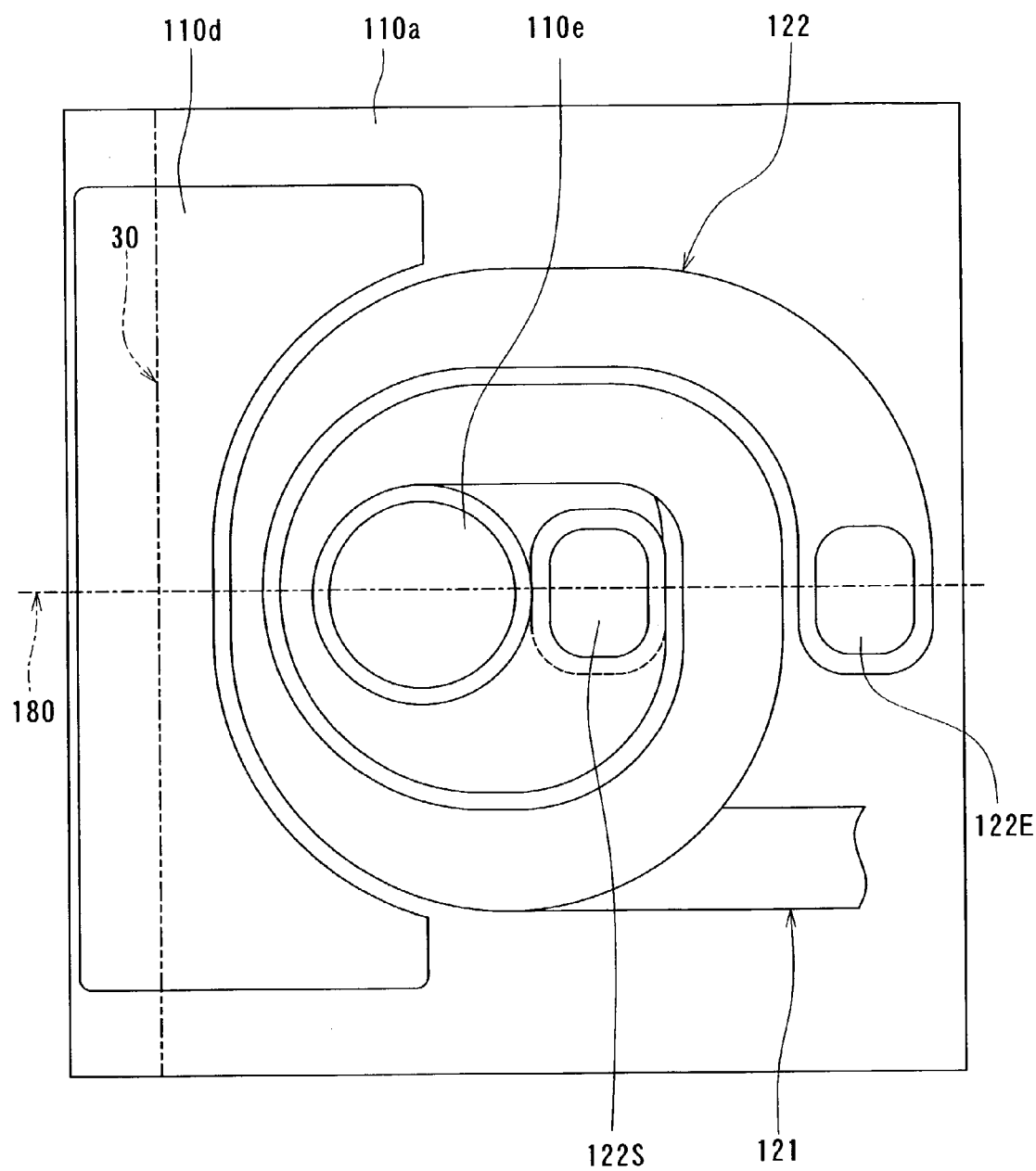
FIG. 64 is a plan view showing a second layer portion of the thin-film coil in the third embodiment of the invention.

FIG. 64 is a plan view showing the fourth layer 110d, the fifth layer 110e, and the second layer portion 122. FIG. 64 also shows the air bearing surface 30 to be formed later. The fourth layer 110d and the fifth layer 110e are located on the second layer 110b and the third layer 110c shown in FIG. 63, respectively. As described above, the second layer portion 122 has the connecting portions 122S and 122E. The connecting portion 122S is located on the connecting portion 121E shown in FIG. 63. The connecting portion 122E is located at a second position which is farther from the air bearing surface 30 than the third layer 110c and the fifth layer 110e are and farther from the air bearing surface 30 than the connecting portion 121E shown in FIG. 63 is. As shown in FIG. 64, the centers of the third layer 110c and the fifth layer 110e and the centers of the connecting portions 121E, 122E are aligned on a line 180 which is perpendicular to the air bearing surface 30. The connecting portion 121E lies under the connecting portion 122S.

Next, as shown in FIGS. 53A and 54B, an insulating film 113 made of alumina, for example, is formed over the entire top surface of the laminate to a thickness of 0.1 to 0.2 µm. The insulating film 113 is selectively etched to remove portions corresponding to the regions where to dispose the sixth layer 110f and the seventh layer 110g and the portion lying over the connecting portion 122E. Consequently, a contact hole is formed over the connecting portion 122E.

Next, the sixth layer 110f is formed on the fourth layer 110d, the seventh layer 110g on the fifth layer 110e, and the third layer portion 123 on the insulating film 113. The sixth layer 110f, the seventh layer 110g, and the third layer portion 123 have a thickness of 1.0 to 1.5 µm, for example. The material and forming method of the sixth layer 110f and the seventh layer 110g are the same as those of the second layer 110b and the third layer 110c. The material and forming method of the third layer portion 123 are the same as those of the first layer portion 121. The third layer portion 123 is a flat conductive layer of two turns. The third layer portion 123 has a connecting portion 123S near one of its ends, and a connecting portion 123E near the other end. The connecting portion 123S is connected to the connecting portion 122E of the second layer portion 122 through the contact hole. The connecting portion 123E is connected to a connecting portion layer 124 to be formed later.

Next, an insulating film 144 made of photoresist, for example, is formed to fill the winding gap of the third layer portion 123. An insulating layer 145 made of alumina, for example, is then formed to a thickness of 2 to 3 µm so as to cover the entire top surface of the laminate. The insulating layer 145 is polished by, for example, CMP so that the sixth layer 110f and the seventh layer 110g are exposed and the top surfaces of the sixth layer 110f, the seventh layer 110g, the insulating film 144, and the insulating layer 145 are flattened. By this polishing, the sixth layer 110f and the seventh layer 110g are also adjusted to a thickness of 0.5 to 0.8 µm.

Figure 65:
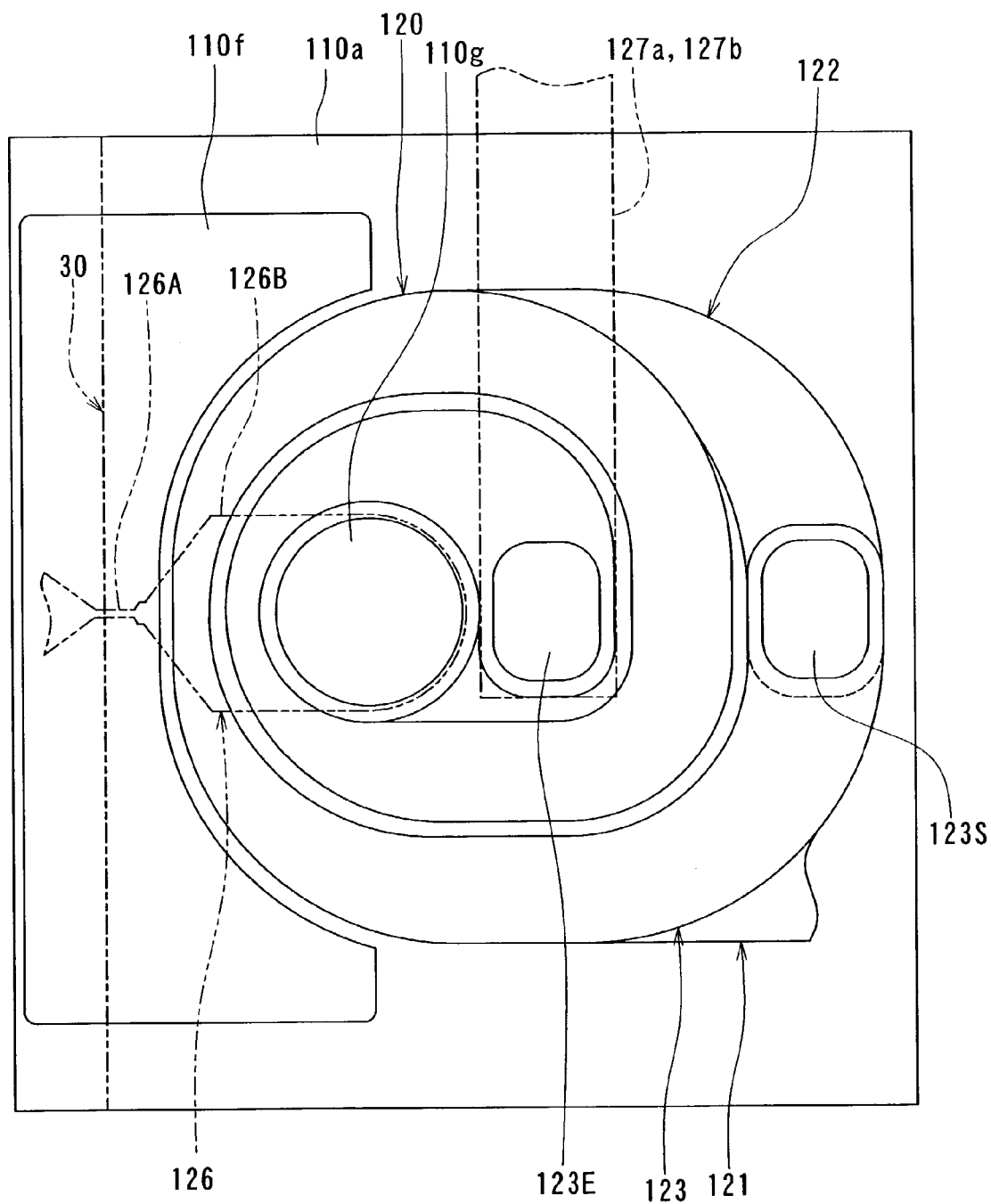
FIG. 65 is a plan view showing a third layer portion of the thin-film coil in the third embodiment of the invention.

FIG. 65 is a plan view showing the sixth layer 110f, the seventh layer 110g, and the third layer portion 123. FIG. 65 also shows the top pole layer 126 and the air bearing surface 30 to be formed later. The sixth layer 110f and the seventh layer 110g are located on the fourth layer 110d and the fifth layer 110e shown in FIG. 64, respectively. As described above, the third layer portion 123 has the connecting portions 123S and 123E. The connecting portion 123S is located on the connecting portion 122E shown in FIG. 64. The connecting portion 123E lies over the connecting portion 122S shown in FIG. 64 via the insulating film 113.

The thin-film coil 120 including the first to third layer portions 121–123 is thereby completed.

FIG. 63 to FIG. 65 show the thin-film coil 120 that is wound clockwise from the end of the first layer portion 121 on the electrode-pad side to the end of the third layer portion 123 on the electrode-pad side. However, the thin-film coil 120 may be wound in the opposite direction.

Next, as shown in FIGS. 54A and 54B, an insulating film 114 made of alumina, for example, is formed over the entire top surface of the laminate to a thickness of 0.1 to 0.2 µm. The insulating film 114 is then selectively etched to remove portions corresponding to the regions where to dispose the eighth layer 110h and the ninth layer 110i and the portion lying over the connecting portion 123E. Consequently, a contact hole is formed over the connecting portion 123E.

Next, a magnetic layer 115 of a magnetic material is formed to a thickness of 0.3 to 0.5 µm to cover the entire top surface of the laminate. For example, the magnetic layer 115 is formed by sputtering, using a high saturation flux density material such as FeAlN, FeN, FeCo, CoFeN, and FeZrN. The magnetic layer 115 may also be formed by plating, using CoNiFe (Co: 10 weight %; Ni: 20 weight %; Fe: 70 weight %) or FeCo (Fe: 67 weight %; Co: 33 weight %).

Next, etching masks 116a, 116b, and 116c are formed on the magnetic layer 115 at portions corresponding to the sixth layer 110f, the seventh layer 110g, and the connecting portion 123E, respectively.

Next, as shown in FIGS. 55A and 55B, the magnetic layer 115 is etched by, for example, ion beam etching, using the above-mentioned etching masks 116a, 116b, and 116c. After the etching, portions of the magnetic layer 115 remaining under the etching masks 116a, 116b, and 116c make the eighth layer 110h, the ninth layer 110i, and the connecting portion layer 124. The eighth layer 110h, the ninth layer 110i, and the connecting portion layer 124 lie on the sixth layer 110f, the seventh layer 110g, and the connecting portion 123E, respectively.

Next, an insulating layer 117 made of alumina, for example, is formed to a thickness of 0.4 to 0.6 µm by sputtering so as to cover the entire top surface of the laminate.

Next, as shown in FIGS. 56A and 56B, the etching masks 116a, 116b, and 116c are lifted off.

Next, as shown in FIGS. 57A and 57B, the entire top surface of the laminate is polished by CMP, for example, as much as 0.1 µm or so, to thereby flatten the top surface of the laminate. One of ends of the eighth layer 110h farther from the air bearing surface determines the throat height of the recording head. The third layer 110c, the fifth layer 110e, the seventh layer 110g, and the ninth layer 110i constitute a coupling portion 131 for establishing magnetic coupling between the bottom pole layer 110 and the top pole layer 126.

Next, a recording gap layer 118 is formed to a thickness of 0.06 to 0.08 µm so as to cover the entire top surface of the laminate. The recording gap layer 118 may be made of an insulating material such as alumina, or a nonmagnetic metal or nonmagnetic metal compound material. The nonmagnetic metal material may be a high-melting metal material. Examples of the nonmagnetic metal material or the nonmagnetic metal compound material include NiCu, Ru, Ta, Mo, W, $NiSi_2$, $MoSi_2$, and $WSi_2$. Then, a portion of the recording gap layer 118 lying on the ninth layer 110i and on the connecting portion layer 124 is selectively etched.

Next, as shown in FIGS. 58A and 58B, a magnetic layer 125 made of a magnetic material is formed to a thickness of 0.5 to 1.2 µm so as to cover the entire top surface of the laminate. For example, the magnetic layer 125 is formed by sputtering, using a high saturation flux density material such as FeAlN, FeN, FeCo, CoFeN, and FeZrN. The magnetic layer 125 may also be formed by plating, using CoNiFe (Co: 10 weight %; Ni: 20 weight %; Fe: 70 weight %) or FeCo (Fe: 67 weight %; Co: 33 weight %). The magnetic layer 125 is connected to the ninth layer 110i and the connecting portion layer 124.

Next, as shown in FIGS. 59A and 59B, a second layer 126b of the top pole layer 126 to be described later and a connecting layer 127b are formed to a thickness of, for example, 1.0 to 2.0 µm on the magnetic layer 125 by frame plating, for example. The second layer 126b and the connecting layer 127b are made of a metal magnetic material which is different from the material constituting the magnetic layer 125, such as NiFe or CoNiFe. The second layer 126b is arranged to extend from a position corresponding to the eighth layer 110h to a position corresponding to the ninth layer 110i. The connecting layer 127b is arranged to extend from a position corresponding to the connecting portion layer 124 to a position outside of the region where the first layer 110a of the bottom pole layer 110 is located.

The frame for forming the second layer 126b and the connecting layer 127b by frame plating is formed of a photoresist film having a thickness of 1.8 to 2.8 µm, for example. Forming the frame out of such a photoresist film of relatively small thickness allows fine, precise formation of the second layer 126b in particular. This makes it possible for the top pole layer 126 to define a track width as small as 0.1 to 0.2 µm or so with precision.

Next, the magnetic layer 125 is selectively etched by RIE using the second layer 126b and the connecting layer 127b as etching masks. Consequently, the portion of the magnetic layer 125 left unetched makes a first layer 126a of the top pole layer 126 and a connecting layer 127a. The first layer 126a lies under the second layer 126b. The connecting layer 127a lies under the connecting layer 127b.

The connecting layers 127a and 127b establish connection between the connecting portion 123E of the third layer 123 and a single electrode pad to be described later.

The RIE is performed using, for example, etching gas that contains halogen-type gas and $O_2$ or $CO_2$. Examples of halogen-type gas available include ones containing at least either one of $Cl_2$ and $BCl_3$. Among examples of the etching gas are ones containing $Cl_2$ and $CO_2$, ones containing $BCl_3$, $Cl_2$ and $CO_2$, and ones containing $BCl_3$, $Cl_2$ and $O_2$.

During the etching, the magnetic layer 125 preferably falls within the range of 50–300° C., and more preferably 200–300° C., in temperature.

According to the above-described etching method, it is possible to etch the magnetic layer 125 in a short time and to precisely control the profiles of the first layer 126a and the connecting layer 127a that are made of the magnetic layer 125 having undergone the etching. According to this etching method, it is also possible to reduce adherents on the sidewalls of the etched magnetic layer 125, such as halogen-type gas molecules.

The top pole layer 126 has the first layer 126a that touches the recording gap layer 118, and the second layer 126b lying on the first layer 126a. As shown in FIG. 65, the top pole layer 126 includes the track width defining portion 126A and the yoke portion 126B. The track width defining portion 126A has an end located at the air bearing surface 30, and the other end located away from the air bearing surface 30. The yoke portion 126B is connected to the other end of the track width defining portion 126A. The yoke portion 126B has a width which is equal to that of the track width defining portion 126A at the interface with the track width defining portion 126A. The width of the yoke portion 126B gradually increases from this interface with an increase in distance from the track width defining portion 126A, and finally becomes constant. The track width defining portion 126A is the magnetic pole portion of the top pole layer 126, and defines the recording track width. In forming the first layer 126a by RIE, the track width defining portion 126A is given an initial width of the order of 0.1 to 0.2 µm. Here, by way of example, the track width defining portion 126A shall be 0.15 µm in initial width.

Next, the sidewalls of the track width defining portion 126A of the top pole layer 126 are etched by, for example, ion beam etching, so that the width of the track width defining portion 126A is reduced to 0.1 µm, for example. For example, this etching is performed so that ion beams travel at an angle of 40 to 50° with respect to a direction perpendicular to the top surface of the second layer 126b.

Next, although not shown, a photoresist mask having an opening around the track width defining portion 126A is formed. Then, as shown in FIGS. 60A and 60B, the recording gap layer 118 around the track width defining portion 126A is etched by, for example, RIE with a mixed gas of Cl$_2$ and BCl$_3$ as the etching gas, using the above-mentioned photoresist mask and the top pole layer 126 as masks.

Then, the top pole layer 126, the recording gap layer 118 lying below the same, and the above-mentioned photoresist mask are used as masks to etch part of the eighth layer 110h of the bottom pole layer 110 at around the track width defining portion 126A by ion beam etching, for example. The etching depth of the eighth layer 110h is 0.17 to 0.22 µm, for example. This etching may be effected by an ion beam etching in which ion beams travel at an angle of 45° with respect to the direction perpendicular to the top surface of the second layer 126b, or by combining an ion beam etching in which the above-mentioned angle is 0° with the ion beam etching in which the above-mentioned angle is 45°. A trim structure as shown in FIG. 60B is thereby formed. A portion of the eighth layer 110h, the portion opposed to the track width defining portion 126A of the top pole layer 126 with the recording gap layer 118 in between, is the magnetic pole portion of the bottom pole layer 110. Instead of the ion beam etching, the eighth layer 110h may be etched by RIE under the same etching condition as that for the magnetic layer 125.

It is important for the track width defining portion 126A to be shaped precisely at the first layer 126a that touches the recording gap layer 118, in particular. The above-described etching of the sidewalls of the track width defining portion 126A is intended only to reduce the width of the track width defining portion 126A by 0.05 µm or so. Besides, the second layer 126b lies over the first layer 126a. Consequently, the etching of the sidewalls of the track width defining portion 126A simply reduces the width of the first layer 126a without decreasing the thickness of the first layer 126a or making a portion of the first layer 126a near the top thinner than a portion thereof near the recording gap layer 118.

After the RIE-based formation of the track width defining portion 126A, the track width defining portion 126A may sometimes be corroded if molecules of the halogen-type gas used in the RIE adhere to the sidewalls of the track width defining portion 126A. According to the present embodiment, however, even if molecules of the halogen-type gas adhere to the sidewalls of the track width defining portion 126A, the sidewalls can be etched by ion beam etching to remove the molecules of the halogen-type gas from the sidewalls. As a result, the track width defining portion 126A can be prevented from being corroded.

Next, as shown in FIGS. 61A and 61B, an overcoat layer 129 made of alumina, for example, is formed to a thickness of 20 to 30 µm so as to cover the entire top surface of the laminate. Its surface is flattened, and not-shown four electrode pads are formed thereon. Two out of the four electrode pads are connected to the thin-film coil 120. The other two are connected to the pair of electrode layers that are connected to the MR element 5. Finally, a slider including the foregoing layers is lapped to form the air bearing surface 30. This completes the thin-film magnetic head including the recording head and the reproducing head.

In the present embodiment, the recording head comprises: the bottom pole layer 110 and the top pole layer 126 that are magnetically coupled to each other and that include the magnetic pole portions opposed to each other and located in regions of the pole layers on the side of the air bearing surface 30; the recording gap layer 118 interposed between the magnetic pole portion of the bottom pole layer 110 and the magnetic pole portion of the top pole layer 126; and the thin-film coil 120, at least a part of which is disposed between the bottom and top pole layers 110 and 126 and insulated from the bottom and top pole layers 110 and 126. The bottom pole layer 110 and the top pole layer 126 of the present embodiment correspond to the first pole layer and the second pole layer of the invention, respectively.

The bottom pole layer 110 has the first to third layers 110a–110c. The first layer 110a is located opposite to the thin-film coil 120. The second layer 110b is located closer to the air bearing surface 30 than the thin-film coil 120 is, and connected to a surface of the first layer 110a that is closer to the recording gap layer 118. The third layer 110c is located on the first layer 110a at a position away from the air bearing surface 30. The bottom pole layer 110 further has: the fourth layer 110d, the sixth layer 110f, and the eighth layer 110h that are laminated on the second layer 110b in succession; and the fifth layer 110e, the seventh layer 110g, and the ninth layer 110i that are laminated on the third layer 110c in succession. The third layer 110c, the fifth layer 110e, the seventh layer 110g, and the ninth layer 110i constitute the coupling portion 131 for establishing magnetic coupling between the bottom pole layer 110 and the top pole layer 126.

The coupling portion 131 of the present embodiment has the same shape as that of the coupling portion 31 of the first embodiment. More specifically, the coupling portion 131 has an end face that faces toward the air bearing surface 30. This end face includes a curved surface convex toward the air bearing surface 30. For example, this end face has the shape of a part of a cylindrical surface. FIG. 63 to FIG. 65 show the case where the coupling portion 131 has a circular top surface, as the coupling portion 31 shown in FIG. 23 does. Nevertheless, the shape of the top surface of the coupling portion 131 is not limited thereto, but may be the same as those of the coupling portion 31 shown in FIG. 24 to FIG. 29.

Figure 70:
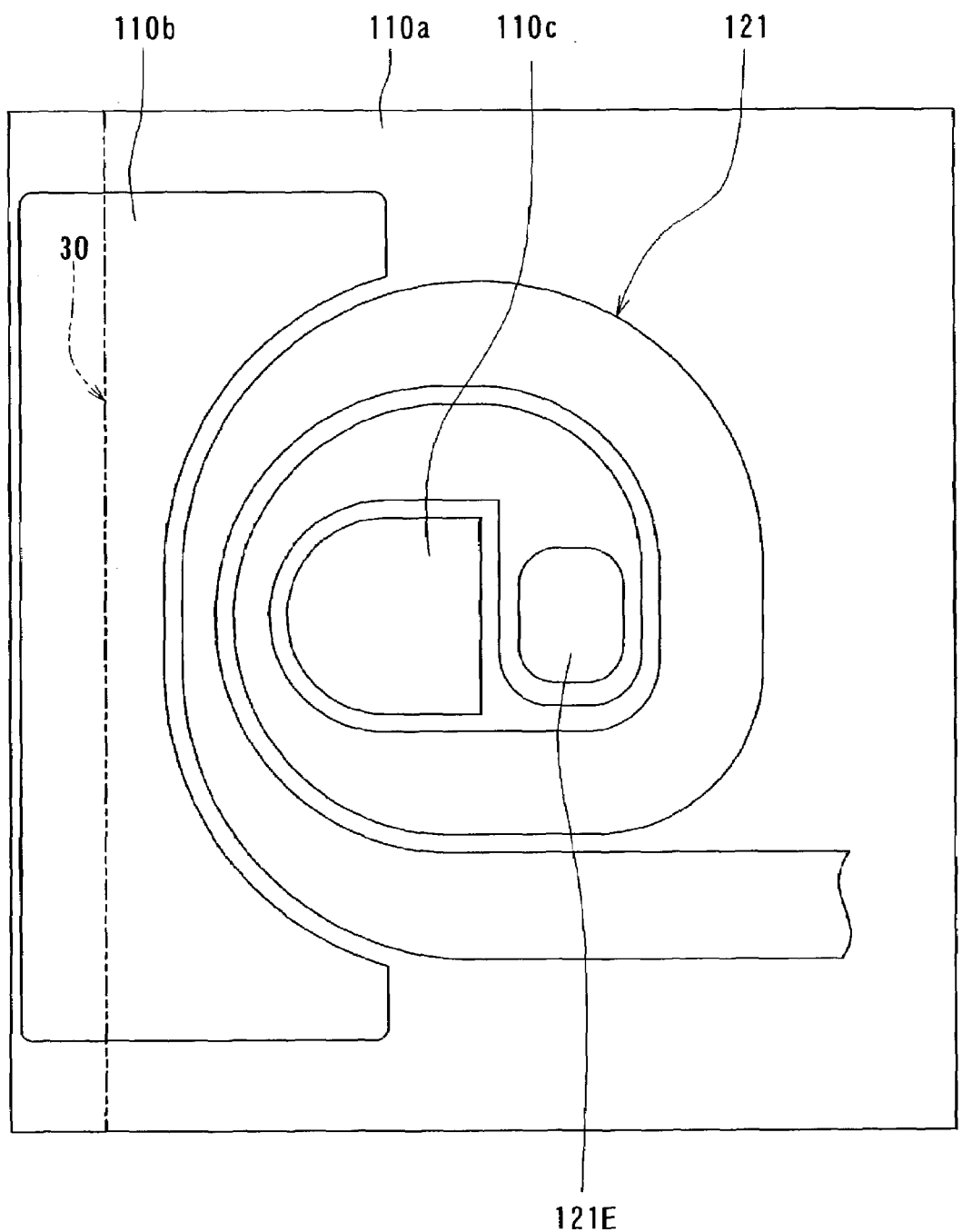
FIG. 70 is a plan view showing a first layer portion of the thin-film coil of the modified example of the third embodiment of the invention.
Figure 71:
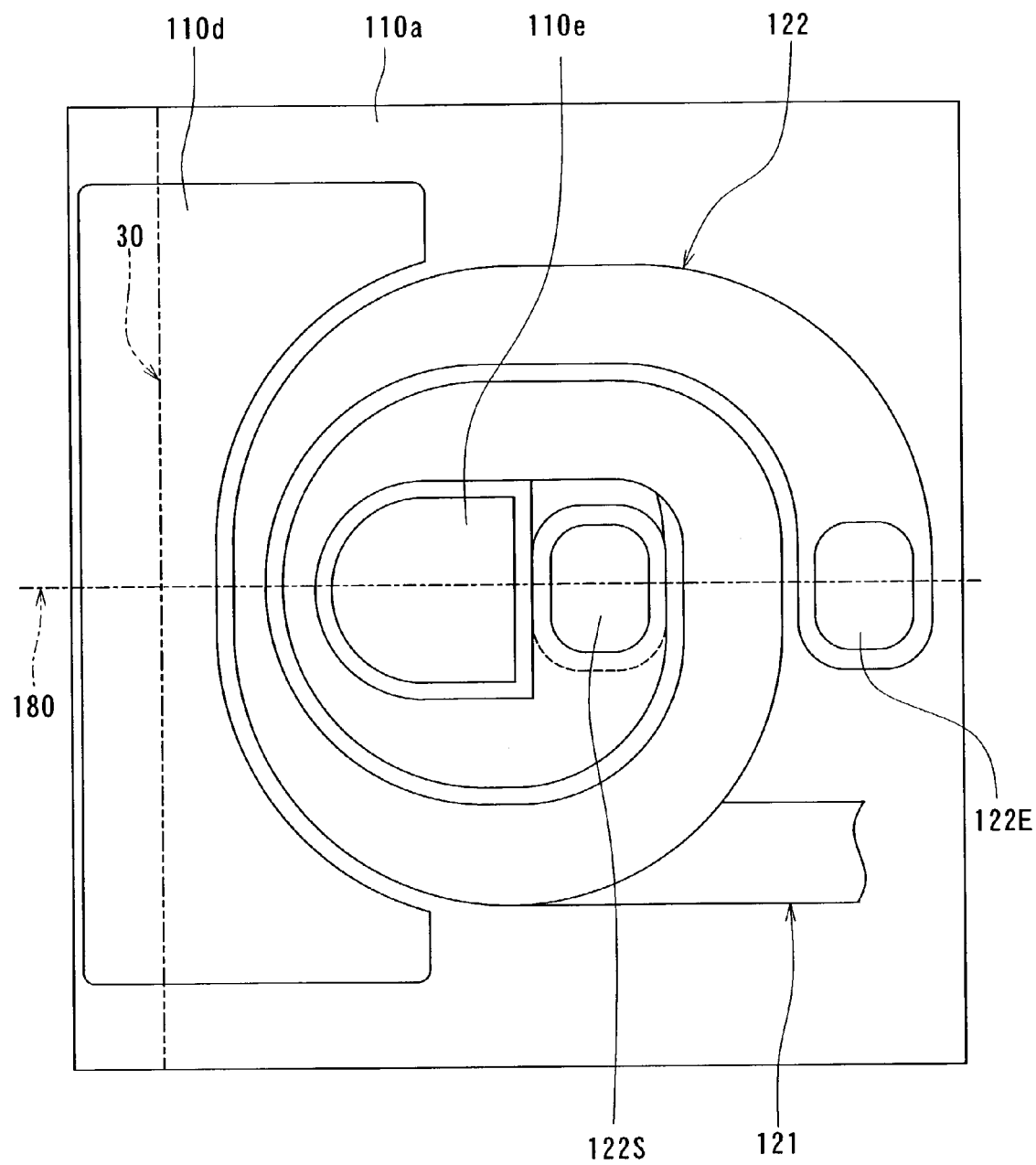
FIG. 71 is a plan view showing a second layer portion of the thin-film coil of the modified example of the third embodiment of the invention.
Figure 72:
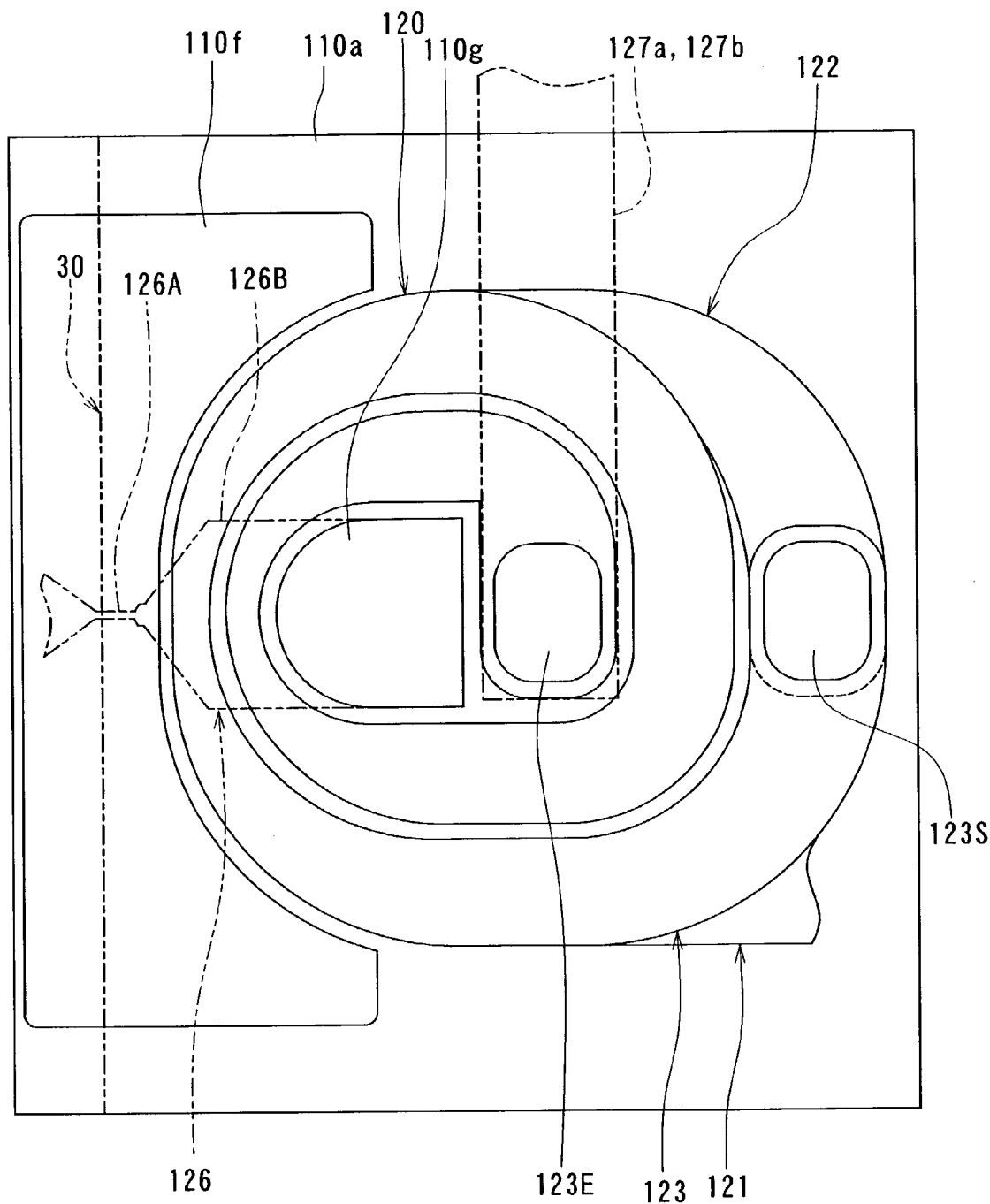
FIG. 72 is a plan view showing a third layer portion of the thin-film coil of the modified example of the third embodiment of the invention.

Here, FIG. 70 to FIG. 72 show an example where the top surface of the coupling portion 131 has the same shape as that of the coupling portion 31 shown in FIG. 29. Like FIG. 63, FIG. 70 is a plan view showing the second layer 110b, the third layer 110c, and the first layer portion 121. Like FIG. 64, FIG. 71 is a plan view showing the fourth layer 110d, the fifth layer 110e, and the second layer portion 122. Like FIG. 65, FIG. 72 is a plan view showing the sixth layer 110f, the seventh layer 110g, and the third layer portion 123.

The top pole layer 126 has the first layer 126a and the second layer 126b both of which are flat. The top pole layer 126 includes the track width defining portion 126A and the yoke portion 126B. The track width defining portion 126A has one end located at the air bearing surface 30 and the other end located away from the air bearing surface 30. The yoke portion 126B is connected to the other end of the track width defining portion 126A. The track width defining portion 126A is the magnetic pole portion of the top pole layer 126, and defines the recording track width.

As shown in FIGS. 61 and 65, the thin-film coil 120 of the present embodiment has the first layer portion 121 to the third layer portion 123 each of which is made of a flat conductive layer of two turns. The first to third layer portions 121–123 are laminated, and electrically connected in series to each other. The first to third layer portions 121–123 are disposed around the coupling portion 131. Each of the first to third layer portions 121–123 is interposed in part between the coupling portion 131 and the second layer 110b, the fourth layer 110d and the sixth layer 110f.

The first layer portion 121 corresponds to the lowermost conductive layer of the invention. The third layer portion 123 corresponds to the uppermost conductive layer of the invention. The second layer portion 122 corresponds to the intermediate conductive layer of the invention. The first layer portion 121 has a single connecting portion 121E connected to the second layer portion 122. The second layer portion 122 has the connecting portion 122S connected to the connecting portion 121E of the first layer portion 121, and the connecting portion 122E connected to the connecting portion 123S of the third layer portion 123. The third layer portion 123 has a single connecting portion 123S connected to the connecting portion 122E of the second layer portion 122.

Among the plurality of connecting portions mentioned above, the connecting portions 121E, 122S, and 123E are located at the first position that is farther from the air bearing surface 30 than the coupling portion 131 is. The connecting portions 122E and 123S are located at the second position that is farther from the air bearing surface 30 than the coupling portion 131 is and farther from the air bearing surface 30 than the first position is. The center of the coupling portion 131, the first position, and the second position are aligned on the line 180 that is perpendicular to the air bearing surface 30.

In the present embodiment, the thin-film coil is not limited to the one consisting of three layers, but may be one consisting of a single layer, two layers, or four or more layers.

Figure 66:
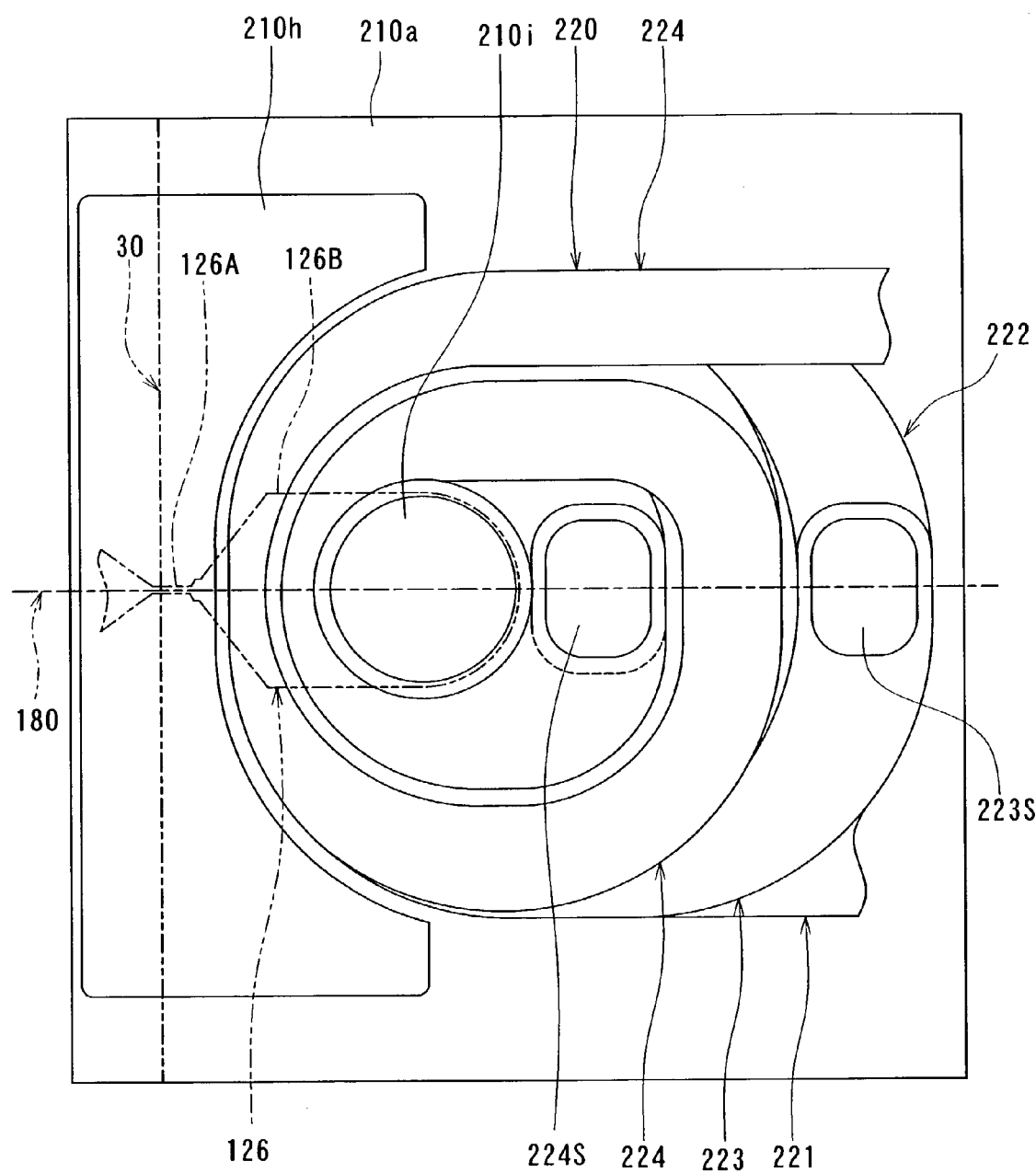
FIG. 66 is a plan view showing the thin-film coil in FIGS. 62A and 62B.

FIGS. 62A and 62B, and FIG. 66 show an example of configuration of a thin-film magnetic head having a thin-film coil consisting of four layers. FIG. 62A is a cross section orthogonal to the air bearing surface and the top surface of the substrate. FIG. 62B is a cross section of a magnetic pole portion parallel to the air bearing surface. FIG. 66 is a plan view showing the thin-film coil shown in FIG. 62A and FIG. 62B.

The thin-film magnetic head shown in FIGS. 62A, 62B and FIG. 66 has a thin-film coil 220 instead of the thin-film coil 120 of the thin-film magnetic head shown in FIGS. 61A, 61B and FIG. 65, and a bottom pole layer 210 instead of the bottom pole layer 110 of the thin-film magnetic head shown in FIGS. 61A, 61B and FIG. 65.

The bottom pole layer 210 has first to third layers 210a–210c. The first layer 210a is located opposite to the thin-film coil 220. The second layer 210b is located closer to the air bearing surface 30 than the thin-film coil 220 is, and connected to a surface of the first layer 210a that is closer to the recording gap layer 118. The third layer 210c is located on the first layer 210a at a position away from the air bearing surface 30. The bottom pole layer 210 further has: a fourth layer 210d, a sixth layer 210f, an eighth layer 210h, and a tenth layer 210j that are laminated on the second layer 210b in succession; and a fifth layer 210e, a seventh layer 210g, a ninth layer 210i, and an eleventh layer 210k that are laminated on the third layer 210c in succession. The third layer 210c, the fifth layer 210e, the seventh layer 210g, the ninth layer 210i, and the eleventh layer 210k constitute the coupling portion 131 for establishing magnetic coupling between the bottom pole layer 210 and the top pole layer 126.

The thin-film coil 220 has first to fourth layer portions 221–224 each of which is made of a flat conductive layer of two turns. The first to fourth layer portions 221–224 are laminated, and electrically connected in series to each other. The first to fourth layer portions 221–224 are disposed around the coupling portion 131. Each of the first to fourth layer portions 221–224 is interposed in part between the coupling portion 131 and the second layer 210b, the fourth layer 210d, the sixth layer 210f and the eighth layer 210h.

The first layer portion 221 corresponds to the lowermost conductive layer of the invention. The fourth layer portion 224 corresponds to the uppermost conductive layer of the invention. The second layer portion 222 and the third layer portion 223 correspond to the intermediate conductive layers of the invention. The first layer portion 221 has a single connecting portion 221E connected to the second layer portion 222. The second layer portion 222 has a connecting portion 222S connected to the connecting portion 221E of the first layer portion 221, and a connecting portion 222E connected to a connecting portion 223S of the third layer portion 223. The third layer portion 223 has the connecting portion 223S connected to the connecting portion 222E of the second layer portion 222, and a connecting portion 223E connected to a connecting portion 224S of the fourth layer portion 224. The fourth layer portion 224 has the single connecting portion 224S connected to the connecting portion 223E of the third layer portion 223. The end of the first layer portion 221 opposite from the connecting portion 221E is connected to a single electrode pad. The end of the fourth layer portion 224 opposite from the connecting portion 224S is connected to another single electrode pad.

Among the plurality of connecting portions mentioned above, the connecting portions 221E, 222S, 223E, and 224S are located at the first position that is farther from the air bearing surface 30 than the coupling portion 131 is. The connecting portions 222E and 223S are located at the second position that is farther from the air bearing surface 30 than the coupling portion 131 is and farther from the air bearing surface 30 than the first position is. The center of the coupling portion 131, the first position, and the second position are aligned on the line 180 that is perpendicular to the air bearing surface 30.

The method of forming the thin-film coil 220 is the same as the method of forming the thin-film coil 120, except for the difference in the number of layers to be laminated. The method of forming the bottom pole layer 210 is also the same as the method of forming the bottom pole layer 110, except for the difference in the number of layers to be laminated.

Thin-film magnetic heads having a thin-film coil consisting of an even number of layers, such as the one having the thin-film coil 220 consisting of four layers as shown in FIG. 66, do not require the connecting layers 127a and 127b shown in FIG. 65.

Figure 73:
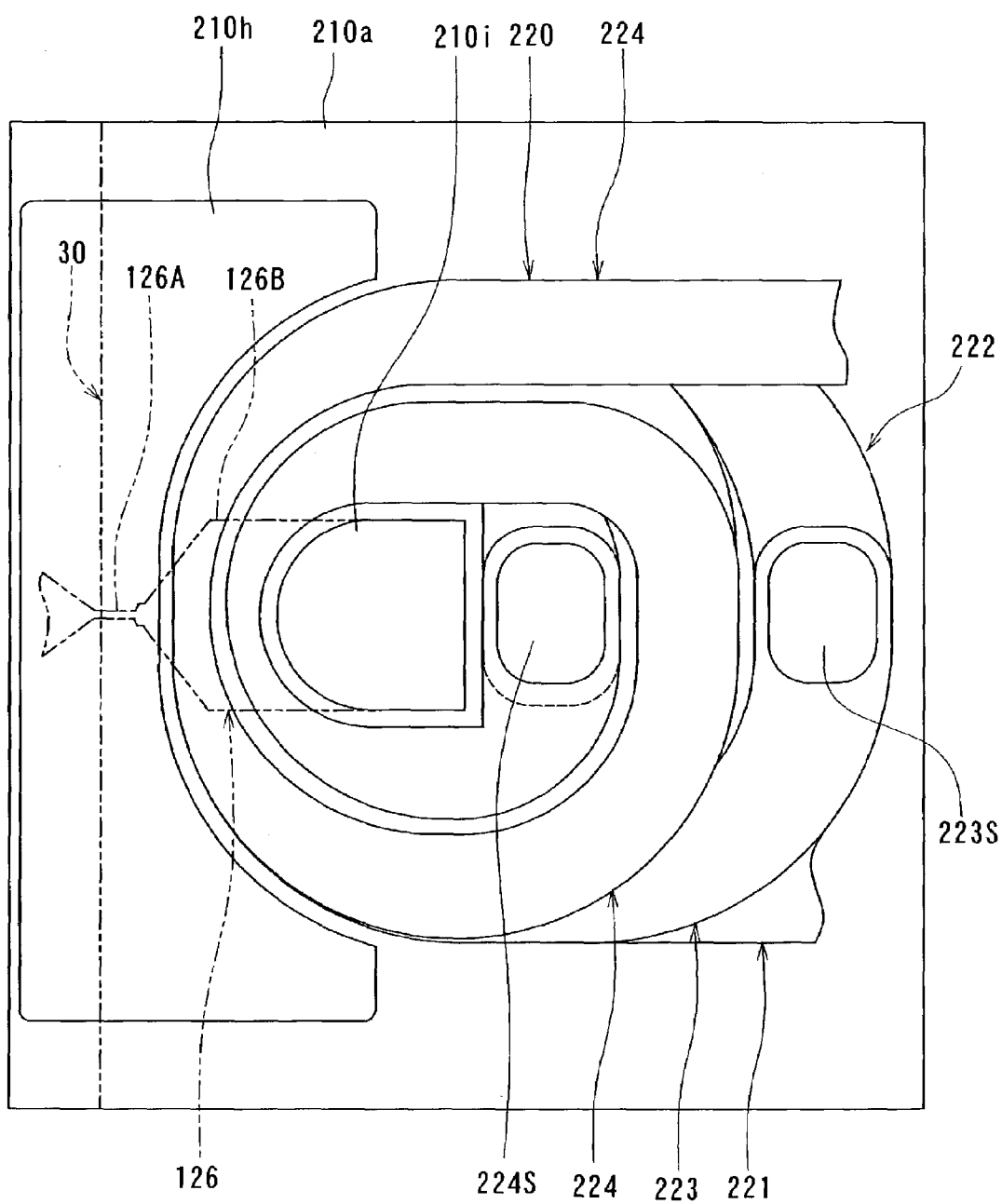
FIG. 73 is a plan view showing the thin-film coil of the modified example of the third embodiment of the invention.

FIG. 66 shows the case where the coupling portion 131 has a circular top surface, as the coupling portion 31 shown in FIG. 23 does. Nevertheless, the shape of the top surface of the coupling portion 131 is not limited thereto, but may be the same as those of the coupling portion 31 shown in FIG. 24 to FIG. 29. Here, FIG. 73 shows an example where the top surface of the coupling portion 131 has the same shape as that of the coupling portion 31 shown in FIG. 29. Like FIG. 66, FIG. 73 is a plan view showing the thin-film coil 220.

Figure 67:
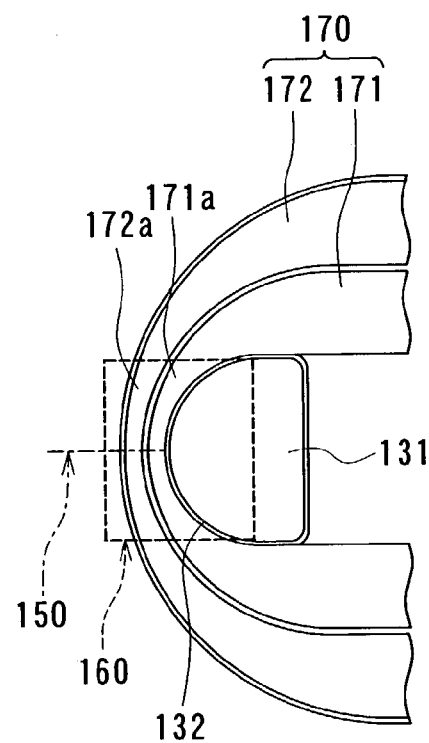
FIG. 67 is a plan view showing a first example of the shape of the thin-film coil in the third embodiment of the invention.
Figure 68:
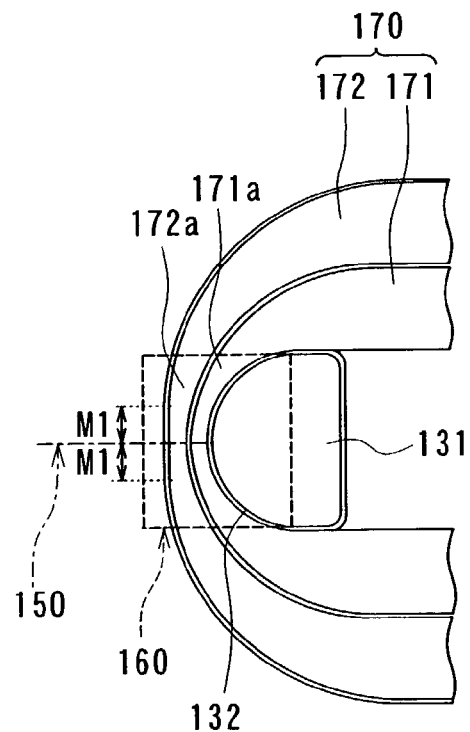
FIG. 68 is a plan view showing a second example of the shape of the thin-film coil in the third embodiment of the invention.
Figure 69:
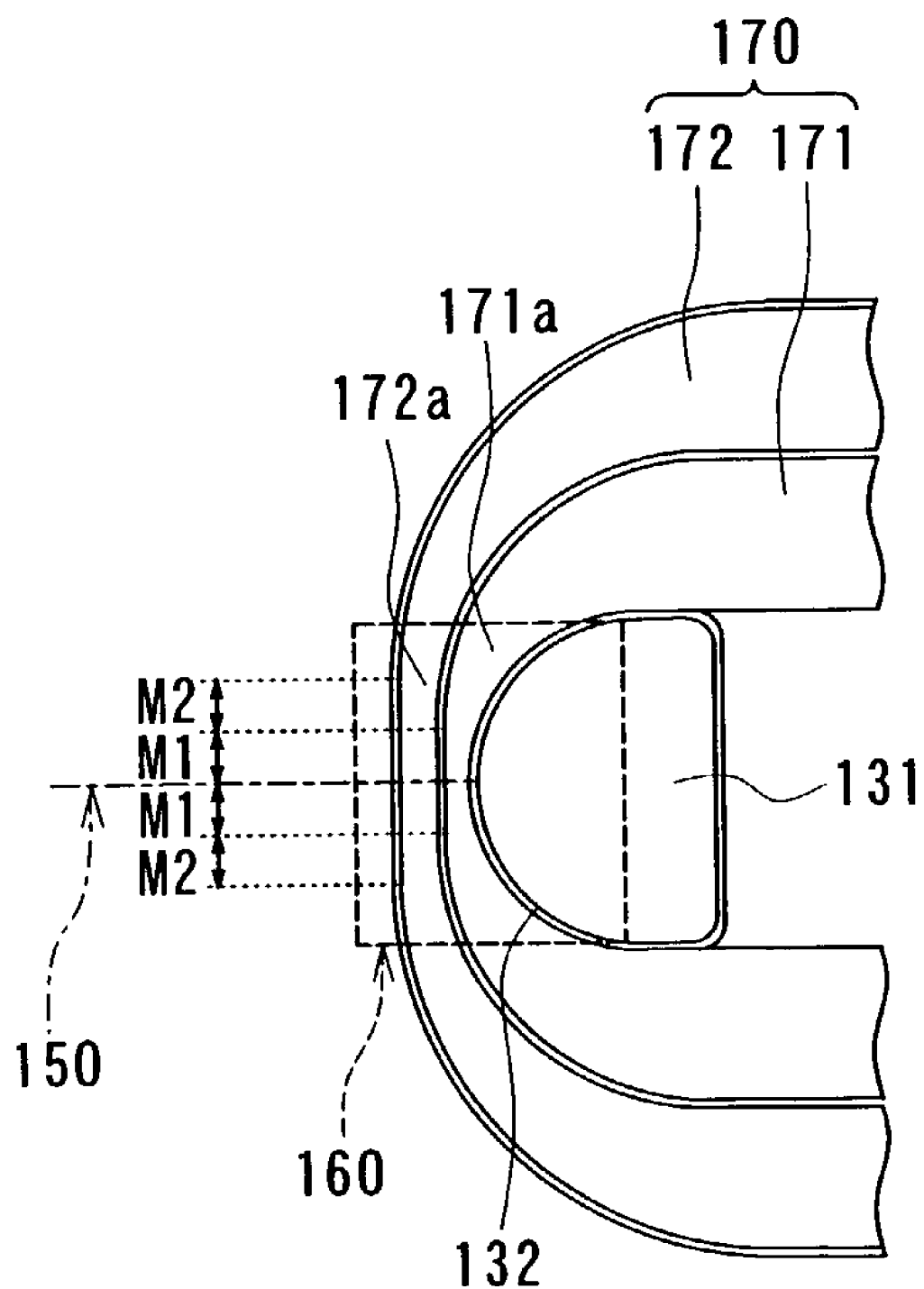
FIG. 69 is a plan view showing a third example of the shape of the thin-film coil in the third embodiment of the invention.

Now, the shape and arrangement of the coupling portion 131 and the thin-film coil 120 according to the present embodiment will be described in conjunction with first to third examples thereof. FIG. 67 to FIG. 69 are plan views showing the first to third examples, respectively. In FIG. 67 to FIG. 69, the reference numeral 170 represents a conductive layer which typifies the first layer portion 121 to the third layer portion 123 of the thin-film coil 120. As described above, the coupling portion 131 of the present embodiment has an end face 132 that faces toward the air bearing surface 30 (not shown). The end face 132 includes a curved surface convex toward the air bearing surface 30. FIG. 67 to FIG. 69 show examples where the top surface of the coupling portion 131 has the same shape as that of the coupling portion 31 shown in FIG. 26. Nevertheless, the shape of the top surface of the coupling portion 131 is not limited thereto, but may be the same as those of the coupling portion 31 shown in FIG. 23 to FIG. 25 and FIG. 27 to FIG. 29.

In any of the first to third examples, the conductive layer 170 has a turn 171 on the inner side and a turn 172 on the outer side. The turns 171 and 172 include a first portion 171a and a second portion 172a, respectively. The portions 171a and 172a lie between the end face 132 of the coupling portion 131 and the air bearing surface 30. In FIG. 67 to FIG. 69, the region designated by the reference numeral 160 is a region where the first portion 171a and the second portion 172a are located. The inner periphery of the first portion 171a lies along the end face 132 of the coupling portion 131. The first portion 171a has a minimum width of the conductive layer 170 at a position on a virtual line 150 that connects the end face 132 of the coupling portion 131 and the air bearing surface 30 in the shortest distance, and increases in width with distance from the virtual line 150. The minimum width of the conductive layer 170 is 0.5 to 1.0 μm, for example. The interval between the inner turn 171 and the outer turn 172 is 0.3 μm, for example.

In the first example shown in FIG. 67, like the first portion 171a, the second portion 172a has a minimum width of the conductive layer 170 at the position on the virtual line 150 and increases in width with distance from the virtual line 150. The inner periphery of the first portion 171a is shaped into an arc having a first radius of curvature. The outer periphery of the first portion 171a is shaped into an arc having a second radius of curvature which is greater than the first radius of curvature. The inner periphery of the second portion 172a is shaped into an arc having a third radius of curvature which is greater than the second radius of curvature. The outer periphery of the second portion 172a is shaped into an arc having a fourth radius of curvature which is greater than the third radius of curvature.

Both the inner and outer peripheries of a part of the turn 171 including the first portion 171a are shaped into a semicircle, for example. The center of the semicircle shaping the outer periphery of that part is located farther from the air bearing surface 30 than the center of the semicircle shaping the inner periphery is. Thus, the part of the turn 171 increases in width with distance from the virtual line 150.

Likewise, both the inner and outer peripheries of a part of the turn 172 including the second portion 172a are shaped into a semicircle, for example. The center of the semicircle shaping the outer periphery of that part is located farther from the air bearing surface 30 than the center of the semicircle shaping the inner periphery is. Thus, the part of the turn 172 increases in width with distance from the virtual line 150.

The turns 171 and 172, except for the portions that increase in width with distance from the virtual line 150 as described above, have generally constant widths of 2 to 5 μm, for example.

In the second example shown in FIG. 68, like the first portion 171a, the second portion 172a has a minimum width of the conductive layer 170 at a position on the virtual line 150 and increases in width with distance from the virtual line 150. The inner periphery of the first portion 171a is shaped into an arc having a first radius of curvature. The outer periphery of the first portion 171a is shaped into an arc having a second radius of curvature which is greater than the first radius of curvature. The inner periphery of the second portion 172a is shaped into an arc having a third radius of curvature which is greater than the second radius of curvature. The outer periphery of the second portion 172a includes a linear portion and two arc portions connected to respective ends of the linear portion. The linear portion is located in a predetermined region covering the position on the virtual line 150. The two arc portions have a fourth radius of curvature greater than the third radius of curvature. The ends of the linear portion are located a length M1 away from the position on the virtual line 150 in opposite directions. The linear portion thus has a length of 2×M1. M1 is 1 to 3 μm, for example.

Both the inner and outer peripheries of a part of the turn 171 including the first portion 171a are shaped into a semicircle, for example. The center of the semicircle shaping the outer periphery of that part is located farther from the air bearing surface 30 than the center of the semicircle shaping the inner periphery is. Thus, the part of the turn 171 increases in width with distance from the virtual line 150.

For a part of the turn 172 including the second portion 172a, the inner periphery thereof is shaped into a semicircle, for example. For the part of the turn 172 including the second portion 172a, the outer periphery thereof includes the two arc portions connected to the respective ends of the linear portion. Each of these arc portions is an arc having a central angle of 90°, for example. The centers of the arcs shaping these arc portions are located farther from the air bearing surface 30 than the center of the semicircle shaping the inner periphery of the part of the turn 172 is. Thus, the part of the turn 172 increases in width with distance from the virtual line 150.

The turns 171 and 172, except for the portions that increase in width with distance from the virtual line 150 as described above, have generally constant widths of 2 to 5 µm, for example.

In the third example shown in FIG. 69, the inner periphery of the first portion 171a is shaped into an arc having a first radius of curvature. The outer periphery of the first portion 171a includes a first linear portion and two arc portions connected to respective ends of the first linear portion. The first linear portion is located in a predetermined region covering a position on the virtual line 150. The two arc portions have a second radius of curvature greater than the first radius of curvature.

The second portion 172a has a portion of constant width (hereinafter, referred to as a constant width portion) located in a predetermined region covering the position on the virtual line 150. The ends of this constant width portion are located a length M1 away from the position on the virtual line 150 in opposite directions. The constant width portion thus has a length of 2×M1. To the respective ends of the constant width portion, connected are variable width portions which increase in width with distance from the virtual line 150.

The inner periphery of the second portion 172a has a second linear portion and two arc portions connected to respective ends of the second linear portion. The second linear portion is located in a predetermined region covering the position on the virtual line 150. The arc portions have a third radius of curvature which is greater than the second radius of curvature. The length of the second linear portion is greater than or equal to that of the first linear portion. FIG. 69 shows the case where the first linear portion and the second linear portion both have a length of 2×M1.

The outer periphery of the second portion 172a includes a third linear portion and two arc portions connected to respective ends of this third linear portion. The third linear portion is located in a predetermined region covering the position on the virtual line 150. The arc portions have a fourth radius of curvature which is greater than the third radius of curvature. The third linear portion is greater than the second linear portion in length. The ends of the third linear portion are located a length M1+M2 away from the position on the virtual line 150 in opposite directions. The third linear portion thus has a length of 2×(M1+M2). M1 and M2 are each 1 to 3 µm, for example. The lengths M1 and M2 may be equal or different.

For a part of the turn 171 including the first portion 171a, the inner periphery thereof is shaped into a semicircle, for example. For the part of the turn 171 including the first portion 171a, the outer periphery thereof includes the two arc portions connected to the respective ends of the first linear portion. Each of these arc portions is an arc having a central angle of 90°, for example. The centers of the arcs shaping these arc portions are located farther from the air bearing surface 30 than the center of the semicircle shaping the inner periphery of the part of the turn 171 is. Thus, the part of the turn 171 increases in width with distance from the virtual line 150.

For a part of the turn 172 including the second portion 172a, the inner periphery thereof includes the two arc portions connected to the respective ends of the second linear portion, and the outer periphery thereof includes the two arc portions connected to the respective ends of the third linear portion. Each of these arc portions is an arc having a central angle of 90°, for example. The center of the arc shaping the outer arc portion is located farther from the air bearing surface 30 than the center of the arc shaping the inner arc portion is. Thus, part of the turn 171, except for the constant width portion, increases in width with distance from the virtual line 150.

The turn 171, except for the portion that increases in width with distance from the virtual line 150 as described above, has a generally constant width of 2 to 5 µm, for example. The turn 172, except for the constant width portion and the portion that increases in width with distance from the virtual line 150 as described above, has a generally constant width of 2 to 5 µm, for example.

Now, description will be given of the effects of the thin-film magnetic head having the thin-film coil 120. Note that the thin-film magnetic head having the thin-film coil 220 has the same effects. In the thin-film magnetic head according to the present embodiment, the thin-film coil 120 has the first to third layer portions 121–123 each of which is made of the flat conductive layer 170 of two turns. In the present embodiment, the yoke length depends on twice the minimum width of the turns 171 and 172 of the conductive layer 170, irrespective of the total number of turns of the thin-film coil 120. The minimum width of the turns 171 and 172 is 0.5 to 1.0 µm, for example. According to the present embodiment, it is therefore possible to reduce the yoke length without much reduction in the minimum width of the turns 171 and 172. Consequently, according to the present embodiment, it is possible to reduce the resistance of the thin-film coil 120 with a reduction in the magnetic path length. According to the present embodiment, it is therefore possible to achieve a thin-film magnetic head which is small in magnetic path length and thus excellent in recording characteristics at high frequency bands, and has the thin-film coil 120 of small resistance.

In the thin-film magnetic head according to the present embodiment, the coupling portion 131 has the end face 132 that faces toward the air bearing surface 30, and the end face 132 includes a curved surface convex toward the air bearing surface 30. The turns 171 and 172 of The conductive layer 170 (the first layer portion 121 to the third layer portion 123) of the thin-film coil 120 have the first portion 171a and the second portion 172a, respectively, the portions 171a and 172a lying between the end face 132 of the coupling portion 131 and the air bearing surface 30. Of the first and second portions 171a and 172a, at least the first portion 171a has a minimum width of the conductive layer 170 at the position on the virtual line 150 that connects the end face 132 of the coupling portion 131 and the air bearing surface 30 in the shortest distance, and increases in width with distance from the virtual line 150. Consequently, according to the present embodiment, it is possible to reduce the resistance of the thin-film coil 120 while reducing the yoke length, i.e., the magnetic path length. The thin-film coil 120 according to the present embodiment can be reduced by 30–60% or so in resistance as compared with thin-film coils having conductive layers of constant width, particularly when the minimum width of the conductive layer 170 is not greater than 1 µm. As above, according to the present embodiment, it is possible to achieve a thin-film magnetic head which has excellent recording characteristics at high frequency bands and has the thin-film coil 120 of smaller resistance, also because of the shape of the end face 132 of the coupling portion 131 and the shape of the conductive layer 170 of the thin-film coil 120.

In conventional thin-film magnetic heads, if the number of turns of the thin-film coil is increased while the yoke length is kept constant, the thin-film coil would decrease in width of the conductive layer with a sharp increase in resistance. In contrast, in the present embodiment, the number of conductive layers 170 to be laminated can be increased without reducing the width of each conductive layer 170. It is therefore possible to increase the number of turns of the thin-film coil 120 with the yoke length kept constant. According to the present embodiment, it is therefore possible to suppress an increase in the resistance of the thin-film coil 120 when the number of turns of the thin-film coil 120 is increased. Consequently, according to the present embodiment, the recording characteristics of the thin-film magnetic head can be improved easily by increasing the number of turns of the thin-film coil 120.

The remainder of the configuration, functions and effects of the present embodiment are the same as those of the first embodiment.

The invention is not limited to the embodiments described above, and various modifications may be made thereto. For example, the flat conductive layer of two or less turns of the invention is not limited to a flat conductive layer that make a single full turn or two full turns. That is, the flat conductive layer of two or less turns of the invention may be a conductive layer that exceeds a single turn and do not reach two turns, and a conductive layer that is yet to reach a single turn such as a U-shaped one.

The number of flat conductive layers of the thin-film coil of the invention is not limited to the numbers shown in the embodiments.

The present invention is also applicable to a thin-film magnetic head dedicated to recording that has an induction-type electromagnetic transducer only, or a thin-film magnetic head that performs recording and reproducing operations with an induction-type electromagnetic transducer.

As has been described, according to the thin-film magnetic head or the method of manufacturing the same of the invention, the thin-film coil has the flat conductive layer of two or less turns. Consequently, according to the invention, it is possible to reduce the resistance of the thin-film coil while reducing the magnetic path length of the thin-film magnetic head. According to the invention, it is therefore possible to achieve a thin-film magnetic head which is small in magnetic path length and thus excellent in recording characteristics at high frequency bands, and which also has a thin-film coil of small resistance.

In the thin-film magnetic head or the method of manufacturing the same of the invention, the coupling portion for establishing magnetic coupling between the first pole layer and the second pole layer may have an end face facing toward the medium facing surface, the end face including a curved surface convex toward the medium facing surface. The conductive layer may include a portion located between the end face of the coupling portion and the medium facing surface. The portion may have a minimum width of the conductive layer at a position on a virtual line connecting the end face of the coupling portion and the medium facing surface in the shortest distance, and may increase in width with distance from the virtual line. Alternatively, the conductive layer may include a first portion and a second portion arranged between the end face of the coupling portion and the medium facing surface, the second portion being located outside the first portion. Of the first portion and the second portion, at least the first portion may have a minimum width of the conductive layer at a position on a virtual line connecting the end face of the coupling portion and the medium facing surface in the shortest distance, and may increase in width with distance from the virtual line.

From these respects, too, the invention makes it possible to reduce the resistance of the thin-film coil while reducing the magnetic path length of the thin-film magnetic head.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head comprising:
   a medium facing surface that faces toward a recording medium;
   first and second pole layers that include magnetic pole portions opposed to each other and located in regions of the pole layers on a side of the medium facing surface;
   a coupling portion for establishing magnetic coupling between the first pole layer and the second pole layer, the coupling portion being located away from the medium facing surface and including at least either one of a part of the first pole layer and a part of the second pole layer;
   a gap layer interposed between the magnetic pole portion of the first pole layer and the magnetic pole portion of the second pole layer; and
   a thin-film coil disposed around the coupling portion, at least part of the thin-film coil being interposed between the first and second pole layers and insulated from the first and second pole layers, wherein:
   the thin-film coil has a flat conductive layer of two or less turns;
   the coupling portion has an end face facing toward the medium facing surface, the end face including a curved surface convex toward the medium facing surface;
   the conductive layer includes a portion located between the end face of the coupling portion and the medium facing surface; and
   the portion located between the end face of the coupling portion and the medium facing surface has a minimum width of the conductive layer at a position on a virtual line connecting the end face of the coupling portion and the medium facing surface in the shortest distance, and increases in width with distance from the virtual line.

2. A thin-film magnetic head according to claim 1, wherein:
   an inner periphery of the portion of the conductive layer has a shape of an arc having a first radius of curvature; and
   an outer periphery of the portion of the conductive layer has a shape of an arc having a second radius of curvature greater than the first radius of curvature.

3. A thin-film magnetic head according to claim 1, wherein:
   an inner periphery of the portion of the conductive layer has a shape of an arc having a first radius of curvature; and
   an outer periphery of the portion of the conductive layer includes a linear portion located in a predetermined region covering the position on the virtual line, and two arc portions connected to respective ends of the linear portion, the two arc portions having a second radius of curvature greater than the first radius of curvature.

4. A thin-film magnetic head comprising:
   a medium facing surface that faces toward a recording medium;
   first and second pole layers that include magnetic pole portions opposed to each other and located in regions of the pole layers on a side of the medium facing surface;

a coupling portion for establishing magnetic coupling between the first pole layer and the second pole layer, the coupling portion being located away from the medium facing surface and including at least either one of a part of the first pole layer and a part of the second pole layer;

a gap layer interposed between the magnetic pole portion of the first pole layer and the magnetic pole portion of the second pole layer; and a thin-film coil disposed around the coupling portion, at least part of the thin-film coil being interposed between the first and second pole layers and insulated from the first and second pole layers, wherein:

the thin-film coil has a flat conductive layer of two or less turns;

the coupling portion has an end face facing toward the medium facing surface, the end face including a curved surface convex toward the medium facing surface;

the conductive layer includes a first portion and a second portion arranged between the end face of the coupling portion and the medium facing surface, the second portion being located outside the first portion; and of the first and second portions, at least the first portion has a minimum width of the conductive layer at a position on a virtual line connecting the end face of the coupling portion and the medium facing surface in the shortest distance, and increases in width with distance from the virtual line.

5. A thin-film magnetic head according to claim 4, wherein:

an inner periphery of the first portion has a shape of an arc having a first radius of curvature;

an outer periphery of the first portion has a shape of an arc having a second radius of curvature greater than the first radius of curvature;

an inner periphery of the second portion has a shape of an arc having a third radius of curvature greater than the second radius of curvature; and an outer periphery of the second portion has a shape of an arc having a fourth radius of curvature greater than the third radius of curvature.

6. A thin-film magnetic head according to claim 4, wherein:

an inner periphery of the first portion has a shape of an arc having a first radius of curvature;

an outer periphery of the first portion has a shape of an arc having a second radius of curvature greater than the first radius of curvature;

an inner periphery of the second portion has a shape of an arc having a third radius of curvature greater than the second radius of curvature; and an outer periphery of the second portion includes a linear portion located in a predetermined region covering the position on the virtual line, and two arc portions connected to respective ends of the linear portion, the two arc portions having a fourth radius of curvature greater than the third radius of curvature.

7. A thin-film magnetic head according to claim 4, wherein:

an inner periphery of the first portion has a shape of an arc having a first radius of curvature;

an outer periphery of the first portion includes a first linear portion located in a predetermined region covering the position on the virtual line, and two arc portions connected to respective ends of the first linear portion, the two arc portions having a second radius of curvature greater than the first radius of curvature;

an inner periphery of the second portion includes a second linear portion located in a predetermined region covering the position on the virtual line, and two arc portions connected to respective ends of the second linear portion, the two arc portions having a third radius of curvature greater than the second radius of curvature;

an outer periphery of the second portion includes a third linear portion located in a predetermined region covering the position on the virtual line, and two arc portions connected to respective ends of the third linear portion, the two arc portions having a fourth radius of curvature greater than the third radius of curvature; and the second linear portion has a length greater than or equal to that of the first linear portion, and the third linear portion is longer than the second linear portion.

8. A thin-film magnetic head comprising:

a medium facing surface that faces toward a recording medium;

first and second pole layers that include magnetic pole portions opposed to each other and located in regions of the pole layers on a side of the medium facing surface;

a coupling portion for establishing magnetic coupling between the first pole layer and the second pole layer, the coupling portion being located away from the medium facing surface and including at least either one of a part of the first pole layer and a part of the second pole layer;

a gap layer interposed between the magnetic pole portion of the first pole layer and the magnetic pole portion of the second pole layer; and a thin-film coil disposed around the coupling portion, at least part of the thin-film coil being interposed between the first and second pole layers and insulated from the first and second pole layers, wherein the thin-film coil has a plurality of flat conductive layers each having two or less turns, and the plurality of conductive layers are laminated and electrically connected to each other.

9. A thin-film magnetic head according to claim 8, wherein:

the plurality of conductive layers include a lowermost conductive layer, an uppermost conductive layer, and one or more intermediate conductive layers interposed therebetween;

the lowermost conductive layer has a connecting portion to be connected to the intermediate conductive layer located thereover;

the uppermost conductive layer has a connecting portion to be connected to the intermediate conductive layer located thereunder; and the intermediate conductive layer has two connecting portions to be connected to two other conductive layers located thereunder and thereover.

10. A thin-film magnetic head according to claim 9, wherein the connecting portions of the lowermost conductive layer, the uppermost conductive layer, and the intermediate conductive layer are each located at either one of two positions farther from the medium facing surface than the coupling portion is.

11. A thin-film magnetic head according to claim 10, wherein a center of the coupling portion and the two positions at which the connecting portions are located are aligned on a line.

12. A method of manufacturing a thin-film magnetic head comprising:

a medium facing surface that faces toward a recording medium;

first and second pole layers that include magnetic pole portions opposed to each other and located in regions of the pole layers on a side of the medium facing surface;

a coupling portion for establishing magnetic coupling between the first pole layer and the second pole layer, the coupling portion being located away from the medium facing surface and including at least either one of a part of the first pole layer and a part of the second pole layer;

a gap layer interposed between the magnetic pole portion of the first pole layer and the magnetic pole portion of the second pole layer; and a thin-film coil disposed around the coupling portion, at least part of the thin-film coil being interposed between the first and second pole layers and insulated from the first and second pole layers, the method comprising the steps of:
  forming the first pole layer;
  forming the thin-film coil on the first pole layer;
  forming the gap layer on the magnetic pole portion of the first pole layer;
  forming the second pole layer on the gap layer and the thin-film coil,
wherein:

one of the steps of forming the first pole layer and forming the second pole layer includes the step of forming the coupling portion;

the thin-film coil has a flat conductive layer of two or less turns;

the coupling portion has an end face facing toward the medium facing surface, the end face including a curved surface convex toward the medium facing surface;

the conductive layer includes a portion located between the end face of the coupling portion and the medium facing surface; and the portion located between the end face of the coupling portion and the medium facing surface has a minimum width of the conductive layer at a position on a virtual line connecting the end face of the coupling portion and the medium facing surface in the shortest distance, and increases in width with distance from the virtual line.

13. A method of manufacturing a thin-film magnetic head comprising:

a medium facing surface that faces toward a recording medium;

first and second pole layers that include magnetic pole portions opposed to each other and located in regions of the pole layers on a side of the medium facing surface;

a coupling portion for establishing magnetic coupling between the first pole layer and the second pole layer, the coupling portion being located away from the medium facing surface and including at least either one of a part of the first pole layer and a part of the second pole layer;

a gap layer interposed between the magnetic pole portion of the first pole layer and the magnetic pole portion of the second pole layer; and a thin-film coil disposed around the coupling portion, at least part of the thin-film coil being interposed between the first and second pole layers and insulated from the first and second pole layers, the method comprising the steps of:
  forming the first pole layer;
  forming the thin-film coil on the first pole layer;
  forming the gap layer on the magnetic pole portion of the first pole layer;
  forming the second pole layer on the gap layer and the thin-film coil,
wherein:

one of the steps of forming the first pole layer and forming the second pole layer includes the step of forming the coupling portion;

the thin-film coil has a flat conductive layer of two or less turns;

the coupling portion has an end face facing toward the medium facing surface, the end face including a curved surface convex toward the medium facing surface;

the conductive layer includes a first portion and a second portion arranged between the end face of the coupling portion and the medium facing surface, the second portion being located outside the first portion; and of the first and second portions, at least the first portion has a minimum width of the conductive layer at a position on a virtual line connecting the end face of the coupling portion and the medium facing surface in the shortest distance, and increases in width with distance from the virtual line.

14. A method of manufacturing a thin-film magnetic head comprising:

a medium facing surface that faces toward a recording medium;

first and second pole layers that include magnetic pole portions opposed to each other and located in regions of the pole layers on a side of the medium facing surface;

a coupling portion for establishing magnetic coupling between the first pole layer and the second pole layer, the coupling portion being located away from the medium facing surface and including at least either one of a part of the first pole layer and a part of the second pole layer;

a gap layer interposed between the magnetic pole portion of the first pole layer and the magnetic pole portion of the second pole layer; and a thin-film coil disposed around the coupling portion, at least part of the thin-film coil being interposed between the first and second pole layers and insulated from the first and second pole layers, the method comprising the steps of:
forming the first pole layer;
forming the thin-film coil on the first pole layer;
forming the gap layer on the magnetic pole portion of the first pole layer;
forming the second pole layer on the gap layer and the thin-film coil, wherein:

one of the steps of forming the first pole layer and forming the second pole layer includes the step of forming the coupling portion;

the thin-film coil has a plurality of flat conductive layers each having two or less turns; and in the step of forming the thin-film coil, the plurality of conductive layers are formed so as to be laminated and electrically connected to each other.

* * * * *